US010554699B2

(12) United States Patent
Krugman et al.

(10) Patent No.: US 10,554,699 B2
(45) Date of Patent: Feb. 4, 2020

(54) COMMUNICATION EXCHANGES AND METHODS OF USE THEREOF

(71) Applicants: Robert Krugman, Edgewood, NY (US); Doug DeSchutter, Edgewood, NY (US); Martin Cottreau, Edgewood, NY (US)

(72) Inventors: Robert Krugman, Edgewood, NY (US); Doug DeSchutter, Edgewood, NY (US); Martin Cottreau, Edgewood, NY (US)

(73) Assignee: Broadridge Fluent Solutions, LLC, Lake Success, NY (US)

( * ) Notice: Subject to any disclaimer, the term of this patent is extended or adjusted under 35 U.S.C. 154(b) by 307 days.

(21) Appl. No.: 14/855,275

(22) Filed: Sep. 15, 2015

(65) Prior Publication Data

US 2016/0142449 A1    May 19, 2016

Related U.S. Application Data

(60) Provisional application No. 62/050,637, filed on Sep. 15, 2014.

(51) Int. Cl.
*H04L 29/06* (2006.01)
*G06Q 10/10* (2012.01)
*H04L 29/08* (2006.01)

(52) U.S. Cl.
CPC ....... *H04L 65/1083* (2013.01); *G06Q 10/107* (2013.01); *H04L 67/10* (2013.01)

(58) Field of Classification Search
None
See application file for complete search history.

(56) References Cited

U.S. PATENT DOCUMENTS

| 5,996,076 A | * | 11/1999 | Rowney | ................ | G06F 21/445 |
| | | | | | 705/76 |
| 2002/0095454 A1 | * | 7/2002 | Reed | .................. | G06Q 30/0601 |
| | | | | | 709/201 |

(Continued)

OTHER PUBLICATIONS

International Search Report and Written Opinion from International Application No. PCTUS2015/050279 dated Dec. 22, 2015.

*Primary Examiner* — Hamza N Algibhah
*Assistant Examiner* — Tony Williams
(74) *Attorney, Agent, or Firm* — Greenberg Traurig, LLP

(57) ABSTRACT

An exemplary specifically programmed electronic communications exchange which includes at least the following specifically programmed components: a specifically programmed computer processor that is configured to at least perform, in real-time, the following: causing, via a computer network, to display a company personalized communications set-up graphical user interface configured to allow a representative of a company to dynamically define a plurality of company communications attributes; causing, via the computer network, to display a consumer communications set-up graphical user interface configured to allow a consumer to dynamically define a plurality of consumer communications preference attributes; automatically matching the company to the consumer based at least in part on: the plurality of company communications attributes and the plurality of consumer communications preference attributes; and automatically and electronically delivering a plurality of electronic communications, from or on behalf of the company, to the consumer.

14 Claims, 41 Drawing Sheets

(56) References Cited

U.S. PATENT DOCUMENTS

| | | | |
|---|---|---|---|
| 2007/0174453 A1* | 7/2007 | Donoho | G06F 17/3089 709/224 |
| 2008/0120186 A1 | 5/2008 | Jokinen et al. | |
| 2009/0254971 A1* | 10/2009 | Herz | G06Q 10/10 726/1 |
| 2009/0265245 A1 | 10/2009 | Wright | |
| 2013/0304570 A1* | 11/2013 | Johnson | G06Q 30/02 705/14.45 |

* cited by examiner

Hello

The INLET network has hundreds of providers that can send your communications to channels such as those listed below. Just select the channel where you'd like to recieve your digital communications and we'll do the rest.

View 45 More Channels

COMMUNICATION EXCHANGES AND METHODS OF USE THEREOF

RELATED APPLICATIONS

This application claims the priority of U.S. provisional application Ser. No. 62/050,637, entitled "COMPUTER METHOD AND COMPUTER SYSTEM FOR COMMUNICATION EXCHANGE," filed Sep. 15, 2014, which is incorporated herein by reference in its entirety for all purposes.

TECHNICAL FIELD

In some embodiments, the instant invention is related to communication exchanges that allow to electronically mediate, route, and/or deliver electronic information (e.g., discrete data (e.g., files), streaming data, electronic messages, etc.) from one or more senders to one or more recipients based on specifically programmed rule engines/interfaces/communication protocols that define at least one of: relationships between senders and recipients, formats of the electronic information, sending rules, delivery rules, characteristics of communication passageways/channels, and other suitable variables.

BACKGROUND OF INVENTION

In some instances, the importance of electronic communication in all aspects of society is well known. Typically, the use of electronic communications has become woven into the way individuals communicate and otherwise provide information to each other. Typically, individuals utilize myriad electronic communication platforms and types of electronic information (e.g., discrete data (e.g., files), streaming data, electronic messages, etc.) to communicate among themselves.

BRIEF SUMMARY OF INVENTION

In some embodiments, the instant invention is directed to a computer-implemented method which includes at least the following steps: electronically storing, in real-time, by at least one specifically programmed computer processor of an electronic communications exchange executing software to perform the method, historical communications data about communications between a plurality of companies and a plurality of consumers of the plurality of companies in at least one database residing in non-transient memory; causing, in real-time, via a computer network, by the at least one specifically programmed computer processor of the electronic communications exchange executing software to perform the method, to display at least one company personalized communications set-up graphical user interface on at least one first electronic device, being utilized by at least one first representative of at least one first company, where the at least one company personalized communications set-up graphical user interface is configured to allow the at least one first representative to dynamically define a first plurality of company communications attributes, where the first plurality of company communications attributes include: i) first company identifying data, identifying information about the at least one first company, ii) a first plurality of company approved consumer delivery communications channels, iii) at least one first consumer validation rule, identifying at least one first identity verification condition to verify an identity of a customer, iv) first company delivery consent terms data, defining terms to which a consumer is required to consent prior to delivery of a communication from or on behalf of the at least one first company, and v) first company consumer presentation data, defining how to display on a graphical user interface information of the at least one first company to a consumer; causing, in real-time, via the computer network, by the at least one specifically programmed computer processor of the electronic communications exchange executing software to perform the method, to display at least one company personalized communications set-up graphical user interface on at least one second electronic device, being utilized by at least one second representative of at least one second company, where the at least one company personalized communications set-up graphical user interface is configured to allow the at least one second representative to dynamically define a second plurality of company communications attributes, where the second plurality of company communications attributes include: i) second company identifying data, identifying information about the at least one second company, ii) a second plurality of company approved consumer delivery communications channels, iii) at least one second consumer validation rule, identifying at least one second identity verification condition to verify an identity of a customer, iv) second company delivery consent terms data, defining terms to which a consumer is required to consent prior to delivery of a communication from or on behalf of the at least one second company, and v) second company consumer presentation data, defining how to display on a graphical user interface information of the at least one second company to a consumer; electronically and automatically storing, in real-time, by the at least one specifically programmed computer processor of the electronic communications exchange executing software to perform the method, the first plurality of company communications attributes of the at least one first company and the second plurality of company communications attributes of the at least one second company in the at least one database residing in the non-transient memory; causing, in real-time, via the computer network, by the at least one specifically programmed computer processor of the electronic communications exchange executing software to perform the method, to display at least one consumer communications set-up graphical user interface on at least one third electronic device, being utilized by at least one first consumer, where the at least one consumer personalized communications set-up graphical user interface is configured to allow the at least one first consumer to dynamically define a first plurality of consumer communications preference attributes, where the first plurality of consumer communications preference attributes include: i) at least one first preference attribute, identifying a type of a first plurality of electronic communications communication that the at least one first consumer desires to electronically receive, ii) at least one second preference attribute, identifying at least one first particular company from which the at least one first consumer desires to electronically receive the first plurality of electronic communications directed to the at least one first consumer, and iii) at least one third preference attribute, identifying at least one first consumer delivery communications channel to be utilized for electronically sending the first plurality of electronic communications; causing, in real-time, via the computer network, by the at least one specifically programmed computer processor of the electronic communications exchange executing software to perform the method, to display the at least one consumer communications set-up graphical user interface on at least one fourth electronic device, being utilized by at least one second consumer, where the at least one consumer personalized communications set-up graphical user interface is configured to allow the at least one second consumer to dynamically define a second plurality of consumer communications preference attributes, where the second plurality of consumer communications preference attributes include: i) at least one fourth preference attribute, identifying a type of a second plurality of electronic communications that the at least one second consumer desires to electronically receive, ii) at least one fifth preference attribute, identifying at least one second particular company from which the at least one second consumer desires to electronically receive the second plurality of electronic communications directed to the at least one second consumer, and iii) at least one sixth preference attribute, identifying at least one second consumer delivery communications channel to be utilized for electronically sending the second plurality of electronic communications; automatically matching, in real-time, by the at least one specifically programmed computer processor of the electronic communications exchange executing software to perform the method, at least one of the at least one first company and at least one second company to at least one of the at least one first consumer and the at least one second consumer based at least in part on: i) the first plurality of company communications attributes, ii) the second plurality of company communications attributes, iii) the first plurality of consumer communications preference attributes, and iv) the second plurality of consumer communications preference attributes; automatically updating, in real-time, by the at least one specifically programmed computer processor of the electronic communications exchange executing software to perform the method, based at least in part on the historical communications data and outcome of the matching, at least the following: i) the first plurality of company communications attributes, ii) the second plurality of company communications attributes, iii) the first plurality of consumer communications preference attributes, iv) the second plurality of consumer communications preference attributes, and v) the at least one consumer communications set-up graphical user interface, and vi) the at least one company personalized communications set-up graphical user interface; and automatically and electronically delivering, in real-time, by the at least one specifically programmed computer processor of the electronic communications exchange executing software to perform the method, the first plurality of electronic communications to the at least one first consumer; automatically and electronically delivering, in real-time, by the at least one specifically programmed computer processor of the electronic communications exchange executing software to perform the method, the second plurality of electronic communications to the at least one first consumer; automatically and electronically delivering, in real-time, by the at least one specifically programmed computer processor of the electronic communications exchange executing software to perform the method, a third plurality of electronic communications, from or on behalf of the at least one first company, based at least in part on the first plurality of company communications attributes; and automatically and electronically delivering, in real-time, by the at least one specifically programmed computer processor of the electronic communications exchange executing software to perform the method, a fourth plurality of electronic communications, from or on behalf of the at least one second company, based at least in part on the second plurality of company communications attributes.

In some embodiments, the first plurality of company approved consumer delivery communications channels, the second plurality of company approved consumer delivery communications channels, the at least one first consumer delivery communications channel, and the at least one second consumer delivery communications channel are selected from the group consisting of: i) secure electronic messaging system, ii) a website, and iii) a digital mail system.

In some embodiments, the at least one first consumer is one of: i) an individual, ii) an retail investor, iii) an institutional investor, and iv) an entity that is not a person. In some embodiments, the at least one second consumer is one of: i) an individual, ii) an retail investor, iii) an institutional investor, and iv) an entity that is not a person.

In some embodiments, the method further includes the steps of automatically generating, in real-time, by the at least one specifically programmed computer processor of the electronic communications exchange executing software to perform the method, a first plurality of electronic alerts to the at least one first consumer regarding the first plurality of electronic communications; and automatically generating, in real-time, by the at least one specifically programmed computer processor of the electronic communications exchange executing software to perform the method, a second plurality of electronic alerts to the at least one second consumer regarding the second plurality of electronic communications.

In some embodiments, the method further includes the steps of automatically generating, in real-time, by the at least one specifically programmed computer processor of the electronic communications exchange executing software to perform the method, a first plurality of electronic notifications to the at least one first company regarding the third plurality of electronic communications attributes; and automatically generating, in real-time, by the at least one specifically programmed computer processor of the electronic communications exchange executing software to perform the method, a second plurality of electronic notifications to the at least one second company regarding the fourth plurality of electronic communications attributes.

In some embodiments, the instant invention is directed to a specifically programmed electronic communications exchange which includes at least the following specifically programmed components: at least one specialized computer machine, including: a non-transient memory, electronically storing particular computer executable program code; and at least one computer processor which, when executing the particular program code, becomes a specifically programmed computer processor of the electronic communications exchange that is configured to at least perform the following operations: electronically storing, in real-time, historical communications data about communications between a plurality of companies and a plurality of consumers of the plurality of companies in at least one database residing in non-transient memory; causing, in real-time, via a computer network, to display at least one company personalized communications set-up graphical user interface on at least one first electronic device, being utilized by at least one first representative of at least one first company, where the at least one company personalized communications set-up graphical user interface is configured to allow the at least one first representative to dynamically define a first plurality of company communications attributes, where the first plurality of company communications attributes include: i) first company identifying data, identifying information about the at least one first company, ii) a first plurality of company approved consumer delivery communications channels, iii) at least one first consumer validation rule, identifying at least one first identity verification condition to verify an identity of a customer, iv) first company delivery consent terms data, defining terms to which a consumer is required to consent prior to delivery of a communication from or on behalf of the at least one first company, and v) first company consumer presentation data, defining how to display on a graphical user interface information of the at least one first company to a consumer; causing, in real-time, via the computer network, to display at least one company personalized communications set-up graphical user interface on at least one second electronic device, being utilized by at least one second representative of at least one second company, where the at least one company personalized communications set-up graphical user interface is configured to allow the at least one second representative to dynamically define a second plurality of company communications attributes, where the second plurality of company communications attributes include: i) second company identifying data, identifying information about the at least one second company, ii) a second plurality of company approved consumer delivery communications channels, iii) at least one second consumer validation rule, identifying at least one second identity verification condition to verify an identity of a customer, iv) second company delivery consent terms data, defining terms to which a consumer is required to consent prior to delivery of a communication from or on behalf of the at least one second company, and v) second company consumer presentation data, defining how to display on a graphical user interface information of the at least one second company to a consumer; electronically and automatically storing, in real-time, the first plurality of company communications attributes of the at least one first company and the second plurality of company communications attributes of the at least one second company in the at least one database residing in the non-transient memory; causing, in real-time, via the computer network, to display at least one consumer communications set-up graphical user interface on at least one third electronic device, being utilized by at least one first consumer, where the at least one consumer personalized communications set-up graphical user interface is configured to allow the at least one first consumer to dynamically define a first plurality of consumer communications preference attributes, where the first plurality of consumer communications preference attributes include: i) at least one first preference attribute, identifying a type of a first plurality of electronic communications communication that the at least one first consumer desires to electronically receive, ii) at least one second preference attribute, identifying at least one first particular company from which the at least one first consumer desires to electronically receive the first plurality of electronic communications directed to the at least one first consumer, and iii) at least one third preference attribute, identifying at least one first consumer delivery communications channel to be utilized for electronically sending the first plurality of electronic communications; causing, in real-time, via the computer network, to display the at least one consumer communications set-up graphical user interface on at least one fourth electronic device, being utilized by at least one second consumer, where the at least one consumer personalized communications set-up graphical user interface is configured to allow the at least one second consumer to dynamically define a second plurality of consumer communications preference attributes, where the second plurality of consumer communications preference attributes include: i) at least one fourth preference attribute, identifying a type of a second plurality of electronic communications that the at least one second consumer desires to electronically receive, ii) at least one fifth preference attribute, identifying at least one second particular company from which the at least one second consumer desires to electronically receive the second plurality of electronic communications directed to the at least one second consumer, and iii) at least one sixth preference attribute, identifying at least one second consumer delivery communications channel to be utilized for electronically sending the second plurality of electronic communications; automatically matching, in real-time, at least one of the at least one first company and at least one second company to at least one of the at least one first consumer and the at least one second consumer based at least in part on: i) the first plurality of company communications attributes, ii) the second plurality of company communications attributes, iii) the first plurality of consumer communications preference attributes, and iv) the second plurality of consumer communications preference attributes; automatically updating, in real-time, based at least in part on the historical communications data and outcome of the matching, at least the following: i) the first plurality of company communications attributes, ii) the second plurality of company communications attributes, iii) the first plurality of consumer communications preference attributes, iv) the second plurality of consumer communications preference attributes, and v) the at least one consumer communications set-up graphical user interface, and vi) the at least one company personalized communications set-up graphical user interface; and automatically and electronically delivering, in real-time, the first plurality of electronic communications to the at least one first consumer; automatically and electronically delivering, in real-time, the second plurality of electronic communications to the at least one first consumer; automatically and electronically delivering, in real-time, a third plurality of electronic communications, from or on behalf of the at least one first company, based at least in part on the first plurality of company communications attributes; and automatically and electronically delivering, in real-time, a fourth plurality of electronic communications, from or on behalf of the at least one second company, based at least in part on the second plurality of company communications attributes.

BRIEF DESCRIPTION OF THE FIGURES

The present invention can be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 34:
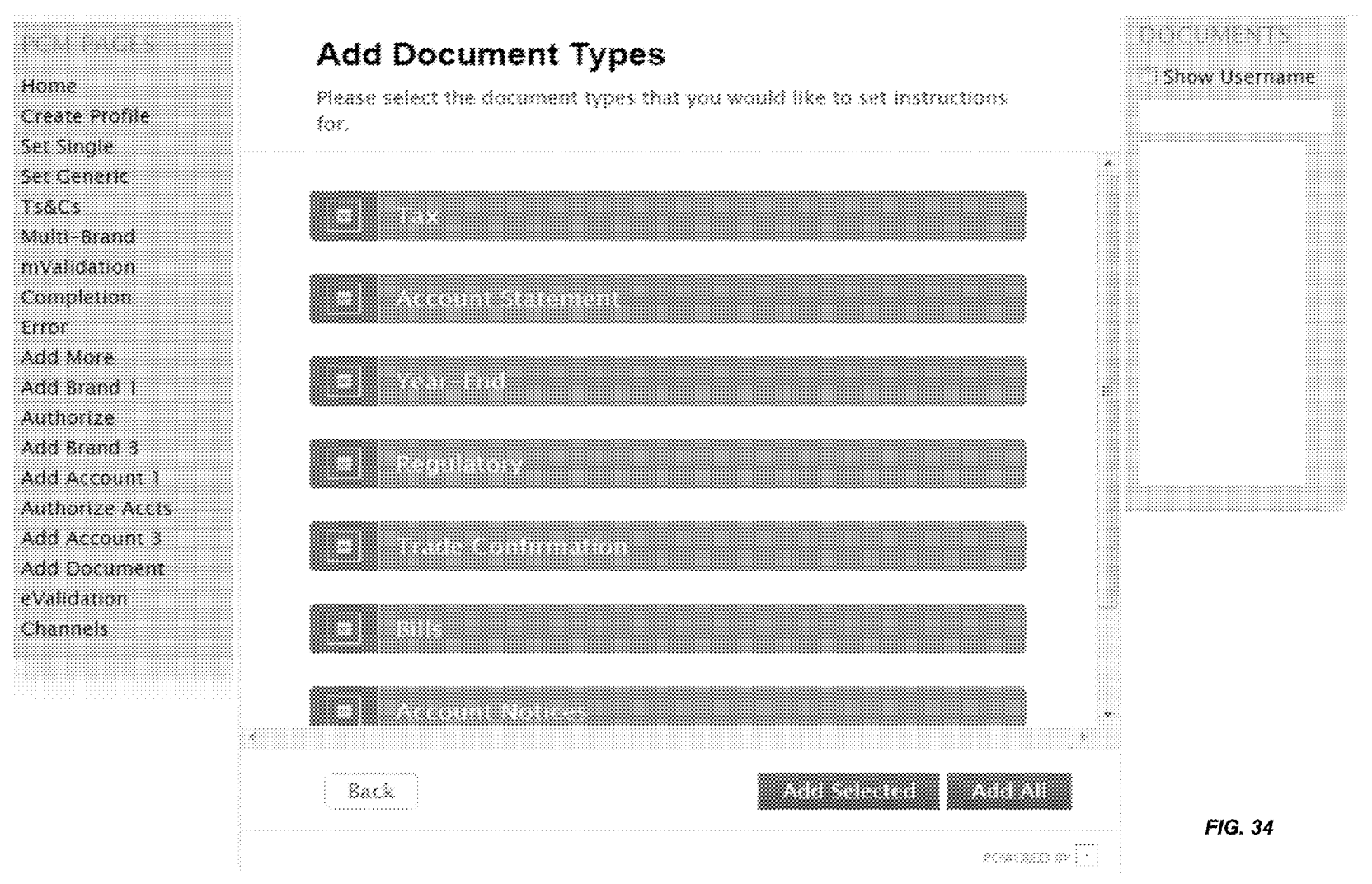
Figure 35:
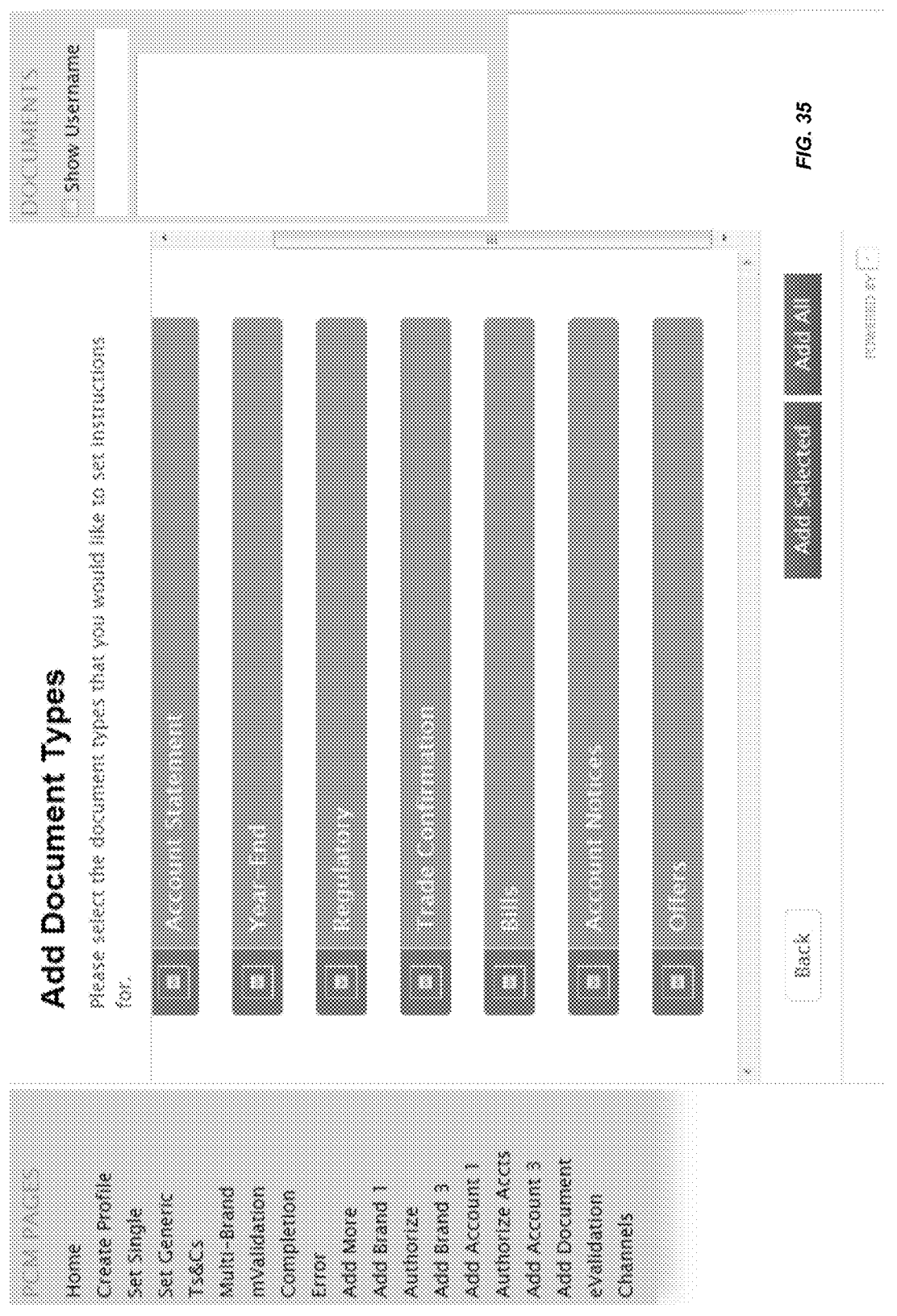
Figure 36:
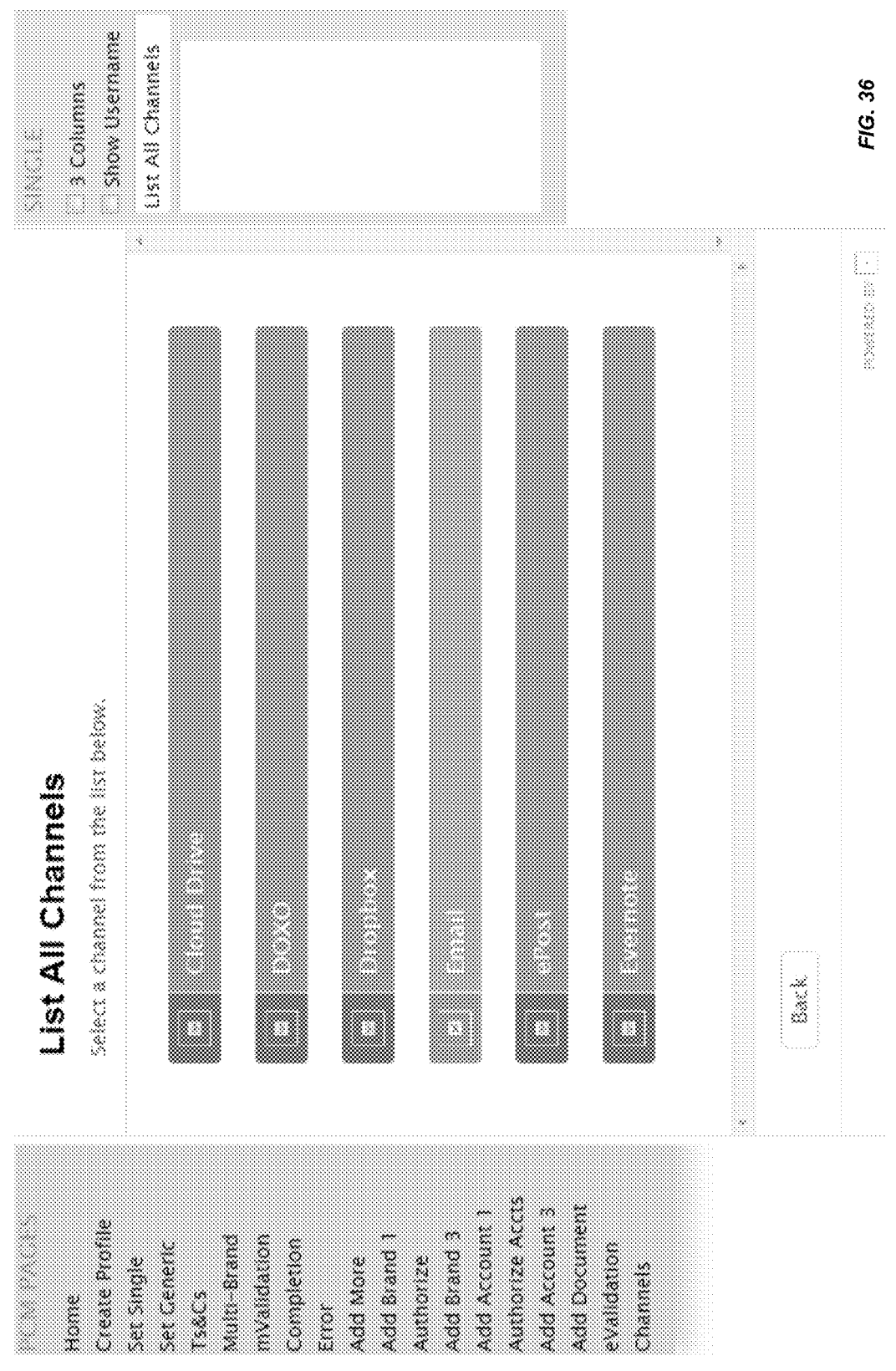

FIGS. 28-37 are screenshots representative of some embodiments of the present invention.

Figure 1:
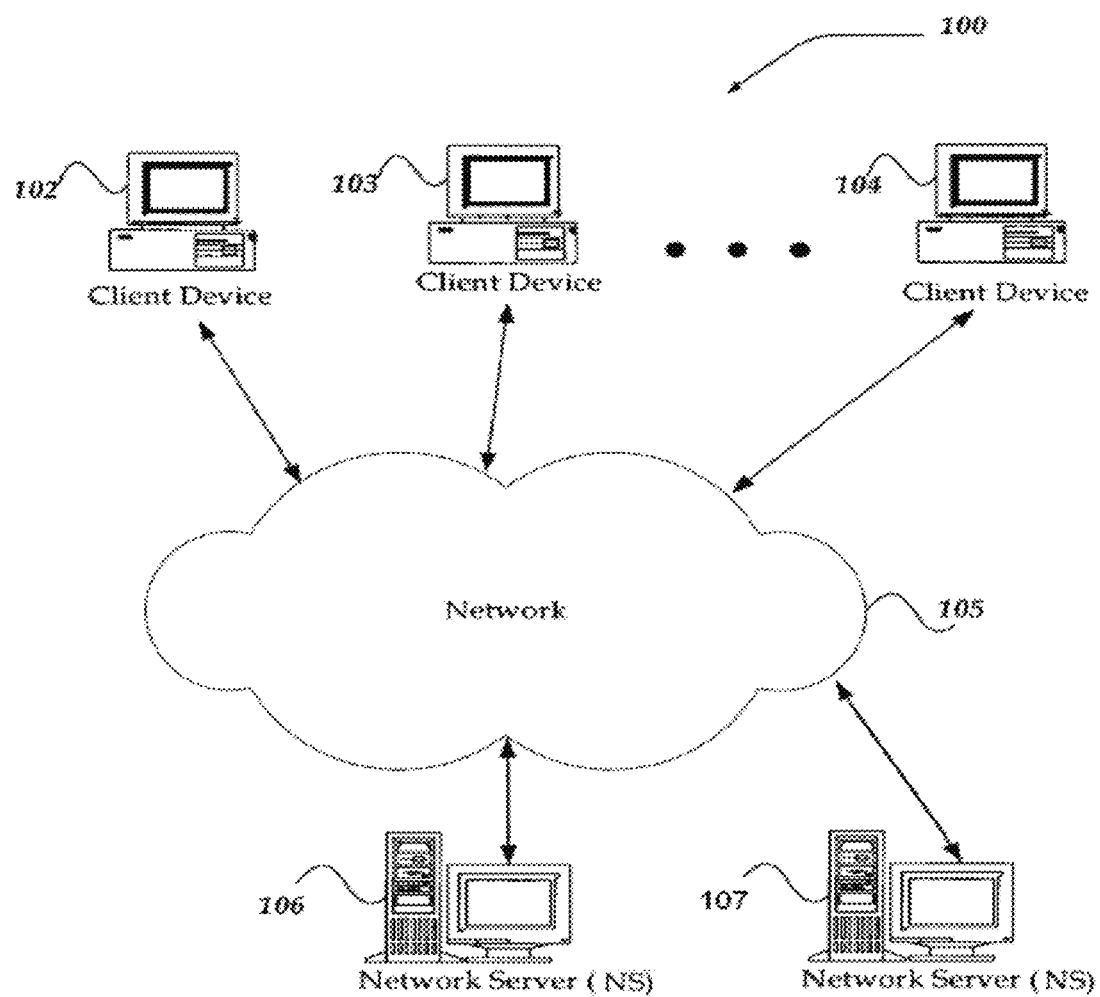
FIGS. 1-4 are illustrative computer system architectures representative of some embodiments of the present invention.

In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION OF INVENTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action can occur instantaneously or almost instantaneously in time when another event/action has occurred.

As used herein, the term "dynamic(ly)" is directed to an event/action that can occur without any human intervention. In some embodiments, the dynamic event/action may be in real-time, hourly, daily, weekly, monthly, etc.

In some embodiments, the terms "sender" and "senders," as referenced herein, are directed to entity(ies), individual(s), and/or electronic device(s) that need to send electronic information (e.g., discrete data (e.g., files), streaming data, electronic messages, etc.) to one or more recipients that may be known and/or unknown to the sender(s). In some embodiments, there are at least 10,000 senders. In some embodiments, there are at least 1,000 senders. In some embodiments, there are at least 100,000 senders. In some embodiments, there are at least 1,000,000 senders.

In some embodiments, the terms "recipient" and "recipients," as referenced herein, are directed to entity(ies), individual(s), and/or electronic device(s) who receives the electronic information (e.g., discrete data (e.g., files), streaming data, electronic messages, etc.) from the sender(s) that may be known and/or unknown to the recipient(s). In some embodiments, there are at least 10,000 recipients. In some embodiments, there are at least 1,000 recipients. In some embodiments, there are at least 100,000 recipients. In some embodiments, there are at least 1,000,000 recipients.

For purposes of this description, the terms "sender(s)" and "recipient(s)" are used to describe various communication methodologies of the instant invention and are not intended to uniquely designated a particular individual and a particular entity as being only the sender or the recipient. Consequently, for purposes of this description, the particular individual and the particular entity can be the sender and the recipient based on the specific function(s) the particular individual and the particular entity perform in accordance with the communication methodologies of the instant invention.

In some embodiments, the terms "source(s)" and "source system(s)," as referenced herein, are directed to specifically programmed system(s)/platform(s) that at least transmit(s) the electronic information (e.g., discrete data (e.g., files), streaming data, electronic messages, etc.) on behalf of and/or from the sender(s). In some embodiments, there are at least 10 sources. In some embodiments, there are at least between 2 and 100 sources. In some embodiments, there are at least between 10 and 1,000 sources. In some embodiments, there are at least 1,000 sources.

In some embodiments, the terms "channel(s)" and "channel system(s)," as referenced herein, are directed to specifically programmed system(s)/platform(s) that at least receive the electronic information (e.g., discrete data (e.g., files), streaming data, electronic messages, etc.) on behalf of the recipient(s). In some embodiments, the channel(s) can also process the received electronic information to present such electronic information to the recipient(s), and/or their designees, base, at least in part, on one or more rules set by the recipient(s), and/or their designees, and/or determined, by the channel(s), for the recipient(s), and/or their designees. In some embodiments, there are at least 10 channels. In some embodiments, there are at least between 2 and 100 channels. In some embodiments, there are at least between 10 and 1,000 channels. In some embodiments, there are at least 1,000 channels.

For purposes of this description, the terms "source(s)," "source system(s)," "channel(s)", and "channel system(s)" are used to describe various communication methodologies of the instant invention and are not intended to uniquely designated a particular entity and a particular programmed system as being only the source/source system or the channel/channel system. Consequently, for purposes of this description, the particular entity and the particular programmed system can be the source/source system and the channel/channel system based on the specific functions(s) that the particular entity and the particular programmed system perform in accordance with the communication methodologies of the instant invention.

In some embodiments, the terms "rule" and "rules," as referenced herein, are directed to relationships and/or interactions between senders, sources, recipients, and/or channels. In some embodiments, rules take the form of one or more processing rules, one or more characteristics, and/or one or more attribute of an entity or system. For example, various aspects of the instant invention include channel rules that are directed to rules concerning the channels. Also, various aspects of the instant invention include source rules that are directed to rules concerning the sources. Also, various aspects of the instant invention include sender rules that are directed to rules concerning the senders. In addition, various aspects of the instant invention include recipient rules that are directed to rules concerning the recipients.

In some embodiments, the specifically programmed system(s)/platform(s) of the instant invention incorporate at least 10 rules. In some embodiments, specifically programmed system(s)/platform(s) of the instant invention incorporate at least 100 rules. In some embodiments, specifically programmed system(s)/platform(s) of the instant invention incorporate at least 1000 rules. In some embodiments, specifically programmed system(s)/platform(s) of the instant invention incorporate at least 10,000 rules.

In some embodiments, the terms "recipient rule" and "recipient rules," as referenced herein, are directed to rules that define/identify characteristics of set by the recipients about themselves and/or the recipients' rules in regards to channels, distribution types and/or the senders.

In some embodiments, the terms "sender rule" and "sender rules," as referenced herein, are directed to rules that define/identify which channel rules the senders require to be supported and the recipient rules the senders are willing to support.

In some embodiments, the terms "recipient rule" and "recipient rules," as referenced herein, are directed to rules that define/identify characteristics of set by the recipients about themselves and/or the recipients' rules in regards to channels, distribution types and/or the senders.

In some embodiments, the terms "distribution" and "distributions," as referenced herein, are directed to a piece of information or data that needs to be electronically sent/transmitted. In some embodiments, the distributions are characterized/classified based, at least in part, on one or more of the following distribution types, but are not limited to: communications, rules, data, transactional messages, and etc.

In some embodiments, the specifically programmed system(s)/platform(s) of the instant invention allow to minimize complexity and/or costs associated with integrating new sources by senders.

In some embodiments, the specifically programmed system(s)/platform(s) of the instant invention form at least one electronic communication exchange mediating network(s) of the senders, the recipients, the sources and the channels (the mediated exchange model). In some embodiments, an illustrative electronic communications exchange of the instant invention is an integrated network of the senders, the recipients, the sources and the channels that allows for the delivery of information based upon rules defined by the recipient(s) and supported channel(s) defined by the sender(s). In some embodiments, the illustrative electronic communications exchange of the instant invention (also referenced herein as "the exchange") allows the senders to send distributions to the recipients without having prior knowledge to where to send the distribution to, and the recipients can set rules that alert the senders and the exchange to information about themselves (the recipients), including, but is not limited to, where the recipients would like to receive distributions, and the structure of those distributions.

In some embodiments, the exchange allows the senders to send distributions to the recipients when the senders know an electronic address of a recipient and the exchange is specifically programed in accordance with the instant invention to determine that such address is no longer valid. In cases of invalid addresses, in some embodiments, the exchange can alert the senders and/or respective channels about the invalid address and/or automatically identify the new address for the intended recipient and re-route the distribution accordingly.

For example, the exchange of the instant invention can be utilized for at least one of the following applications:
 i) Use Case 1—Distribution of Mail to an individual/entity;
 ii) Use Case 2—Standing Instructions on how to vote on corporate actions/issues; and
 iii) Use Case 3—Distribution of Data to an institution (e.g., brokerage, institutional shareholder, etc.).

In some embodiments, the exchange of the instant invention ensures that the channels agree to the set of rules that the sender(s) has/have required.

In some embodiments, an illustrative electronic communications exchange of the instant invention allows for the delivery of distributions based, at least in part, upon rules defined by the recipient(s) and/or the sender(s) and supported by the channel(s) and/or source(s).

In some embodiments, the illustrative electronic communications exchange of the instant invention allows the senders to send distributions to the recipients without having a prior knowledge as to where to send the distribution. In some embodiments, the illustrative electronic communications exchange of the instant invention allows the senders to send distributions to the recipients without having a prior knowledge as to where to send the distribution and while ensuring compliance with the rules set/defined by sources, channels, and/or the recipients.

In some embodiments, the illustrative electronic communications exchange of the instant invention allows the recipients to select/define the channels they prefer and/or set/select rules and/or attributes that alert/inform the illustrative electronic communications exchange of the instant invention to information/data about the recipients, including, but not limited to, what channels the recipients would like to receive the distributions through.

In some embodiments, the illustrative electronic communications exchange of the instant invention is content agnostic, meaning that header information is defined/set ensuring that the information can be delivered to intended recipients but the distributions can be of any format and/or structure. In some embodiments, the illustrative electronic communications exchange of the instant invention mediates the distributions by ensuring that the rules, which are set/selected/defined by the recipients, channels, sources, and/or senders are being followed (e.g., enforced) and that all parties have agreed to set(s) of obligations (e.g., contractual obligations) to adhere to the rules.

Figure 5:
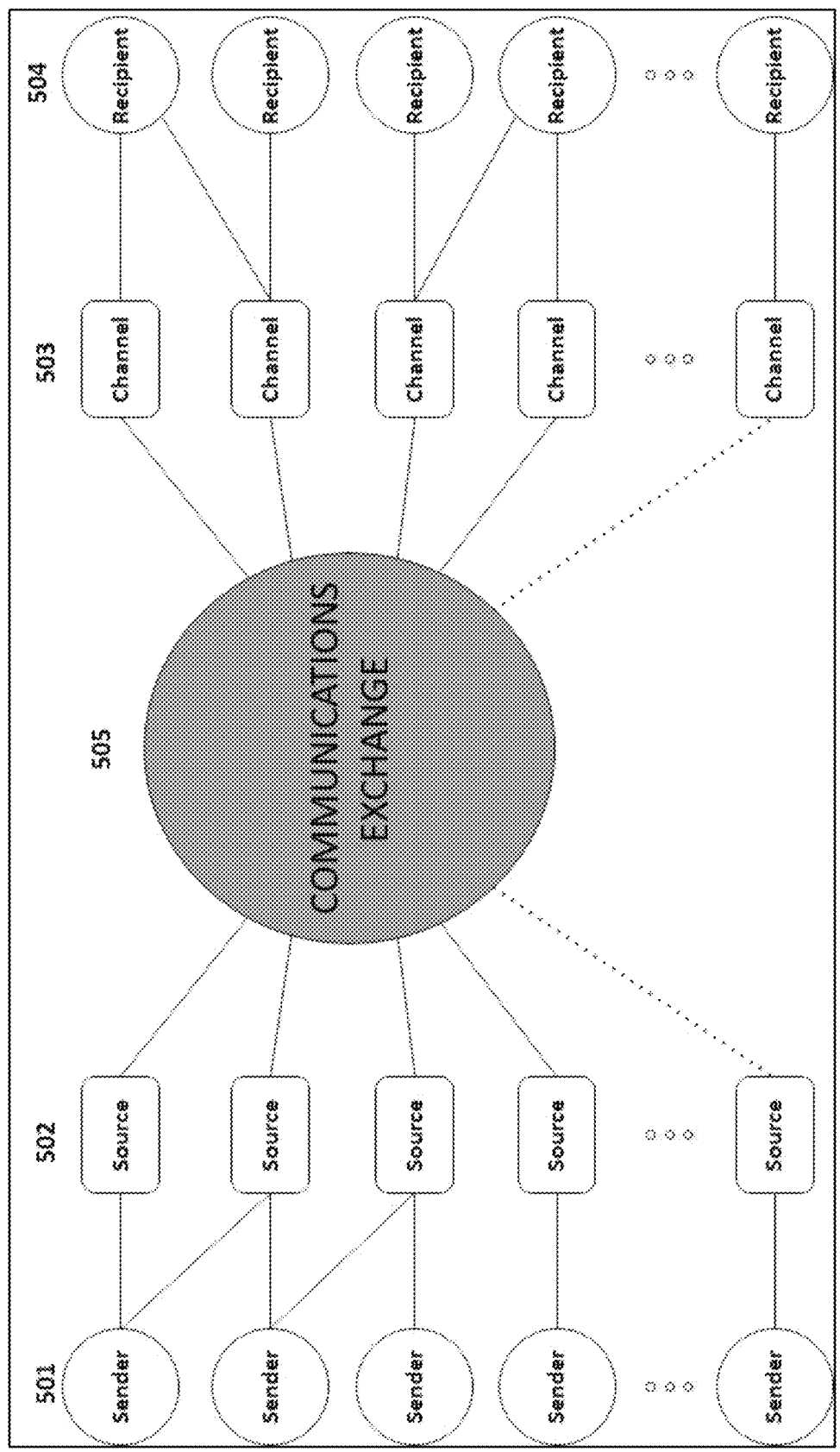
FIGS. 5-27 and 38-41 are flowcharts representative of some embodiments of the present invention.

FIG. 5 illustrates an exemplary arrangement of the illustrative electronic communications exchange of the instant invention, showing various type of on-way and/or two-way relationships between the senders (501), the sources (502), the channels (503), and/or the recipients (504) (e.g., one-to-one, one-to-many, many-to-many) that the an exemplary arrangement of the illustrative electronic communications exchange (505) can mediate. FIG. 5, for example, illustrates that, in some embodiments, the illustrative electronic communications exchange of the instant invention minimizes/reduces the complexity, by pushing the distributions and allowing the existing/future channels to receive the distributions for a host of the senders and/or the recipients.

Figure 6:
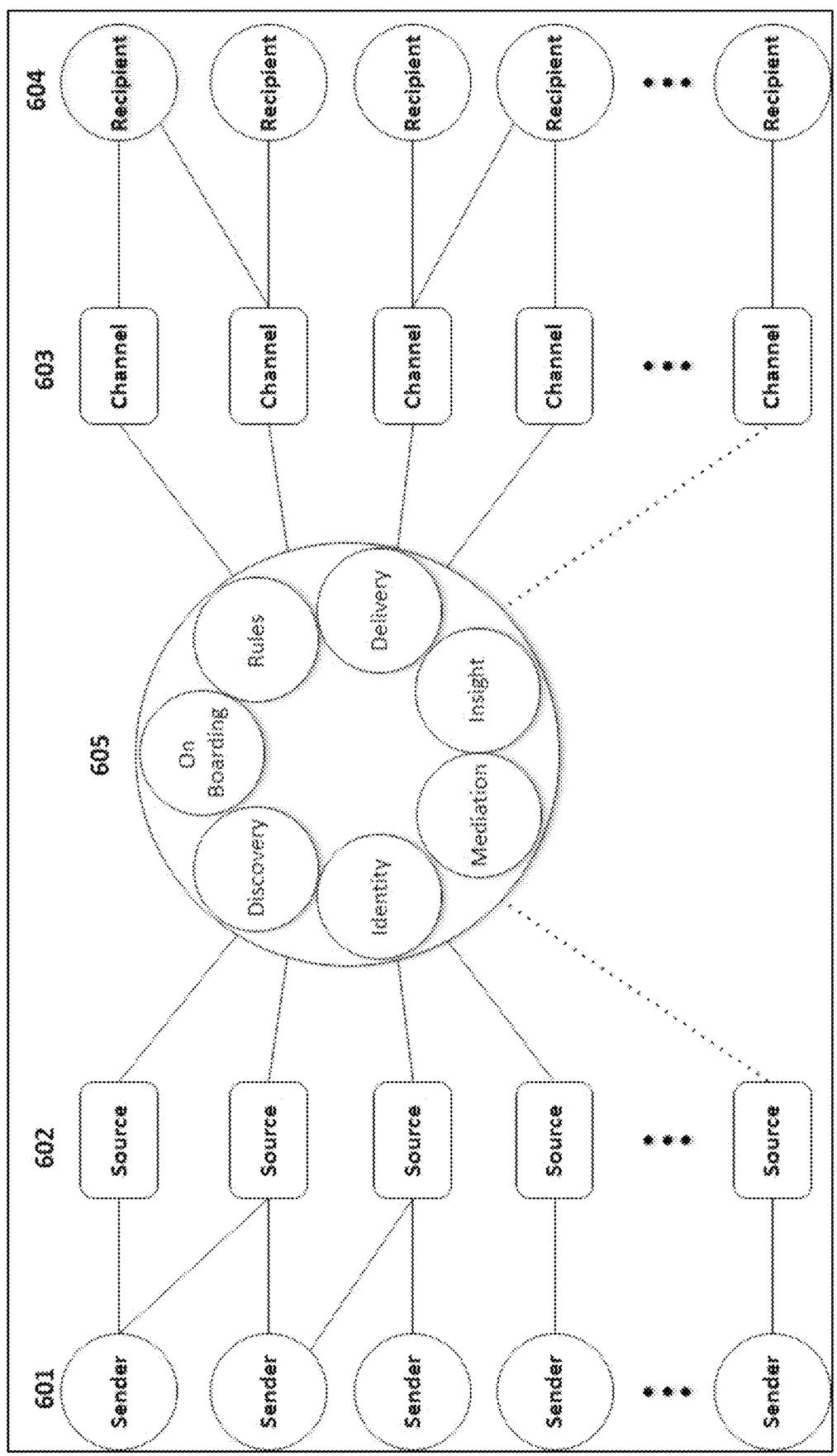

FIG. 6 illustrates an exemplary arrangement of the illustrative electronic communications exchange of the instant invention, showing various type of on-way and/or two-way relationships between the senders (601), the sources (602), the channels (603), and/or the recipients (604) (e.g., one-to-one, one-to-many, many-to-many) that the an exemplary arrangement of the illustrative electronic communications exchange (605) can mediate. FIG. 6, for example, illustrates that, in some embodiments, the illustrative electronic communications exchange of the instant invention minimizes/ reduces the complexity, by pushing the distributions and allowing the existing/future channels to receive the distributions for a host of the senders and/or the recipients.

As shown in FIG. 6, in some embodiments, the illustrative electronic communications exchange of the instant invention can perform at least one or more of the following primary exchange functions:

On Boarding;
Rules;
Discovery;
Delivery;
Insight;
Mediation; and
Identity.

In some embodiments, regarding the "On Boarding" function, each of the senders, each of the sources, each of the recipients, and/or each of the channels can have and/or have to meet one or more onboarding requirements/conditions. In some embodiments, the illustrative electronic communications exchange of the instant invention captures the relevant information and ensures that parties are agreeing to predetermined set(s) of arrangements (e.g., legal contracts, highlighting the rules and/or obligations of being part of the illustrative electronic communications exchange of the instant invention.)

In some embodiments, the "Rules" functionality identifies numerous processes by which the illustrative electronic communications exchange of the instant invention captures, applies, distributes and/or maintains the sender rules, the recipient rules, the source rules, and/or the channel rules.

In some embodiments, the "Discovery" functionality identifies numerous processes by which the illustrative electronic communications exchange of the instant invention identifies relationships between the senders and the recipients, enabling the flow of information. In some embodiments, the relationship(s) between the senders and the recipients are/is not expressly defined/determined and the illustrative electronic communications exchange of the instant invention dynamically determines/identifies those relationships instead.

In some embodiments, the "Delivery" functionality identifies numerous processes by which the illustrative electronic communications exchange of the instant invention delivers the distribution(s) from the sender(s) to the recipient(s) based, at least in part, upon defined (e.g., defined/selected/set by the exchange, the sender(s), the source(s), the recipient(s), and/or channel(s)) rules, etc.

In some embodiments, the "Insight" functionality identifies numerous processes by which the illustrative electronic communications exchange of the instant invention allows the audit trail of activities and/or the reporting that can be developed.

In some embodiments, the "Mediation" functionality identifies numerous processes by which the illustrative electronic communications exchange of the instant invention ensures that the situationally appropriate application of rules defined by the senders and/or the recipients are being applied during interactions between the sources and the channels (e.g., matching rules of the senders and the recipients, and then distributing the distributions accordingly).

In some embodiments, the "Identity" functionality identifies numerous processes by which the illustrative electronic communications exchange of the instant invention ensures that both the sources and the channels are properly validating the identity of the senders and the recipients to the agreed upon level of identity proofing.

In some embodiments, each source and channel performs one or more of the following primary functions:

Publishing,
Storage,
Mediation,
Identity,
Present, and
Audit.

In some embodiments, the "Publishing" functionality identifies numerous processes by which illustrative sources utilize application programming interfaces (APIs) and/or batch interfaces to publish information to the illustrative electronic communications exchange of the instant invention. In some embodiments, the physical integration between the illustrative source and the illustrative electronic communications exchange of the instant invention can occur on the backend, during composition and/or via a printing system.

In some embodiments, the "Storage" functionality identifies numerous processes by which illustrative sources can choose to point to one or more storage repositories of the underlying information (e.g., documents, messages, streaming content, etc.) and/or publish the information through the illustrative electronic communications exchange of the instant invention for storage within the illustrative electronic communications exchange of the instant invention and/or within an illustrative channel.

In some embodiments, the "Mediation" functionality identifies numerous processes by which illustrative sources obtain permission(s) to publish the sender content (e.g., information sent by the sender(s)) through the illustrative electronic communications exchange of the instant invention. In some embodiments, the illustrative sources are responsible for any errors in the sender content that they are providing.

In some embodiments, the "Identity" functionality identifies numerous processes by which illustrative channels ensure the validity of the recipients by performing necessary actions to validate the recipients' identity.

In some embodiments, the "Present" functionality identifies numerous processes by which illustrative channels notify that new communication(s) have/has arrived and the interface by which the recipients are able to view/process the communication(s).

In some embodiments, the "Audit" functionality identifies numerous processes by which illustrative channels provide an interface for accessing audit trail(s)/log(s) by the illustrative electronic communications exchange of the instant invention so as to allow the sender(s) a complete audit trail of the delivery of communication(s).

Examples of Illustrative Methodologies Utilized for the "On Boarding"

In some embodiments, regarding the "On Boarding" function, each of the senders, each of the sources, each of the recipients, and/or each of the channels can have and/or have to meet one or more onboarding requirements/conditions. In some embodiments, the illustrative electronic communications exchange of the instant invention captures the relevant information and ensures that parties are agreeing to predetermined set(s) of arrangements (e.g., legal contracts, highlighting the rules and/or obligations of being part of the illustrative electronic communications exchange of the instant invention.)

In some embodiments, the senders onboard to the illustrative electronic communications exchange of the instant invention via source system(s) to be able to send their distributions to the recipients according to the senders' distribution rules. In some embodiments, the senders can also specify, to the illustrative electronic communications exchange of the instant inventions and/or their respective source(s), services which the senders would like to participate in.

In some embodiments, the source systems onboard to the illustrative electronic communications exchange of the instant invention to provide the distributions it generates/transmits, on behalf of one or more senders, to the illustrative electronic communications exchange of the instant invention.

In some embodiments, the channel systems onboard to the illustrative electronic communications exchange of the instant invention to receive/obtain the distributions, on behalf of the recipients, from the senders via the illustrative electronic communications exchange of the instant invention.

In some embodiments, the recipient onboard to the illustrative electronic communications exchange of the instant invention via the channel(s) to receive distributions from senders according to the recipients' rules.

Illustrative Examples of the Senders' on-Boarding

In some embodiments, the senders onboard to the illustrative electronic communications exchange of the instant invention via the source system(s) to be able to send their distributions to the recipients according to the senders' distribution rules. In some embodiments, the senders also specify/select/define services that they will participate in to the illustrative electronic communications exchange of the instant inventions. In some embodiments, during the onboarding process, the senders can perform at least one or more of the following activities, in one or more predetermined or non-predetermined order:

1) Agree to a Business Exchange Contract which can include, but not limited to, legal terms of the illustrative electronic communications exchange of the instant invention, rules and obligations of each sender and of the illustrative electronic communications exchange of the instant invention (also, referenced herein as "the exchange");

2) Define which services to use from the exchange which can include, but is not limited to, one or more of the following: Rule exchange, Discovery, Delivery, and/or Insight;

3) Define distribution rules (e.g., sender rules) which can include one or more conditions to be respected by the exchange and any channel in the delivery of the distributions to recipient(s) such as, but not limited to, the rules needed from the recipient(s), how the recipient(s) are/is authenticated and/or identified, a level of security needed for the delivery, a storage of any distribution, support for dual distribution, etc.;

4) Define Sender's Identify which can include, but is not limited to, how particular sender(s) will be presented and identified to the channel(s) and/or other sender(s) on the exchange (e.g., but not limited to the sender's name, logo, contact information, and/or other information that may help particular recipient(s) to identify/recall the sender);

5) Define Sender's Distribution Types which can include the distribution types (e.g., -mail (e.g., MIME), streaming media, XML objects, FIX (Financial Information eXchange) data, FAST (FIX Adapted for Streaming) data, etc.) that particular sender(s) will be providing to the exchanges (via the source systems);

6) Provide historical information which can include, but is not limited to, previous distributions to the recipients, information about previous distributions, information about previous recipients to enable services of the exchange; and 7) Designate one or more sources which can include, but is not limited to, identifying the source system(s) that will be providing the distributions for and/or from particular sender(s).

In some embodiments, particular source(s) could be the sender(s) themselves/itself. In some embodiments, the instant invention can assume that relationship(s) exist(s) between the sender(s) and the source(s) separately from the particular sender's relationship with the exchange.

Illustrative Examples of the Sources' On-Boarding

In some embodiments, the sources onboard to the illustrative electronic communications exchange of the instant invention to provide the distributions the sources produce (on behalf of one or more senders) to the illustrative electronic communications exchange of the instant invention. In some embodiments, during the onboarding process, the sources can perform at least one or more of the following activities, in one or more predetermined or non-predetermined order:

1) Agree to a Business Exchange Contract which can include, but is not limited to, the legal terms of the exchange, including rules and obligations of the source system(s) and of the exchange (in some embodiments, the instant invention assumes that there is a relationship between the senders and the source(s) separately from the relationship between i) the source(s) and/or the senders and ii) with the exchange);

2) Define the header format of Distributions which can include, but is not limited to, defining the data format for the header information of the distributions that will be sent via the exchange;

3) Define Security protocols which can include, but is not limited to, defining the security protocols for the transmission of data between the source system(s) and the exchange, including (but is not limited to) authentication, identification, and/or encryption for both data and transport mechanisms;

4) Establish connectivity to Exchange which can include, but is not limited to, establishing technical connectivity between the source system(s) and the exchange; and 5) Provide historical information which can include, but is not limited to, at the sender's or senders' request(s), provide the exchange with any historical information needed to enable exchange services that the sender(s) wish(es) to use.

Illustrative Examples of the Channels' On-Boarding

In some embodiments, the channels onboard to the illustrative electronic communications exchange of the instant invention to receive the content (on behalf of the Recipient(s)) from the senders via the illustrative electronic communications exchange of the instant invention. In some embodiments, during the onboarding process, the channels can perform at least one or more of the following activities, in one or more predetermined or non-predetermined order:

1) Agree to a Business Exchange Contract which can include, but is not limited to, the legal terms of the exchange, including rules and obligations of the channel system(s) and of the exchange;

2) Define the header format of Distributions which can include, but is not limited to, defining the data format for the header information of the distributions that will be sent via the exchange;

3) Define channel capabilities which can include, but is not limited to, various capabilities the channel(s) can support in the delivery of the distributions to the recipient(s); such capability as, but not limited to, the rules collection, how the recipient(s) is/are authenticated and/or identified, the level of security supported, the storage of distribution and/or support for dual distribution;

4) Define Security protocols which can include, but is not limited to, defining the security protocols for the transmission of data between the channel system(s) and the exchange, including (but is not limited to) authentication, identification, and/or encryption for both data and transport mechanisms;

5) Establish connectivity to Exchange which can include, but is not limited to, establishing technical connectivity between the source system(s) and the exchange; and 6) Add the sender(s) to channel(s) which can include, but is not limited to, exposing the sender(s) identity(ies) to the channel(s).

Illustrative Examples of the Recipients' On-Boarding

In some embodiments, the recipients onboard to the illustrative electronic communications exchange of the instant invention via the channel(s) to receive distributions according to the recipients' rules. In some embodiments, during the onboarding process, the recipients can perform at least one or more of the following activities, in one or more predetermined or non-predetermined order:

1) Agree to a Business Exchange Contract which can include, but not limited to, legal terms of the illustrative electronic communications exchange of the instant invention, rules and obligations of the channel system(s) and of the exchange (in some embodiments, the instant invention assumes that there is a relationship between the recipients and the channel(s) separately from the relationship between i) the channel(s) and/or the recipients and ii) with the exchange);

2) Verify Identify which can include, but is not limited to, providing information to verify the recipient's identity (in some embodiments, the instant invention assumes that the authentication has been established by the channel and the recipient); and 3) Establish rules which can include, but is not limited to, establishing rules for the receipt of distributions such as, but is not limited to: i) general rule(s), applying to (a) all senders, (b) all channels, and/or (c) all distribution types; ii) specific rule(s), applying to (a) a single sender, (b) a single channel and/or (c) a single distribution type, or any combination of i)(a) to ii)(c).

Figure 7:
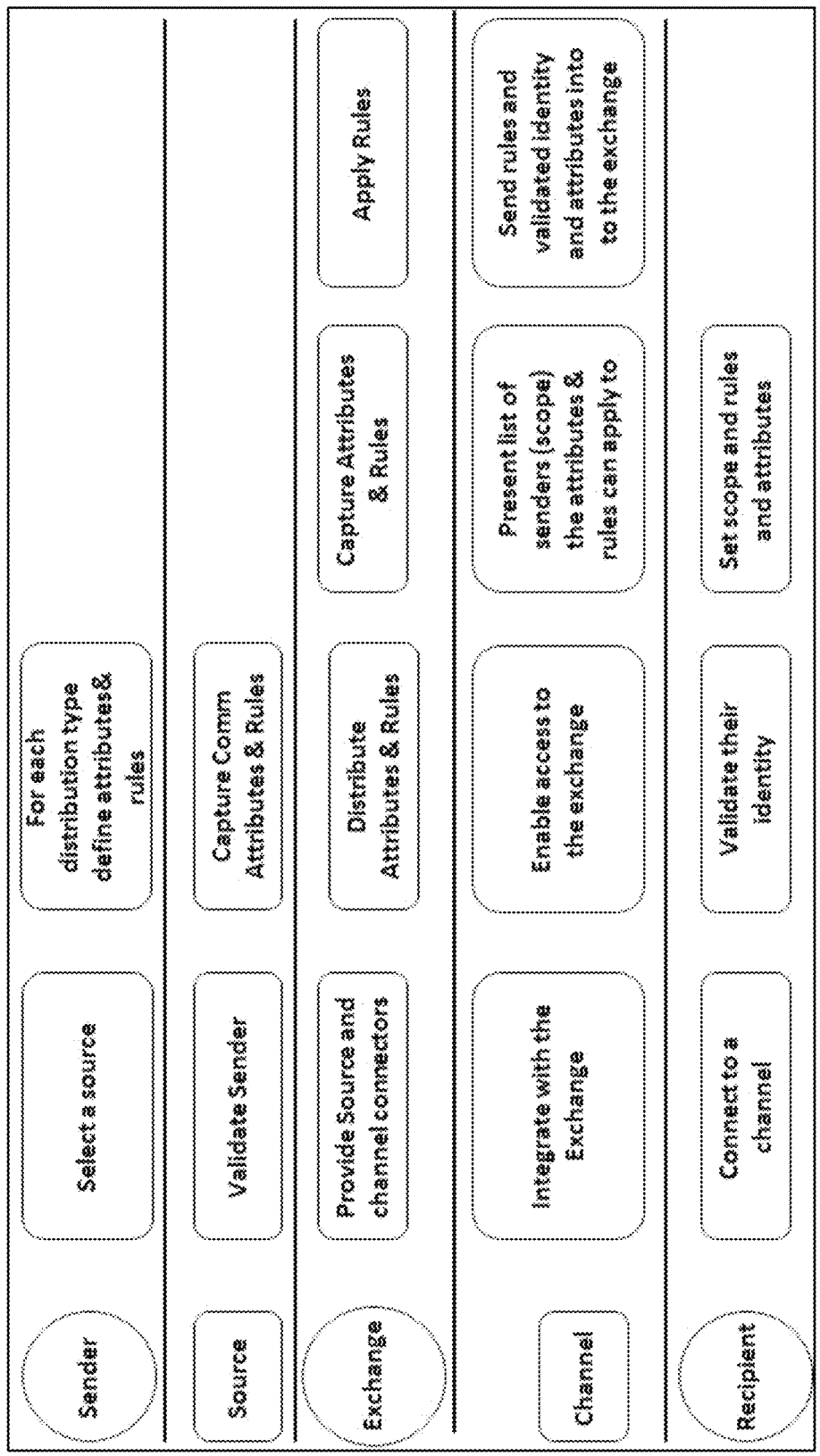

FIG. 7 illustrates illustrative processes that, in some embodiments, the illustrative electronic communications exchange of the instant invention can utilize for capturing, applying, distributing, and/or maintaining the sender attributes and/or rules, and/or the recipient attributes and/or rules in accordance with some embodiments of the instant invention.

As FIG. 7 shows, in some embodiments, the illustrative electronic communications exchange of the instant invention can mediate capturing, applying, distributing, and/or maintaining rules among parties in accordance with at least the following:

Senders: the sender attributes and/or rules define/identify the rules by which distributions can be delivered, —for example, in some embodiments, the sender rules may include, but are not limited to, supported channel(s), enabled source(s), identity validation and consent (e.g., legal consent) requirement(s), timing of delivery, etc.; in some embodiments, the sender rules may be also set for a specific distribution type, across a category of distribution types, or across all distribution types;

Sources: the source systems integrate with the illustrative electronic communications exchange of the instant invention to capture the sender rules as well as defining the source system rules regarding the types of distributions enabled through the source system(s);

Exchange: the illustrative electronic communications exchange of the instant invention facilitates the capturing of the sender rules and/or the recipient rules through the source(s), channel(s) and/or administrative interface(s), ensuring that all rules are being followed during the delivery process and distributing appropriate rule information to the senders, the recipients, the sources and the channels;

Channels: the channels integrate with the illustrative electronic communications exchange of the instant invention to capture the recipient rules and/or broadcast, to the exchange, channel-specific rules defining at least one of the type(s) of distributions that can be supported, delivery timing capabilities, validation capabilities (e.g., identity verification), etc.; and Recipients: the recipient rules can define/identify/select at least one of: the channel(s) that the recipients would like to use, the type of communications/distributions that the recipients would like to distribute, validation information, etc.; in some embodiments, the recipients may set rules for at least one of: a distribution type, a single sender, across an industry, and/or universally.

Figure 8:
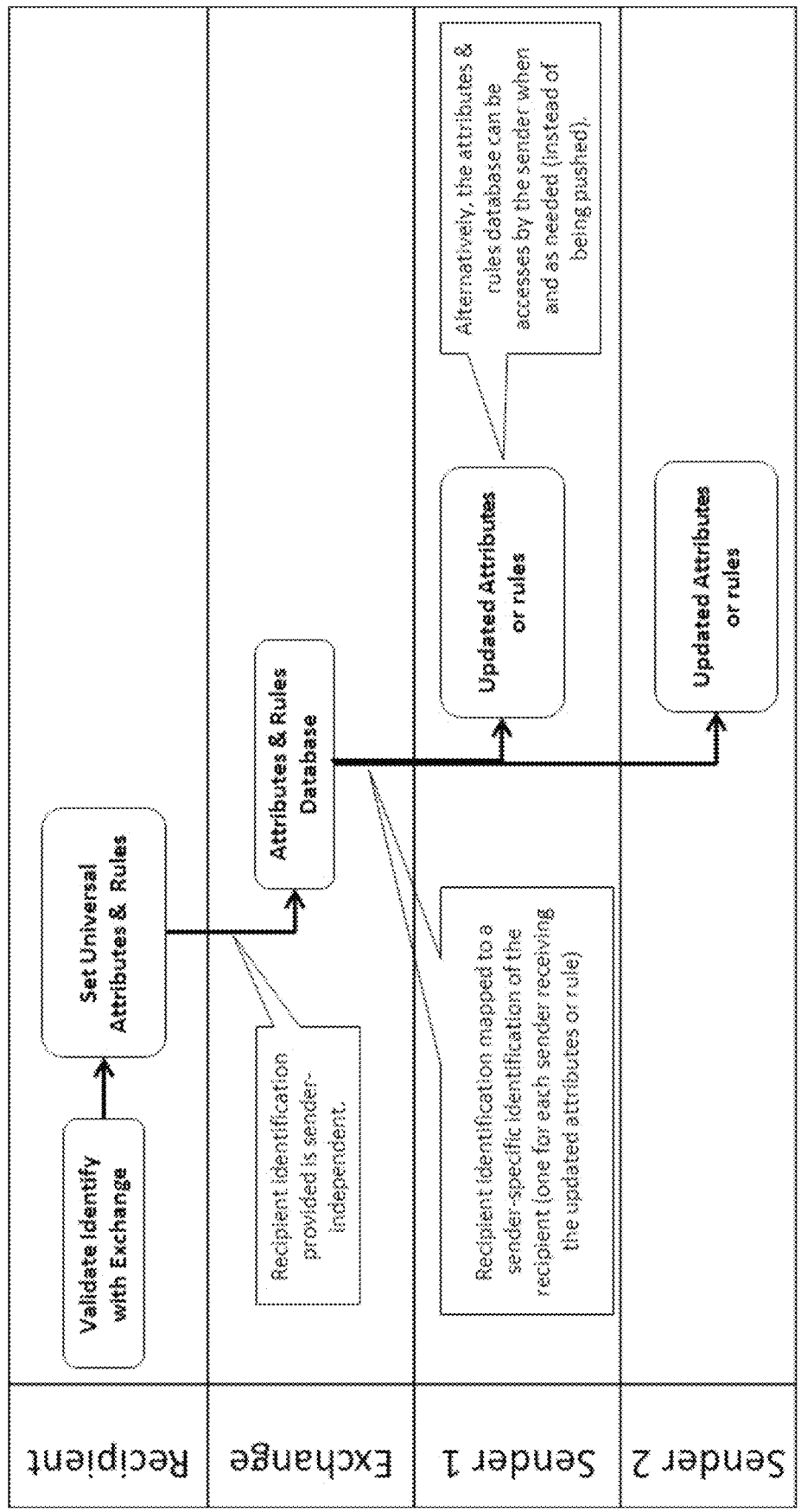

FIG. 8 illustrates illustrative processes associated with capturing, applying, displaying, distributing, and/or maintaining the recipient attributes and/or rules concerning the exchange's functionalities in accordance with some embodiments of the instant invention.

Figure 9:
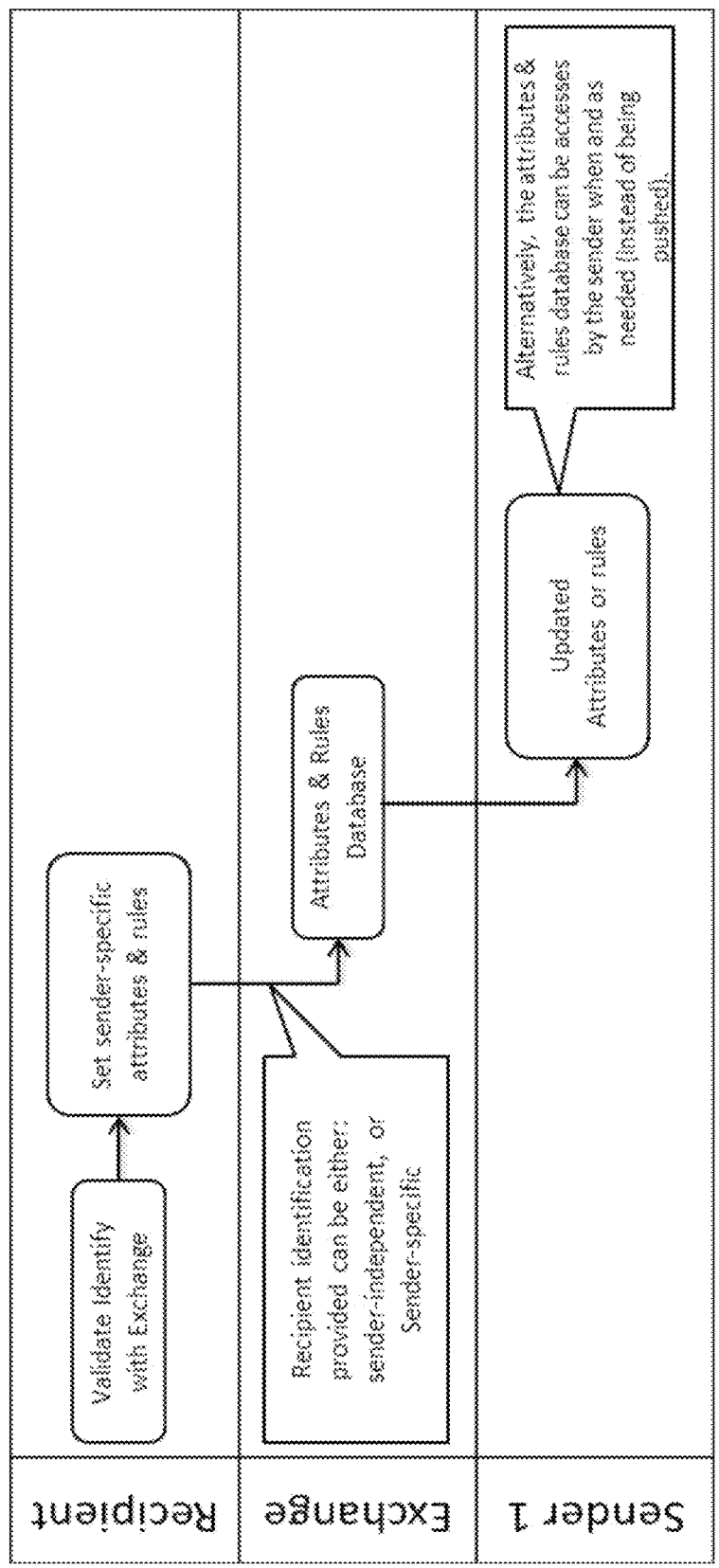

FIG. 9 illustrates illustrative processes associated with capturing, applying, displaying, distributing, and/or maintaining the recipient attributes and/or rules concerning the sender(s) in accordance with some embodiments of the instant invention.

Figure 10:
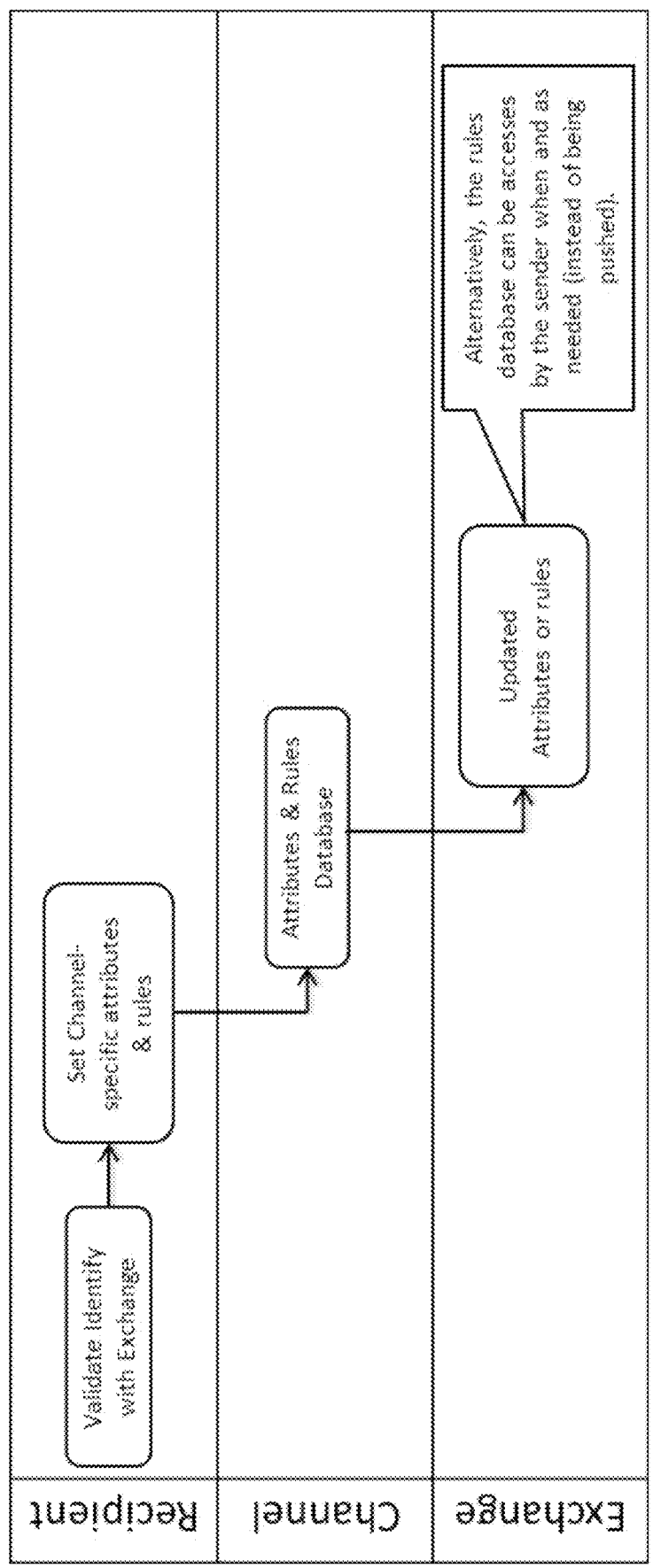

FIG. 10 illustrates illustrative processes associated with capturing, applying, displaying, distributing, and/or maintaining channel-dependent recipient attributes and/or rules in accordance with some embodiments of the instant invention.

Figure 11:
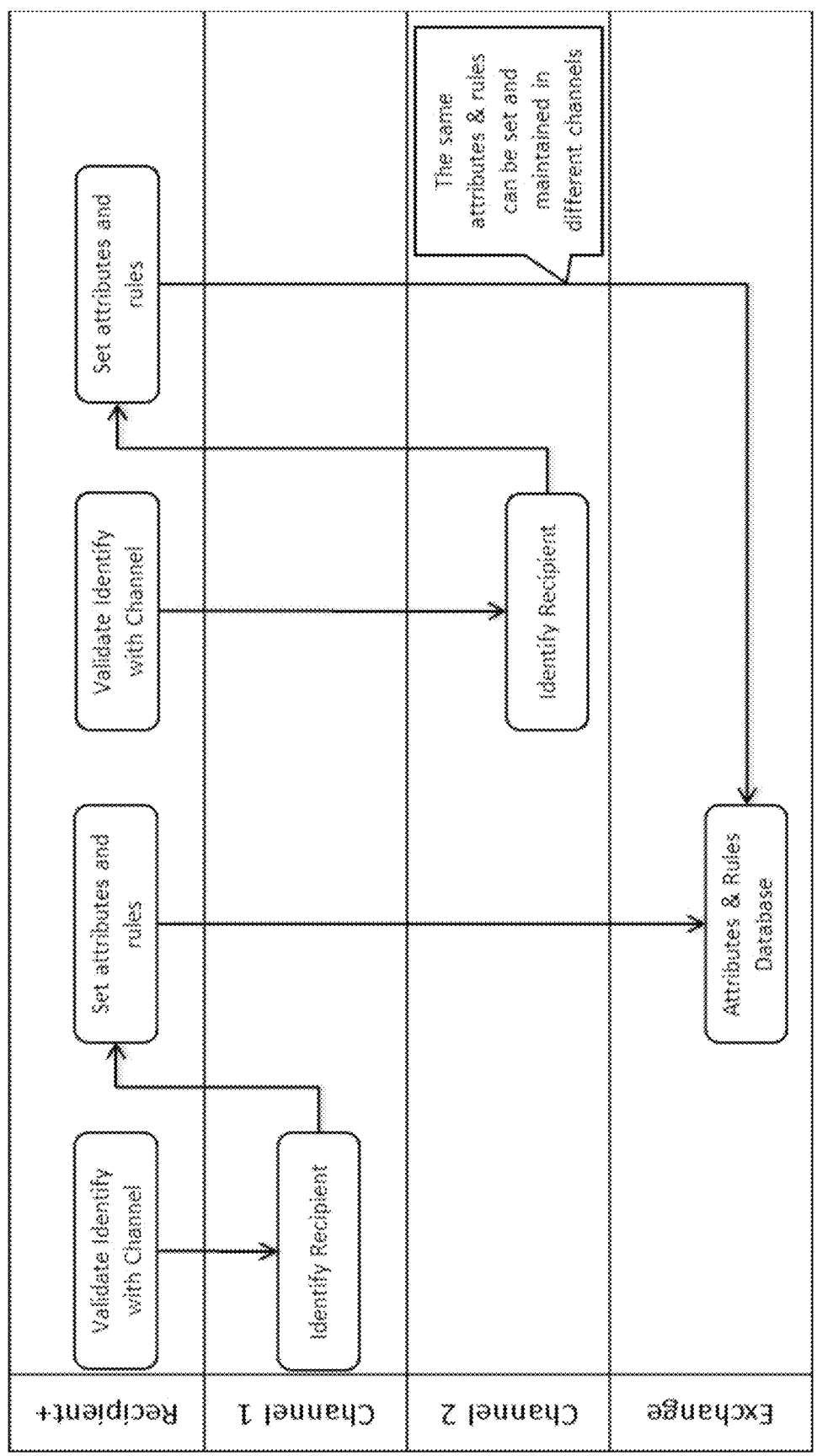

FIG. 11 illustrates illustrative processes associated with capturing, applying, displaying, distributing, and/or maintaining channel-independent recipient attributes and/or rules in accordance with some embodiments of the instant invention.

Figure 12:
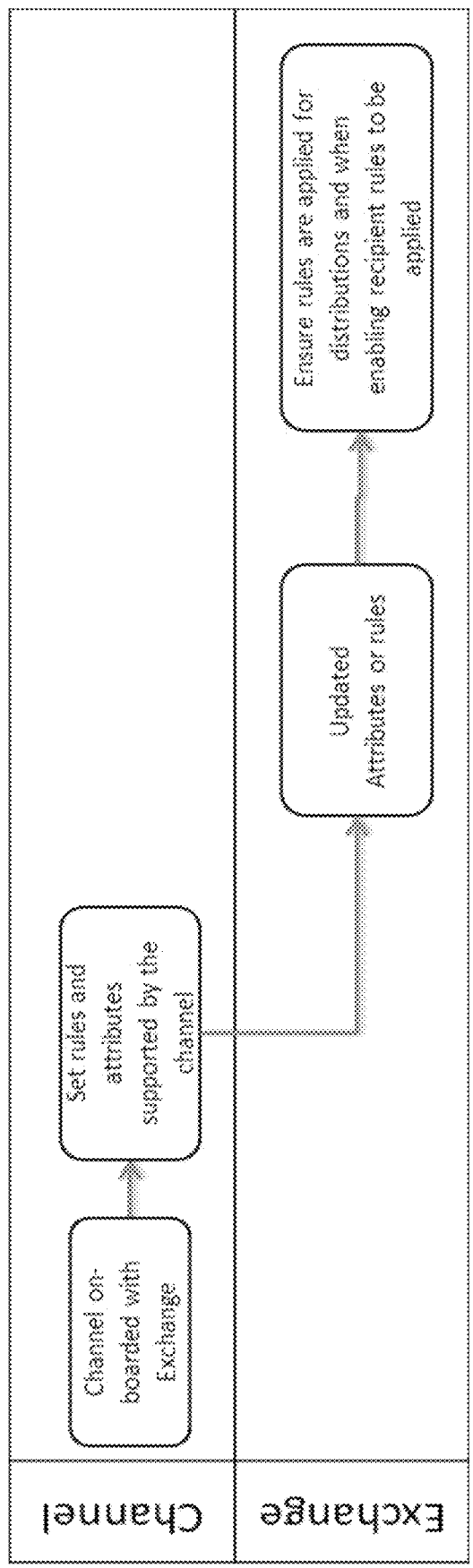

FIG. 12 illustrates illustrative processes associated with capturing, applying, displaying, distributing, and/or maintaining the channel specific attributes and/or rules which define/identify/select the capabilities of the channel(s), including, but is not limited to, the types of distributions supported.

Figure 13:
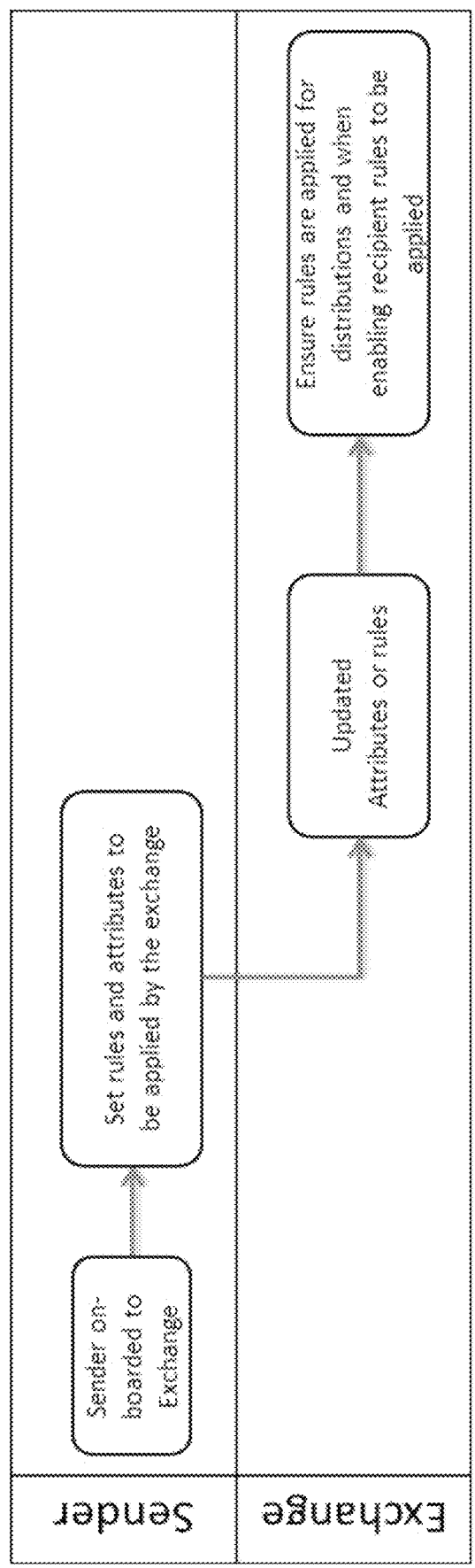

FIG. 13 illustrates illustrative processes associated with capturing, applying, distributing, displaying, and/or maintaining the sender attributes and/or rules which define/ identify/select the rules that the senders would liked to be followed, including, but is not limited to, rules at least about one of what sources the senders are authorizing to send distributions on their behalf, the specifics and/or attributes of a channel that the senders require to enable a particular channel for delivery the distributions.

Figure 14:
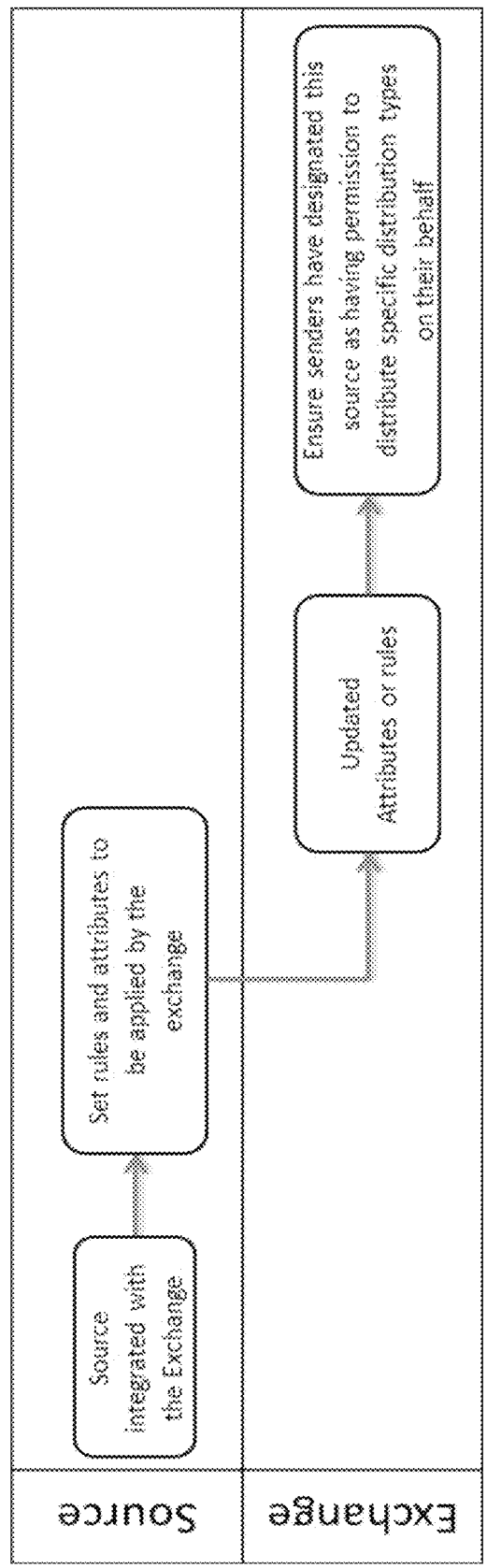

FIG. 14 illustrates illustrative processes associated with capturing, applying, displaying, distributing, and/or maintaining the source specific attributes and/or rules which define/identify/select the capabilities of the source(s), including, but is not limited to, the types of distributions supported on behalf of the senders.

Illustrative Examples of Universal Rules & Attributes

In some embodiments, the illustrative electronic communications exchange of the instant invention allows the senders and the recipients at least to set rules and to define the scope of those rules, such that through a single action the recipients and the senders can define one or more rule that will apply across a single sender/channel or any combination of the senders and/or the channels. For example, in some embodiments, through a particular channel, each recipient could set one or more rule(s) to receive client statements (e.g., bank statements, account statements, trade confirmations, other personal information) and define that such recipient would like the rule(s) to apply across at least one of: a distribution type, across an account, across a single sender, across an industry, across all senders available on the exchange, etc. In some embodiments, the illustrative electronic communications exchange of the instant invention allows to simplify the senders experience around defining rule(s).

Illustrative Examples of Consent Capture

Typically, within many industries capturing a rule from a recipient must also include the capturing of a legal consent for the sender to apply that rule. For example, within the brokerage industry after capturing a rule to distribute communications electronically (e.g., account statements, trade confirmations, government mandated materials about investments, etc.), an investor must agree to terms and conditions to legally receive that content through a digital channel. In some embodiments, within the exchange of the instant invention allows to capture the consent by allowing the recipient to set rule(s) and then receive notification(s) that the recipient's consent is also required through a particular channel selected by such recipient.

For example, in some embodiments, if a recipient sets rule(s) to receive statements, from any company that the recipient has one or more relationship(s), through a particular channel, the exchange would initiate an account discovery process to identify such relationship(s). In some embodiments, once such relationship(s) has/have been identified, if a consent is required, the exchange would deliver a message, through the channel, to the recipient, requesting the recipient to agree to the consent language. Once the recipient agrees, such rule(s) would not be applicable.

Illustrative Examples of Discovery of Relationships

In some embodiments, the illustrative electronic communications exchange of the instant invention performs the discovery of relationships which includes, but is not limited to, processes to identify relationships between the senders and the recipients, enabling the flow of information.

In some embodiments, the discovery can be done using, for example, at least one of at least three following approaches, or any combination of these approaches:
 i) Exchange-based discovery,
 ii) Sender-based discovery, and
 iii) Channel-based discovery.

In some embodiments, in all three cases (or in combinations of cases), the discovery can yield at least one of the following results:
 i) suggestion(s) to particular recipient(s) to set rule(s) for distributions from particular sender(s), and
 ii) distribution(s) from such sender(s).

In some embodiments, the result of the discovery process depends, at least in part, on the sender's distribution rules.

Figure 15:
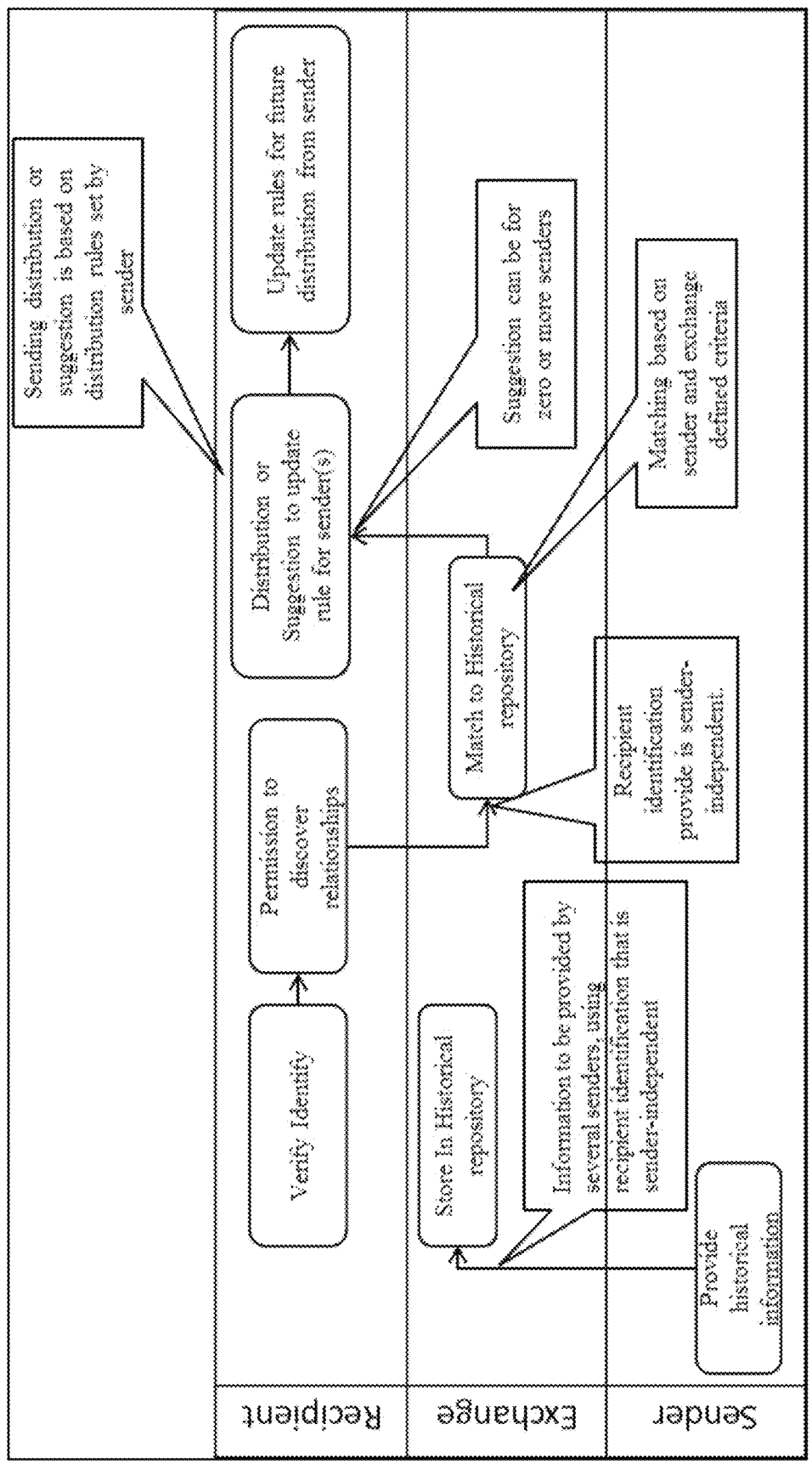

FIG. 15 illustrates exemplary processes for the exchange-based discovery of relationship to identify relationships between the senders and the recipients, enabling the flow of information in accordance with some embodiments of the instant invention.

Figure 16:
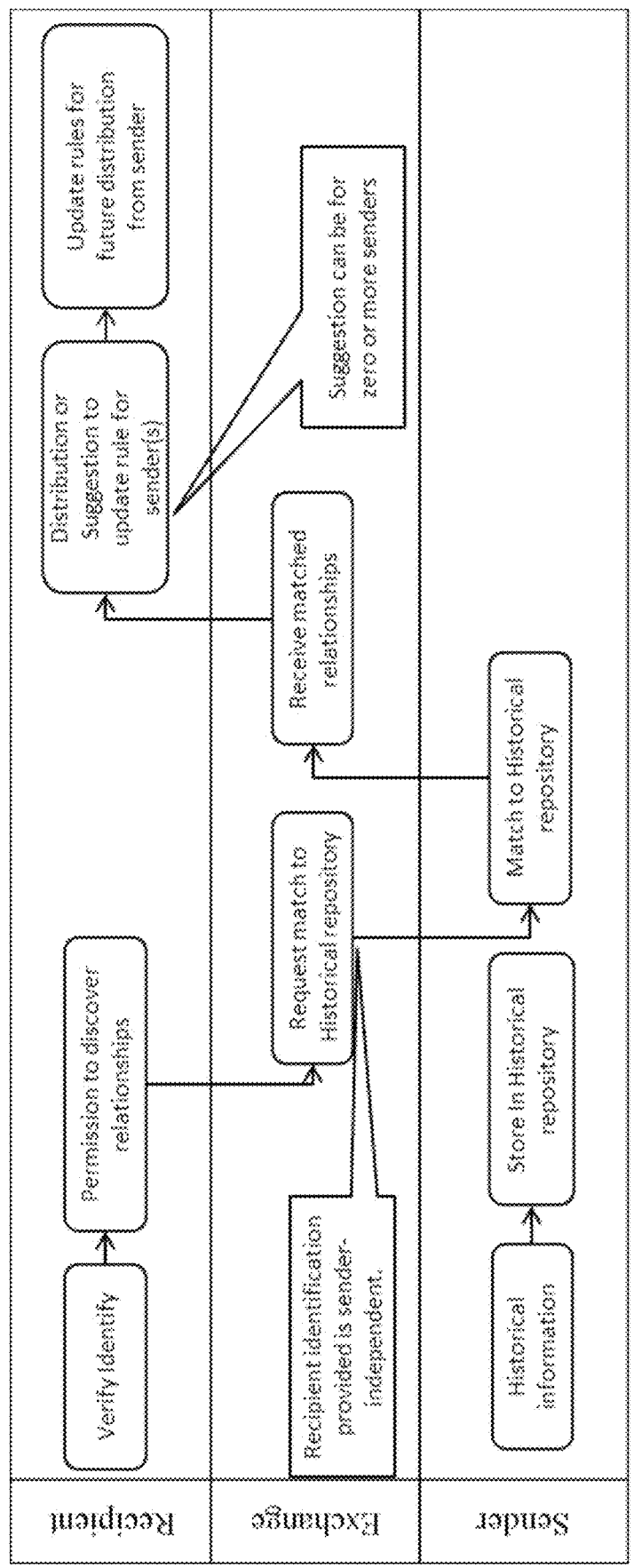

FIG. 16 illustrates exemplary processes for the sender-based discovery of relationship to identify relationships between the senders and the recipients, enabling the flow of information in accordance with some embodiments of the instant invention.

Figure 17:
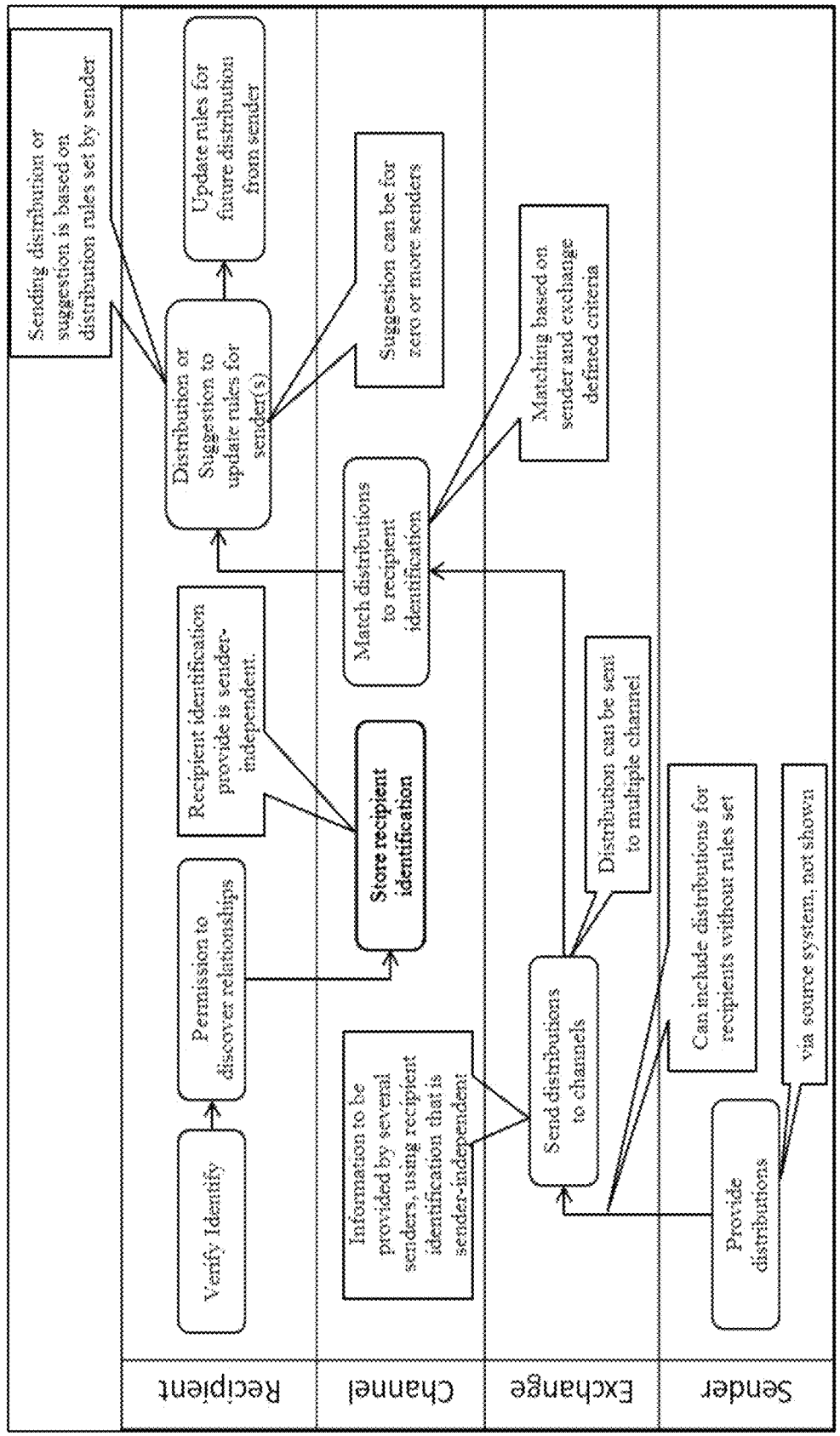

FIG. 17 illustrates exemplary processes for the channel-based discovery of relationship to identify relationships between the senders and the recipients, enabling the flow of information in accordance with some embodiments of the instant invention.

Illustrative Examples of Delivery of Distributions

In some embodiments, the illustrative electronic communications exchange of the instant invention performs the delivery of distributions from the sender(s) to the recipient(s) based, at least in part, upon defined rules.

In some embodiments, the delivery of distributions can be done using at least one of at least three of the following approaches, or any combination of these approaches:
 Exchange-based rules,
 ii) Sender-based rules, and
 iii) Channel-based rules.

In some embodiments, the above illustrative approaches are defined by variations on at least three steps in the distribution process:
 i) applying the sender's distribution rules,
 ii) matching a sender's recipient's identification to a channel's recipient's identification, and
 applying the recipient's delivery rules.

Figure 18:
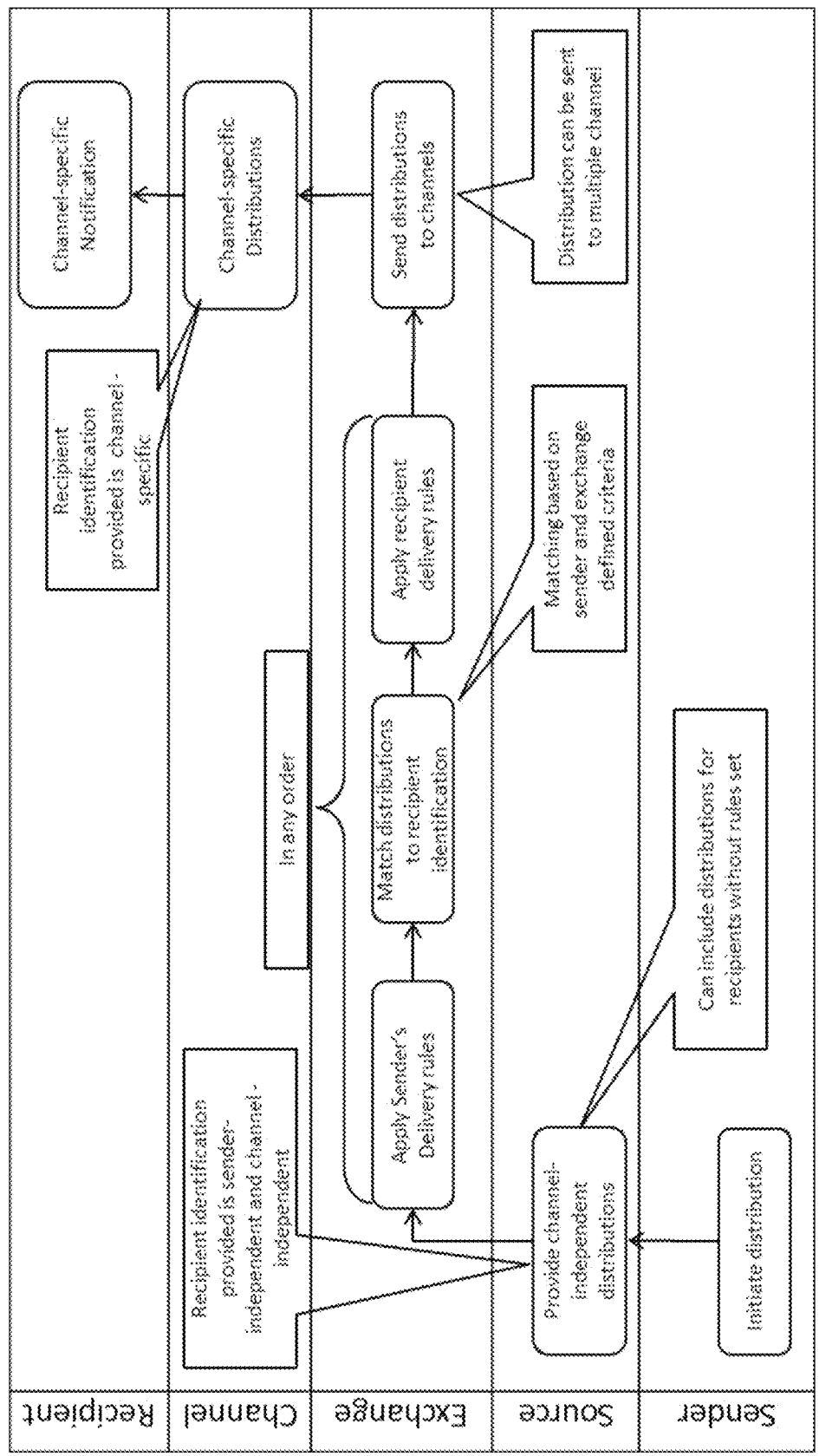

FIG. 18 illustrates exemplary processes, utilizing the exchange-based rules, for delivery of distributions from the sender(s) to the recipient(s) in accordance with some embodiments of the instant invention.

Figure 19:
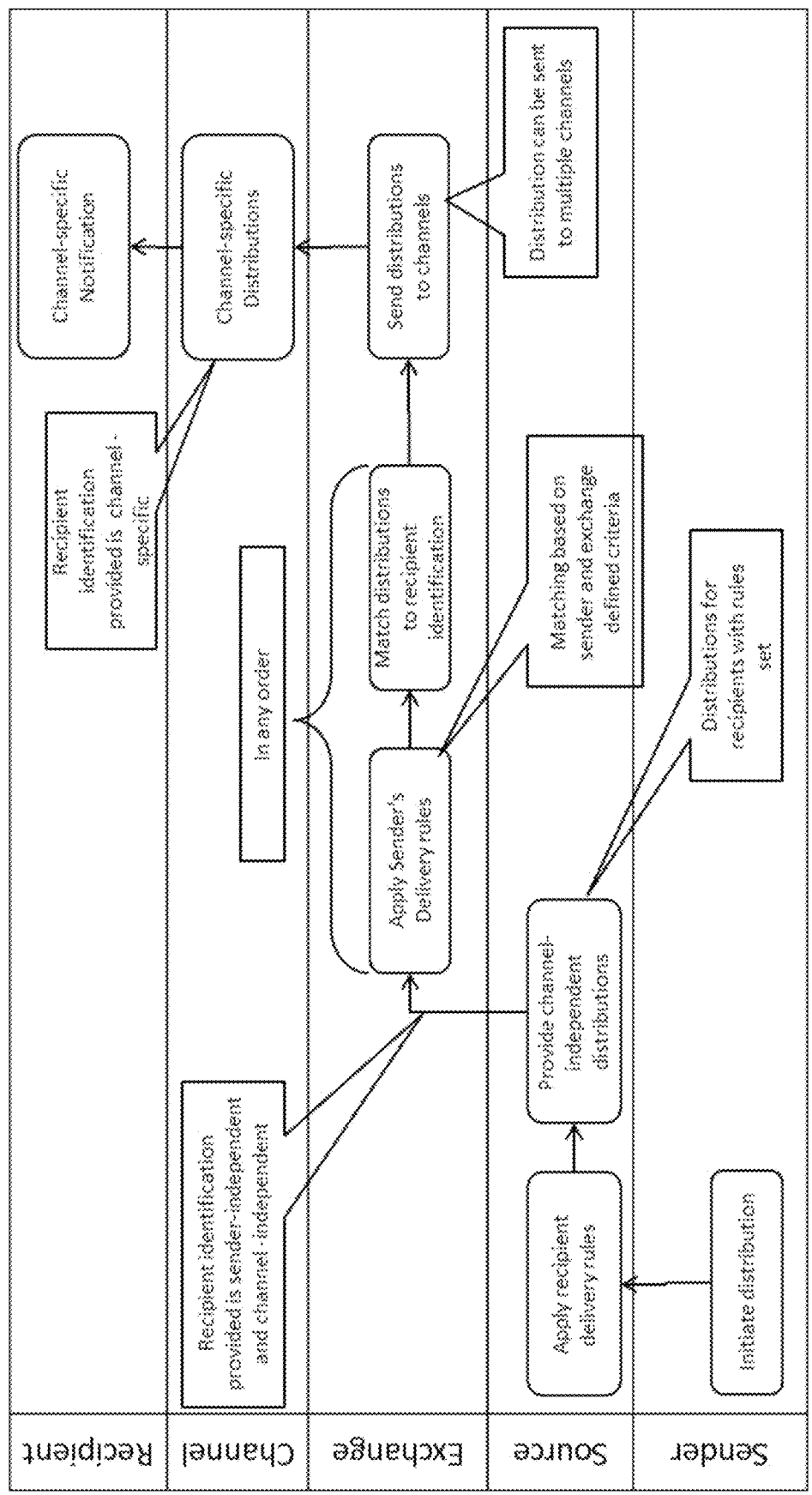

FIG. 19 illustrates exemplary processes, utilizing the source-based rules, for delivery of distributions from the sender(s) to the recipient(s) in accordance with some embodiments of the instant invention.

Figure 20:
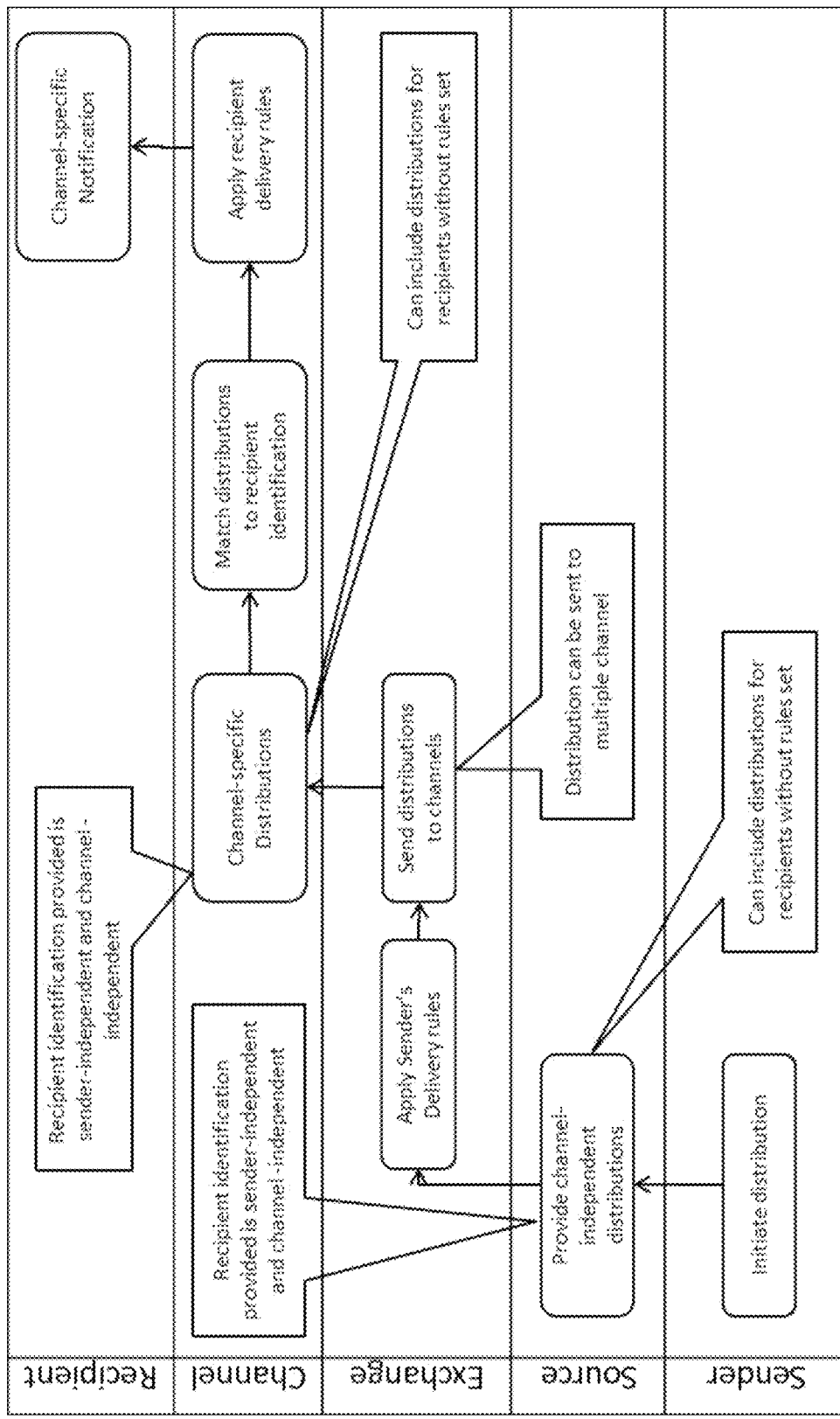

FIG. 20 illustrates exemplary processes, utilizing the channel-based rules, for delivery of distributions from the sender(s) to the recipient(s) in accordance with some embodiments of the instant invention.

Illustrative Examples of Insight Functionality

In some embodiments, the illustrative electronic communications exchange of the instant invention keeps an audit trail as the distributions flow through the exchange, such audit trail can include, but is not limited to, updates to rules and attributes, and other changes that occurs with and/or caused by the recipients, the senders, the channels, the exchange, and/or the sources. In some embodiments, through the integration with the channel(s), the exchange updates/matches/validates the exchange collected data. In some embodiments, the illustrative electronic communications exchange of the instant invention allows the senders to gain insight into the delivery of their distributions. For example, the audit trail data and/or the audit trail data enriched with data provided by various channels and/or sources can be used to provide at least one of the following, but is not limited to:
 i) comprehensive audit trail of distributions, useful, for example, to demonstrate regulatory compliance and/or delivery;
 ii) insight into how the recipients are, for example, using the communications they receive;
 iii) allowing the senders to perform anonymous analysis, utilizing various analytical tools, to determine, for example, which components of the distribution are most interesting to the recipients; and
 iv) determining how to integrate communications and/or combine content effectively for various classes of the recipients; and
 v) performing other suitable reporting and/or analysis.

Figure 21:
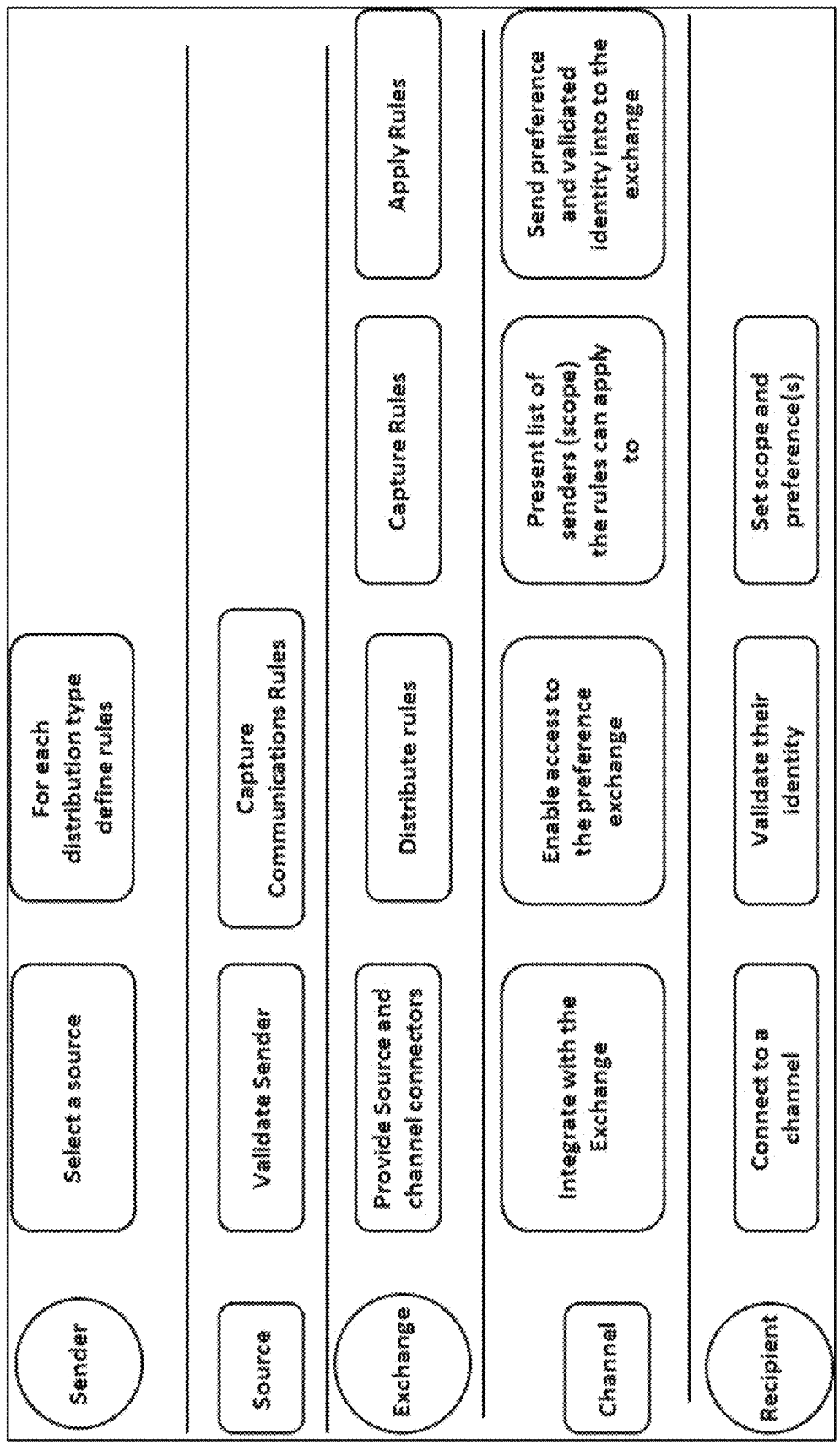

FIG. 21 illustrates exemplary audit trail activities and reporting capabilities in accordance with some embodiments of the instant invention.

Illustrative Examples of Rules Utilized by the Instant Invention

In some embodiments, the sender(s) set/select/define at least one or more rules regarding at least the following categories associated with the senders, but are not limited to:
Identifiers;
Identity Validation Level;
Rule capture;
Consent capture:
at least language;
Per Distribution types, at least one or more of the following parameters:
Name
Delivery requirements (e.g., timeframe, etc.)
Valid Source(s); and
Legal language acceptance.

In some embodiments, the sender(s) set/select/define at least one or more rules regarding at least the following categories associated with the recipients, but are not limited to:
Validated Identity;
Capture rules, such as, but is not limited to:
Channel per distribution type; and
Consent.

In some embodiments, the sender(s) set/select/define at least one or more rules regarding at least the following categories associated with the sources, but are not limited to:
Validation of their identity;
Agreement to rules of the exchange; and
Agreement on Identifiers (e.g., header identifies to be used).

In some embodiments, the sender(s) set/select/define at least one or more rules regarding at least the following categories associated with the channels, but are not limited to:
Validation of the identity;
Agreement to the rules of the exchange;
Delivery rules they are willing to support; and
Pricing Model.

Illustrative Examples of Binding of Rules

In some embodiments, the late binding of rules ensures that recipient rules are being followed and that the channel designated for delivery has agreed to rules defined by the sender(s), such as, but is not limited to, at least one of:
i) channel must agree to validating the identity of the recipient;
capturing the recipient's rules;
capturing a specific consent and/or common consent;
maintaining an audit trail; and
pricing of x amount or less than x amount Illustrative Examples of Appling the Instant Invention: Newsstand Application Channel In some embodiments, the instant invention is utilized in the form of an application that would be made accessible to the end consumer through the newsstand or app stores that power the distribution of software to digital devices. In some embodiments, a newsstand application in accordance with the instant invention can include components that provide one of or more of at least the following capabilities:
Identity Management—a component that verifies and ensures the identity of the end user;
Rule Management—a component that captures delivery rules at the consumer level vs. the account level regarding the format(s) and/or channel(s) to use (e.g., the recipients to use the delivery rules to communicate with firms that the recipients have relationships with);
Account Matching—a component that matches verified identities of recipients and/or the sender(s) with their existing financial services accounts;
Consent Management—a workflow component that captures appropriate legal consents to enable the distribution of communications digitally;
Notifications—a notification component that distributes notifications containing meta data highlighting the availability of a new communication to the end user through the Newsstand application;
Document Retrieval—a retrieval component that retrieves the underlying document(s)/communication(s) stored within distributed and/or centralized data bases for purposes of presentation within the Newsstand application; and
Presentation—a presentation component that presents the underlying communication(s) within the Newsstand application.

In some embodiments, the newsstand application can reside on a consumers tablet device.

In some embodiments, the newsstand application includes programmable interface(s) or web service based interfaces that a user can utilize in accordance with principles of the instant invention.

Figure 22:
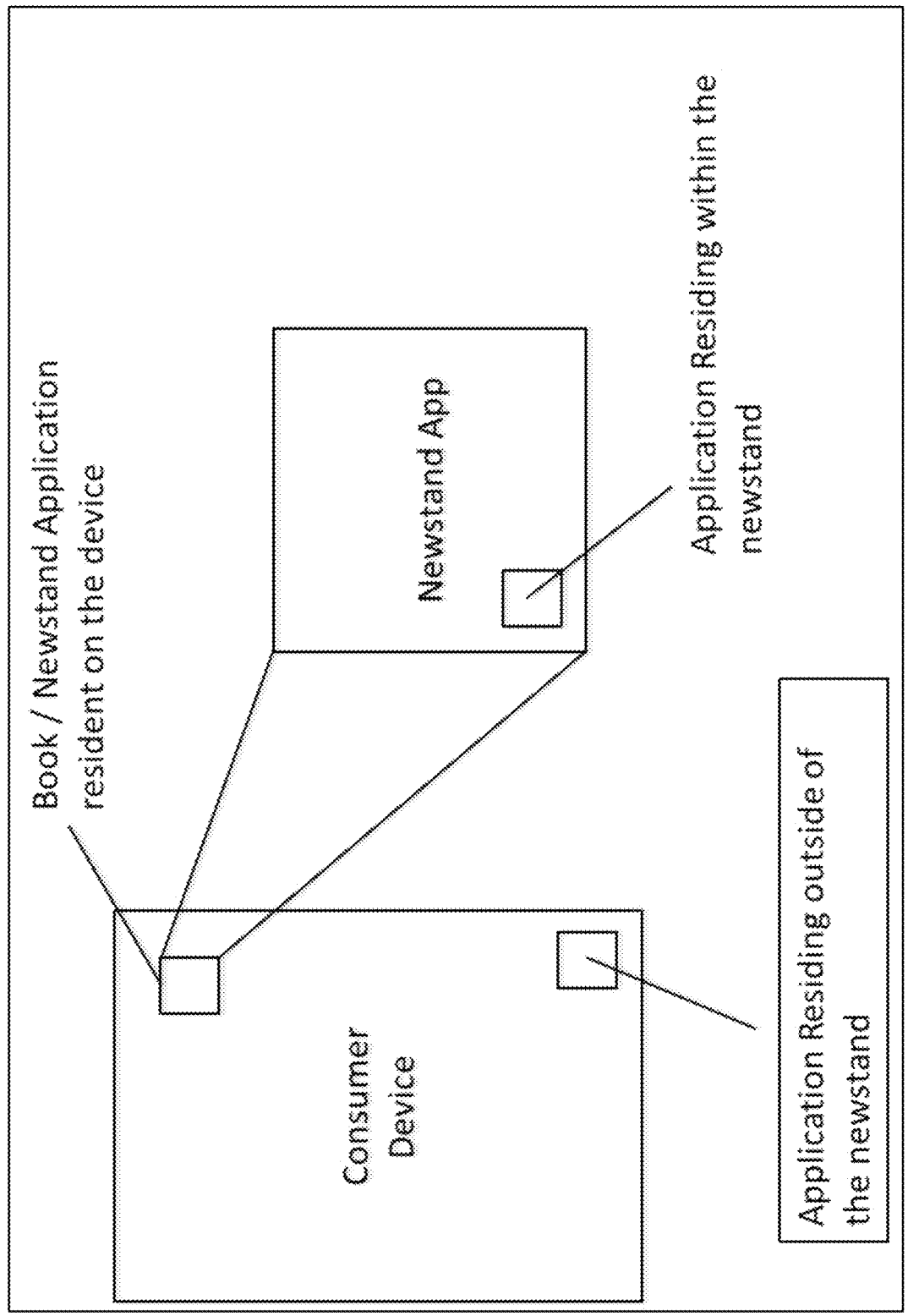

In some embodiments, consumer installs the application by selecting the app through the devices app store or newsstand (FIG. 22, for example, shows various illustrative methodologies of accessing the Newsstand app). In some embodiments, a device manufacturer can pre-install the application and makes it available through the newsstand or as a stand-alone application. In some embodiments, the verification process of the instant invention can also be accomplished in one or more of the following ways, but is not limited to:

1) once a user has accessed the application for the first time, the user is asked to provide several pieces of information that can be independently verified, and the verification process then verifies the user's identity based on information provided; and 2) the user receives a separate communication through a regular and/or electronic mail which provides an access code in the form of a URL, QR Code, or other similarly suitable mechanism that allows the user to both access the application and verify the user's identity in one step.

Figure 23:
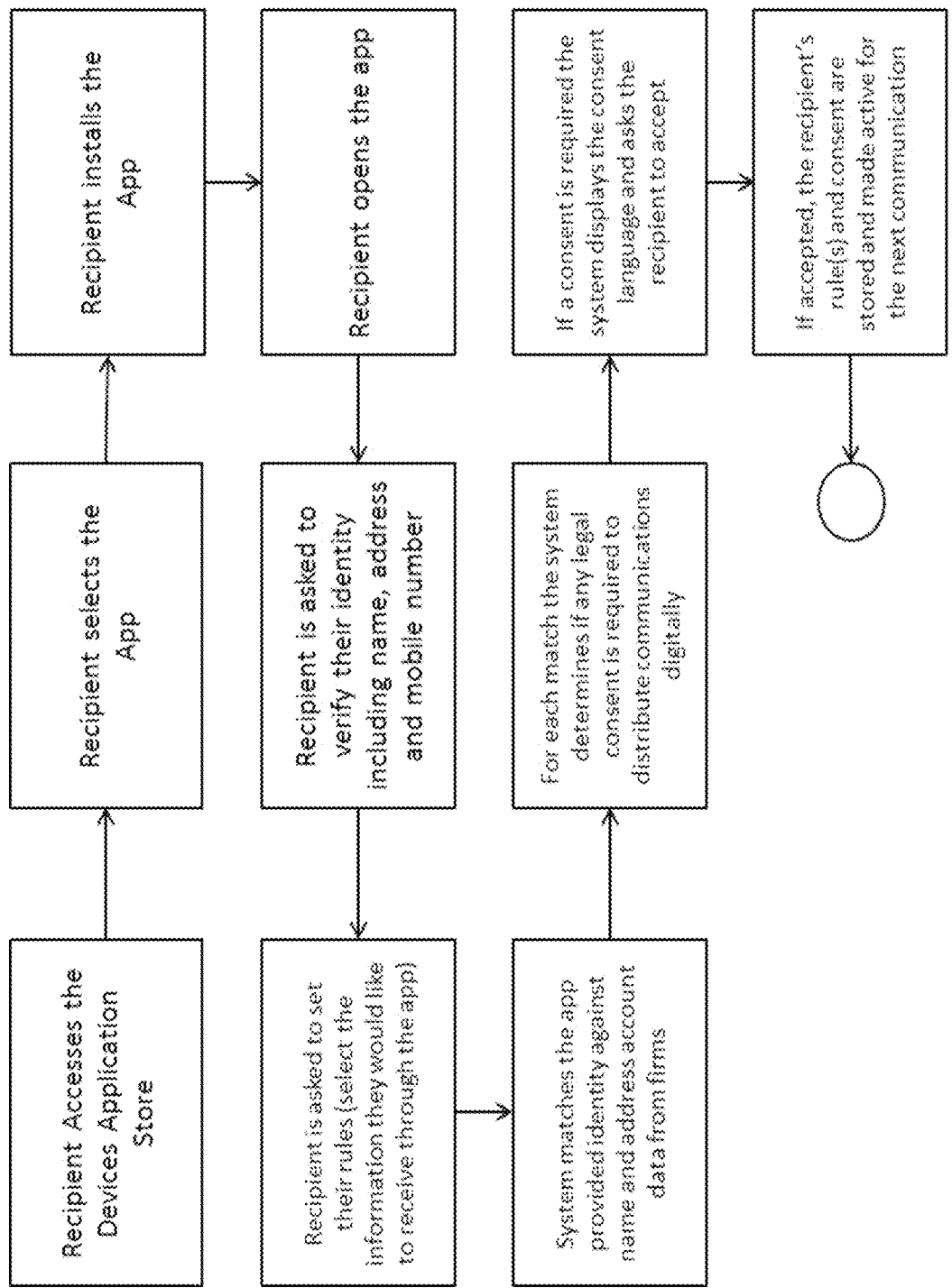

FIG. 23 shows an illustrative flowchart of accessing the Newsstand application in accordance with some embodiments of the instant invention.

Figure 24:
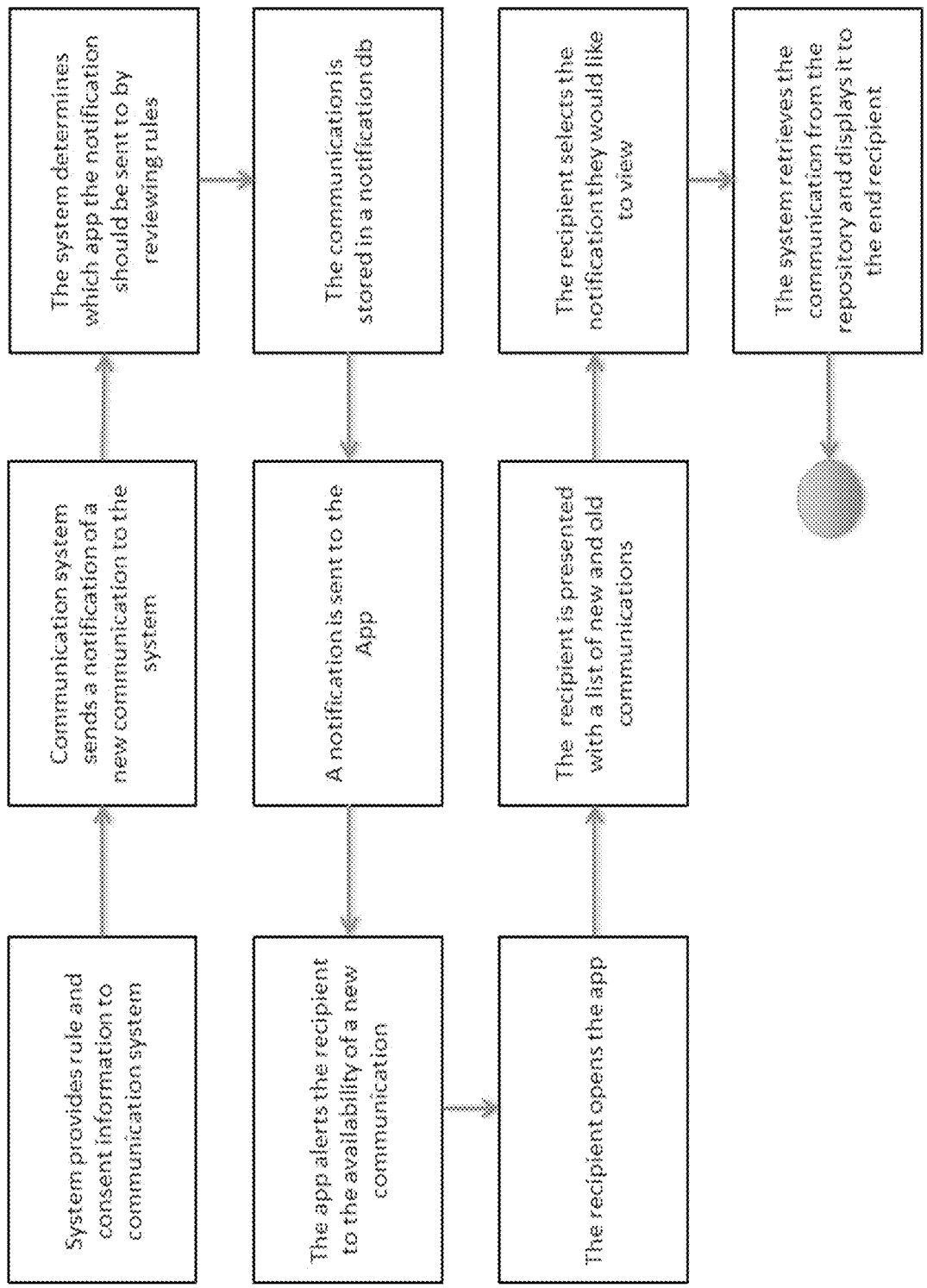

FIG. 24 shows an illustrative flowchart of delivering distributions utilizing the Newsstand application in accordance with some embodiments of the instant invention.

Further Illustrative Examples of the Instant Invention

In some embodiments, the onboarding of a recipient through a particular channel (e.g., being tied to identity) utilizes the identity mapping (e.g., recipient's identity mapped to sender's version(s) of the recipient identity).

In some embodiments, the rule exchange can involve, but is not limited to, the identity authentication, followed by the setting of rules for the recipient, scope of the rules, and distribution of the rules (e.g., staying within the exchange).

In some embodiments, the instant invention involves the account discovery which includes, but is not limited to, identifying potential relationships from historical distributions when a particular recipient is identified by the exchange based, at least in part, on identifying information received from such recipient and/or from a third party about such recipient.

In some embodiments, the instant invention involves capturing a particular recipient's consent, generally from rule(s) defined/selected by such recipient, and/or a set of common rules.

In some embodiments, the distribution processing can involve, but is not limited to, at least one of the following illustrative actions: the sending of a distribution, the applying of a rule, the delivery of the distribution through the correct channel to the recipient, and the auditability.

In some embodiments, the instant invention is utilized for document retrieval.

In some embodiments, the instant invention allows the insight and the auditability throughout the exchange.

In some embodiments, the instant invention utilizes at least one specialized programming languages, such as XML and JSON, to deliver the distributions through the exchange of the instant invention.

Further Illustrative Operating Environments

FIG. 1 illustrates an environment in which some embodiments of the present invention can operate. However, not all of these components may be required to practice the invention, and variations in the arrangement and type of the components may be made without departing from the spirit or scope of the invention. In some embodiment, the exchange of the instant invention hosts/communicates with a large number of the senders and the recipients (e.g., at least 1,000, at least 10,000; at least 100,000; at least 1,000,000) and processes a large number of concurrent transactions (e.g., at least 1,000; at least 10,000; at least 100,000; at least 1,000,000). In some embodiments, the illustrative exchange of the instant invention is based on a scalable computer and network architecture that incorporates varies strategies for assessing the data, caching, searching, and database connection pooling. In some embodiments, an example of the scalable architecture is an architecture that is capable of operating multiple servers.

In embodiments, members of the inventive computer system 102-104 (e.g., the sources and the channels connected to the exchange) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, mobile computing device, cell phone, smartphones, tablets, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
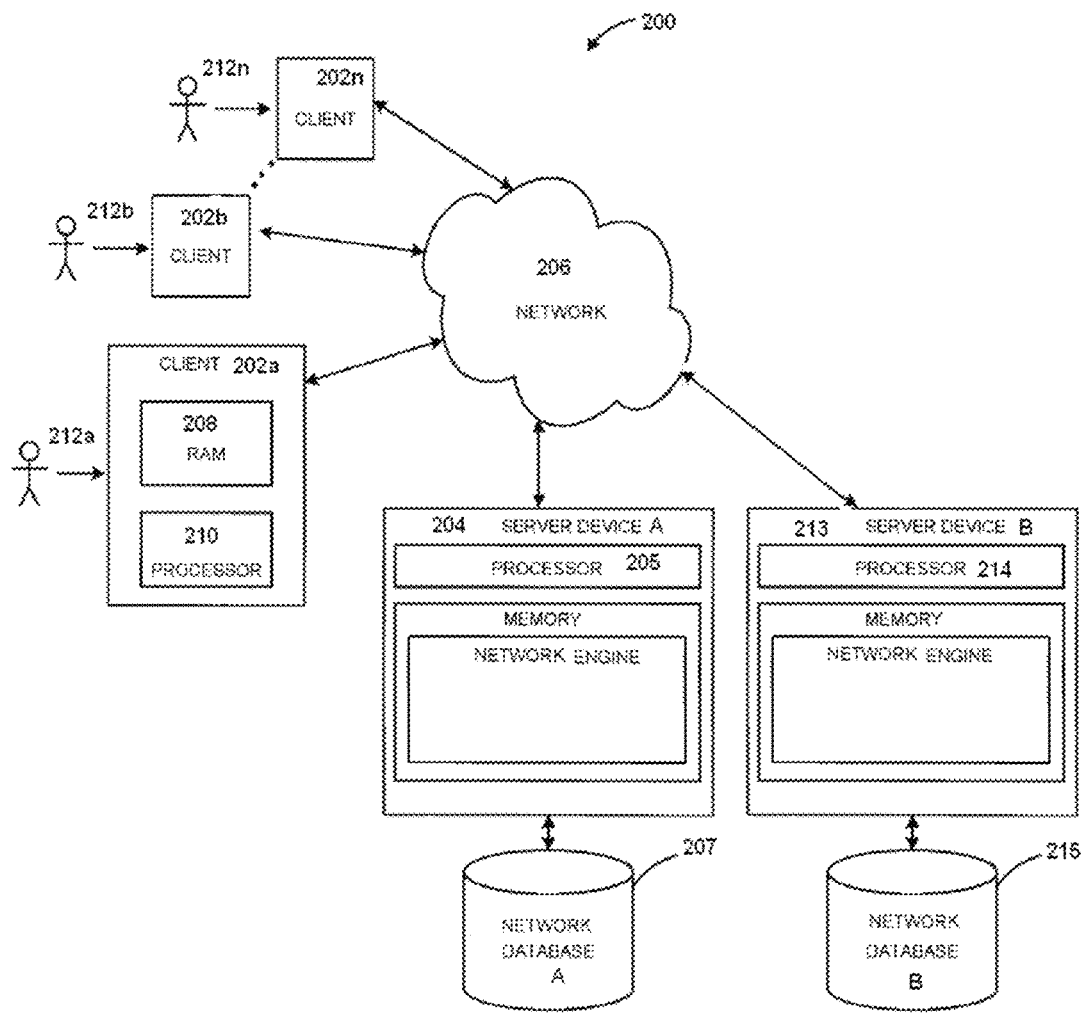

FIG. 2 shows another exemplary embodiment of the computer and network architecture that supports some embodiments of the inventive system. In some embodiments, the member devices 202a, 202b thru 202n shown (e.g., the sources and the channels connected with the exchange), each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, in some embodiments, of the instant invention, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users 212a-n communicate over the network 206 with each other and with other systems and devices coupled to the network 206. As shown in FIG. 2, server devices 204 and 213 may be also coupled to the network 206.

Figure 3:
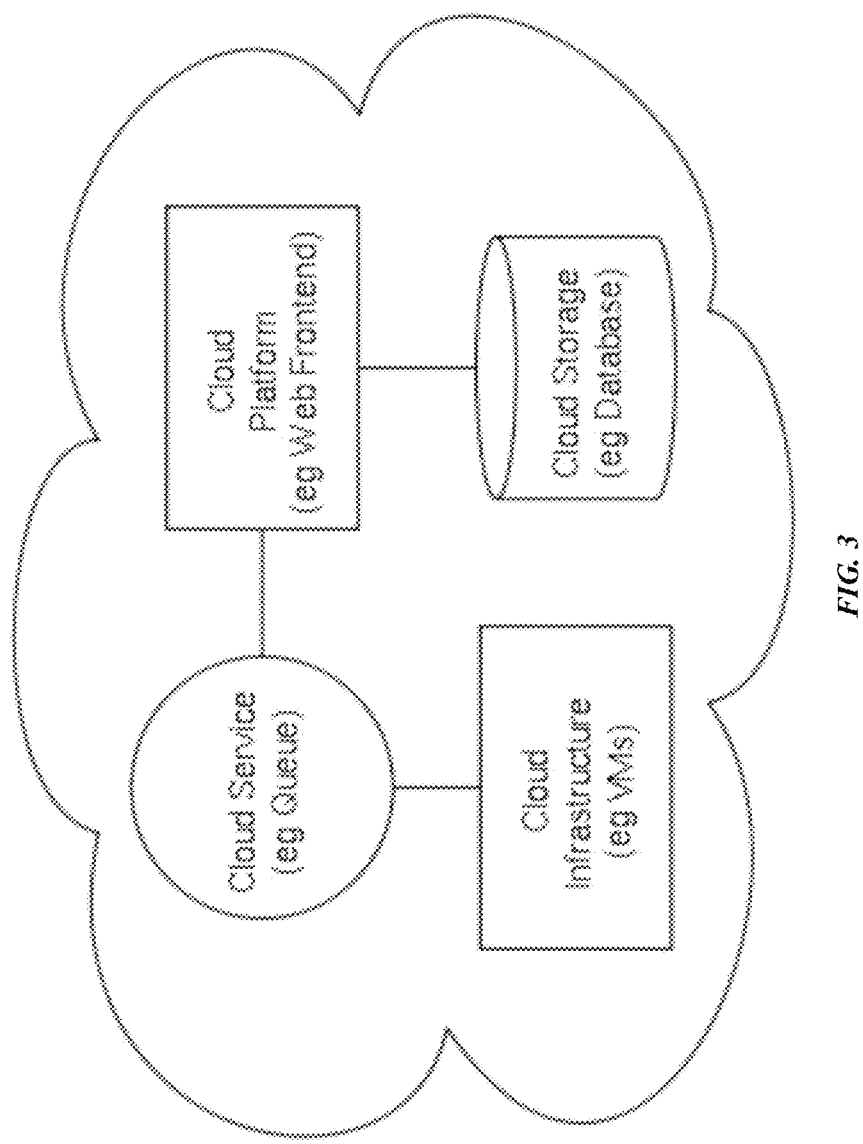
Figure 4:
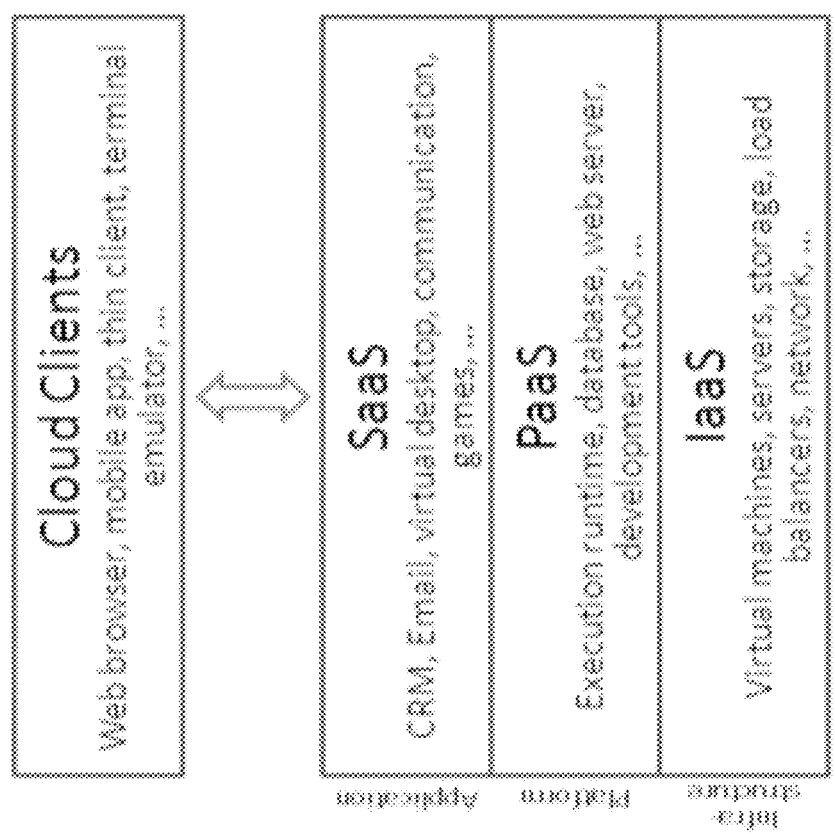

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

In some embodiments, the term "mobile electronic device" may refer to any portable electronic device that may or may not be enabled with location tracking functionality. For example, a mobile electronic device can include, but is not limited to, a mobile phone, tablet, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, the instant invention can utilize near-field wireless communication (NFC) that can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, NFC peer-to-peer communication can be conducted when a plurality of NFC-enable devices are within close proximity of each other.

In some embodiments, the instant invention provides for a computer-implemented method that at least includes the following steps: administering, by a first specifically programed computer system of a communications exchange, an electronic delivery of at least one first electronic distribution from at least one first sender to at least one first recipient, by allowing: i) the at least one first sender to send the at least one first electronic distribution to the at least one first recipient, and ii) the at least one first recipient to set a plurality of recipient attributes and a plurality of recipient rules to identify, for the at least one first sender, the communications exchange, or both, at least one of the following: 1) what electronic distributions the at least one first recipient desires to receive, 2) where the at least one first recipient desires to receive electronic distributions addressed to the at least one first recipient, and 3) how the at least one first recipient desires to receive the electronic distributions addressed to the at least one first recipient; where the mediating, by the first specifically programed computer system of the communications exchange, includes: receiving, by the first specifically programed computer system of a communications exchange, from at least one first source of a plurality of sources, at least one first electronic distribution of the at least one first sender, where the at least one first electronic distribution is addressed to the at least one first recipient; where the at least one first source is a second computer-programmed electronic system that the at least one first sender utilizes; where the receiving of the at least one first electronic distribution is in accordance with at least one first electronic exchange protocol defined between the first specifically programed computer system of the communications exchange and the second computer-programmed electronic system of the at least one first source; receiving, by the first specifically programed computer system, from the at least one first sender, a plurality of sender attributes of the at least one first sender and a plurality of sender rules of the at least one first sender that define how electronic distributions of the at least one first sender to be delivered; receiving, by the first specifically programed computer system of the communications exchange, the plurality of recipient attributes of the at least one first recipient and the plurality of recipient rules of the at least one first recipient; matching, by the first specifically programed computer system of the communications exchange, the at least one first electronic distribution of at least one first sender to the at least one first recipient; transmitting, by the first specifically programed computer system of the communications exchange, the at least one first electronic distribution of at least one first sender to at least one first channel associated with the at least one first recipient; where the matching and transmitting are based at least in part on: i) the plurality of sender attributes of the at least one first sender, ii) the plurality of sender rules of the at least one first sender, iii) the plurality of recipient attributes of the at least one first recipient, and iv) the plurality of recipient rules of the at least one first recipient; where the first channel is a third computer-programmed electronic system that the at least one first recipient utilizes to receive the electronic distributions addressed to the at least one first recipient; where the second computer-programmed electronic system of the at least one first source and the third computer-programmed electronic system of the at least one first channel are independent from each other; and where the transmitting is in accordance with at least one second electronic exchange protocol defined between the first specifically programed computer system of the communications exchange and the third computer-programmed electronic system of the at least one channel.

In some embodiments, the at least one first electronic exchange protocol is based at least in part on: i) a plurality of source attributes of the at least one first source, ii) a plurality of source rules of the at least one first source, iii) a plurality of exchange attributes of the communications exchange, and iv) a plurality of exchange rules of the communications exchange.

In some embodiments, the at least one second electronic exchange protocol is based at least in part on: i) a plurality of channel attributes of the at least one first channel, ii) a plurality of channel rules of the at least one first channel, iii) a plurality of exchange attributes of the communications exchange, and iv) a plurality of exchange rules of the communications exchange.

In some embodiments, the at least one first channel is selected from the group of: i) secure electronic messaging system, ii) a website, iii) a device application, and iv) a digital mail system.

In some embodiments, the at least one first source is selected from the group of: i) secure electronic messaging system, ii) a website, iii) a device application, and iv) a digital mail system.

In some embodiments, the at least one first recipient is selected from the group of: i) an individual, ii) a retail investor, iii) an institutional investor, and iv) an entity that is not a person.

In some embodiments, the plurality of recipient attributes are selected from the group of: i) a piece of information to be used to verify identity of the at least first recipient, where the piece of information includes at least one of the following: 1) first, last and middle name, 2) an organization name, 3) a physical address, 4) a date of birth, 5) a government identifier, 6) a telephone number, and 7) a bio-metrics credential, ii) an email address, and iii) an identity credential.

In some embodiments, the plurality of recipient rules are selected from the group of: i) at least one legal consent rule regarding obtaining a legal consent to deliver regulatory information, ii) at least one first channel rule set by sender, iii) at least one second channel rule regarding document type, and iv) at least one third channel rule regarding delivery time, where the plurality of recipient rules are set to be permanent or to be followed during or for a pre-determined time period.

In some embodiments, the at least one first sender is selected from the group of: i) an individual, ii) an individual investor, iii) a financial organization, and iv) an entity that is not a person.

In some embodiments, the plurality of sender attributes are selected from the group of: i) a piece of information to be used to verify identity of the at least first recipient, where the piece of information includes at least one of the following: 1) first, last and middle name, 2) an organization name, 3) a physical address, 4) a date of birth, 5) a government identifier, 6) a telephone number of the at least one first recipient, 7) a telephone number of the organization, and 8) a bio-metrics credential, ii) identifying information of the at least one first sender to be displayed by the at least one first channel to the at least one recipient, iii) at least one first sender identifier that is utilized to identify the at least one first sender to at least one of: the first specifically programed computer system of the communications exchange, the at least one first source, the plural of the sources, the at least one first channel, the plurality of channels, and the at least one first recipient.

In some embodiments, the plurality of sender rules is selected from the group of: i) at least one first sender rule identifying at least one channel supported by the at least one sender, ii) at least one second sender rule identifying at least one characteristic to be used to identify the at least one channel supported by the at least one sender, iii) at least one fourth sender rule identifying a legal consent language to be accepted by to the at least one first recipient, iv) at least one fourth sender rule identifying how identity of the at least one first recipient to be verified, and v) at least one fourth sender rule identifying how the plurality of recipient attributes of the at least one first recipient to be validated.

In some embodiments, the at least one first electronic distribution of the at least one first sender is selected from the group of: i) at least one advertising, ii) at least one catalogue, iii) at least one financial record statement, iv) at least one trade confirmation, v) at least one regulatory communication, vi) a public company's proxy, voting instruction form, or both, vii) a mutual fund's proxy, voting instruction form, or both, viii) at least one initial public offering prospectus, ix) at least one mutual fund prospectus, x) at least one legal notice, xi) at least one corporate notice, xii) at least one government non-regulatory communication, xiii) at least one certificate, xiv) at least one trading instruction, xv) at least one check, xvi) at least one data element, xvii) at least one image, xviii) at least one video, xix) at least one audio recording, xx) at least one interactive application, xxi) at least one letter or notice, xxii) at least one standardized formatted message, xxiii) at least one non-standard formatted message whose formatted has been mutually agreed upon the at least one first sender and the at least one first recipient); and xxiv) at least one link to at least one of: the at least one electronic document, the at least one data element, the at least one image, the at least one video, the at least one audio recording, and the at least one interactive application.

In some embodiments, the method further includes at least one of the following: i) sharing, by the first specifically programed computer system of a communications exchange, the plurality of recipient attributes and the plurality of the recipients rules with the at least one first sender, at least one other sender of the plurality of senders, or the plurality of senders, ii) applying, by the first specifically programed computer system of a communications exchange, the plurality of recipient attributes and the plurality of the recipients rules to deliver the at least one first electronic distribution received from the at least one first sender, without prior sharing the plurality of recipient attributes and the plurality of the recipients rules with the at least one first sender and the at least one first source, and iii) applying, by the first specifically programed computer system of a communications exchange, the plurality of recipient attributes and the plurality of the recipients rules to deliver the at least one first electronic distribution received from the at least one first sender.

In some embodiments, the first specifically programed computer system of the communications exchange receives the plurality of recipient attributes and the plurality of recipient rules from at least one of the following: i) the at least one first sender, at least one other sender of the plurality of senders, or the plurality of senders, and ii) the at least one first channel, at least one other channel of the plurality of channels, or the plurality of channels.

In some embodiments, the plurality of sender attributes and the plurality of sender rules are set by at least one of the following: i) the at least one first sender, and ii) the at least one first source, at least one other source of the plurality of sources, or the plurality of sources.

In some embodiments, the method further includes: notifying, by the first specifically programed computer system of the communications exchange, the at least one first sender that the delivery of the at least one first electronic distribution has failed.

In some embodiments, the method further includes: identifying, by the first specifically programed computer system of the communications exchange, at least one relationship between the at least one first recipient and the at least one first sender, the plurality of senders, or both, based at least in part on the plurality of recipient attributes set by the at least one first recipient.

In some embodiments, the identifying the at least one relationship is further based on historical information about at least one of: i) the at least one first recipient, ii) the at least one first sender, and iii) the plurality of senders.

In some embodiments, the method further includes: converting, by the first specifically programed computer system of the communications exchange, the at least one first electronic distribution from a first format of the at least one first source to a second format of the at least one first channel.

In some embodiments, the method further includes: generating, by the first specifically programed computer system of the communications exchange, for the at least one first sender, at least one first report, identifying at least one of the following: i) delivery information about successful delivery, failed delivery, or both, ii) viewing information regarding whether has been viewed or not, and iii) usage information regarding a utilization of the at least one first electronic distribution within the at least one first channel, the plurality f channels, or both.

In some embodiments, the method further includes: generating, by the first specifically programed computer system of the communications exchange, at least one usage report for at least one of: i) the at least one first source, ii) the at least one first sender, iii) the at least one first recipient, and iv) the at least one first channel.

In some embodiments, the plurality of channel rules includes at least two of the following: i) at least one first channel rule identifying at least one source supported by the at least one first channel, ii) at least one second channel rule identifying at least one sender supported by the at least one first channel, iii) at least one third channel rule identifying at least one distribution type supported by the at least one first channel, iv) at least one fourth channel rule identifying at least one distribution format supported by the at least one first channel, v) at least one fifth channel rule identifying at least one unassociated attribute supported by the at least one first channel, and vi) at least one sixth channel rule identifying at least one unassociated rule supported by the at least one first channel.

In some embodiments, the instant invention provides for a specifically programmed communications exchange, including at least the following components: at least one first specialized computer machine, including: a non-transient memory having at least one region for storing particular computer executable program code; and at least one processor for executing the particular program code stored in the memory, where the particular program code is configured so that the at least one first specialize computer machine is configured to at least perform the following operations: administering an electronic delivery of at least one first electronic distribution from at least one first sender to at least one first recipient, by allowing: i) the at least one first sender to send the at least one first electronic distribution to the at least one first recipient without knowing an electronic address associated with the at least one first recipient, and ii) the at least one first recipient to set a plurality of recipient attributes and a plurality of recipient rules to identify, for the at least one first sender, the communications exchange, or both, at least one of the following: 1) what electronic distributions the at least one first recipient desires to receive, 2) where the at least one first recipient desires to receive electronic distributions addressed to the at least one first recipient, and 3) how the at least one first recipient desires to receive the electronic distributions addressed to the at least one first recipient; where the mediating includes: receiving, from at least one first source of a plurality of sources, at least one first electronic distribution of the at least one first sender, where the at least one first electronic distribution is addressed to the at least one first recipient; where the at least one first source is a second computer-programmed electronic system that the at least one first sender utilizes; where the receiving of the at least one first electronic distribution is in accordance with at least one first electronic exchange protocol defined between the communications exchange and the second computer-programmed electronic system of the at least one first source;

receiving, from the at least one first sender, a plurality of sender attributes of the at least one first sender and a plurality of sender rules of the at least one first sender that define how electronic distributions of the at least one first sender to be delivered; receiving, the plurality of recipient attributes of the at least one first recipient and the plurality of recipient rules of the at least one first recipient; matching the at least one first electronic distribution of at least one first sender to the at least one first recipient; transmitting the at least one first electronic distribution of at least one first sender to at least one first channel associated with the at least one first recipient; where the matching and transmitting are based at least in part on: i) the plurality of sender attributes of the at least one first sender, ii) the plurality of sender rules of the at least one first sender, iii) the plurality of recipient attributes of the at least one first recipient, and iv) the plurality of recipient rules of the at least one first recipient; where the first channel is a third computer-programmed electronic system that the at least one first recipient utilizes to receive the electronic distributions addressed to the at least one first recipient; where the second computer-programmed electronic system of the at least one first source and the third computer-programmed electronic system of the at least one first channel are independent from each other; and where the transmitting is in accordance with at least one second electronic exchange protocol defined between the first specifically programed computer system of the communications exchange and the third computer-programmed electronic system of the at least one channel.

In some embodiments, an exemplary communication exchange of the instant invention (also referred here as "Fluent") enables two connected entities (e.g., people, companies) to communicate with each other without having prior knowledge in regards to where the communications should be delivered. In some embodiments, the exemplary communication exchange of instant invention enables a sender and/or a recipient to set instructions in regards how they would like to communicate. In some embodiments, the instructions can be set generically across a range of relationships and/or specifically to manage a single relationship. In some embodiments, the exemplary communication exchange of instant invention uses these instructions to determine the proper method of distributing the communications.

In some embodiments, the exemplary communication exchange of instant invention facilitates the distribution of communications without a need to understand the specific content and/or format of the communication being sent. In some embodiments, the exemplary communication exchange of instant invention utilizes a standard markup language to define meta data associated with the communication which will describe who the communication is for, who it is from, and an ability for the sender to extend the markup with meta data about the communication. In some embodiments, the exemplary communication exchange of instant invention treats the communication as an opaque blob (e.g., binary large object) of information and can contain any digital content (e.g., text, media, pictures, etc.) In some embodiments, the exemplary communication exchange of instant invention allows the recipient and the sender to ensure the method they have selected for delivery will enable them to read/process the inbound blob.

Exemplary Instructions

In some embodiments, the exemplary communication exchange of instant invention enables both an illustrative sender and/or an illustrative recipient to define instructions in regards to who they would like to communicate and where. For example, in some embodiments, recipients would define, for example but not limited to: the communication channel they would like to use to receive communications, the types of communications they would like to receive through that channel, and/or who they would like to receive communications from (e.g., a specific mailer/sender, a specific type of mailer/sender (e.g., an industry) and/or any mailer connected to the network). For example, in some embodiments, an illustrative sender/mailer would also have the ability to define, for example but not limited to: which recipient channels they would like to support (e.g., a specific channel, a type of channel, or any channel).

In some embodiments, the exemplary communication exchange of instant invention captures instructions, receives a communication to distribute, determines the appropriate communications channel based upon, but not limited to, the instructions that have been set by the sender and/or the recipient. In some embodiments, the sender does not need to know this information prior to distributing the content: the exemplary communication exchange of instant invention exchange determines how to deliver the communication for them. In some embodiments, the recipients can change their instructions at any point and as a result the communications will be distributed as long as the destination is supported by the sender.

In some embodiments, the exemplary communication exchange of instant invention have an ability to identify new relationships. For example, a recipient can define a series of instructions about where they would like to receive communications and from whom on a generic level. When a new sender joins the network and/or a recipient creates a relationship with a new sender, in some embodiments, the exemplary communication exchange of instant invention will automatically identify those new relationships and alert both the sender and the recipient that communications can now commence.

In some embodiments, the exemplary communication exchange of instant invention captures any required legal consent from the recipient ensuring that the communications can be delivered per sender and recipient instructions.

In some embodiments, the exemplary communication exchange of instant invention enables/consumers to set their delivery instructions for numerous corporate communication types from numerous brands (e.g., various companies) in one place. In some embodiments, the exemplary communication exchange of instant invention enables to set delivery instructions from numerous digital channels and/or other systems.

In some embodiments, the exemplary communication exchange of instant invention provides for a basic consent process to approve the communications to be distributed electronically with a method to add customized consent language to the process as per each brand's requirements. In some embodiments, the exemplary communication exchange of instant invention enables suppression of print for regulatory communications. In some embodiments, the exemplary communication exchange of instant invention allows delivery instructions to be made to all communications found for the consumer or the consumer can be specific with each communication from each brand to assign a distribution method.

In some embodiments, the exemplary communication exchange of instant invention can execute a discovery process that facilitates a consumer "finding" the brands they currently receive communication from and choosing them for a new preferred method of distribution. In some embodiments, the exemplary communication exchange of instant invention can provide a widget to enable digital channels to use to capture delivery instructions. In some embodiments, the exemplary communication exchange of instant invention allows the brands to set delivery instructions for distribution of their communications and/or consumers can set their preferences on the method they would like to use to receive those communications. In some embodiments, the exemplary communication exchange of instant invention provides analytics to participating brands on adoption/penetration of electronic delivery of communications. In some embodiments, the exemplary communication exchange of instant invention is flexible to enable delivery instructions data to be stored and accessed solely in the exchange for a company or stored in the exchange and interfaced back to the company. In some embodiments, the exemplary communication exchange of instant invention offers an identity verification process. In some embodiments, the exemplary communication exchange of instant invention provides a basic verification and/or a step-up verification as might be required by specific brands.

In some embodiments, the terms "Brand(s)"/"brand(s)" are directed to corporate entities that distribute communications to consumers. In some embodiments, the terms "Communication(s)"/"communication(s)" are directed to include, but not limited to, account/financial statements, proxies, trade confirms, bills, prospectus, tax related documents, advertisements, etc.

In some embodiments, the terms "Consent(s)"/"consent(s)" are directed to forms that recipients (e.g., consumers) must consent to have their communications distributed using methods other than a physical document sent via the country postal service. In some embodiments, consents may be generic or may be specific to the brand.

In some embodiments, the terms "Digital Channel(s)"/"digital channel(s)" are directed to any entity that is a recipient (e.g., consumer) facing that can accept a digital communication. For example, the terms "Digital Channel(s)"/"digital channel" include at least: digital mail vendors (e.g., Doxo, Manilla, etc.), consumer storage applications (e.g. Dropbox, Amazon Cloud, Evernote) and/or other channels.

In some embodiments, the exemplary communication exchange of instant invention can include the exchange itself, a Preference Exchange App/Widget, and/or an Analytics Engine.

Figure 25:
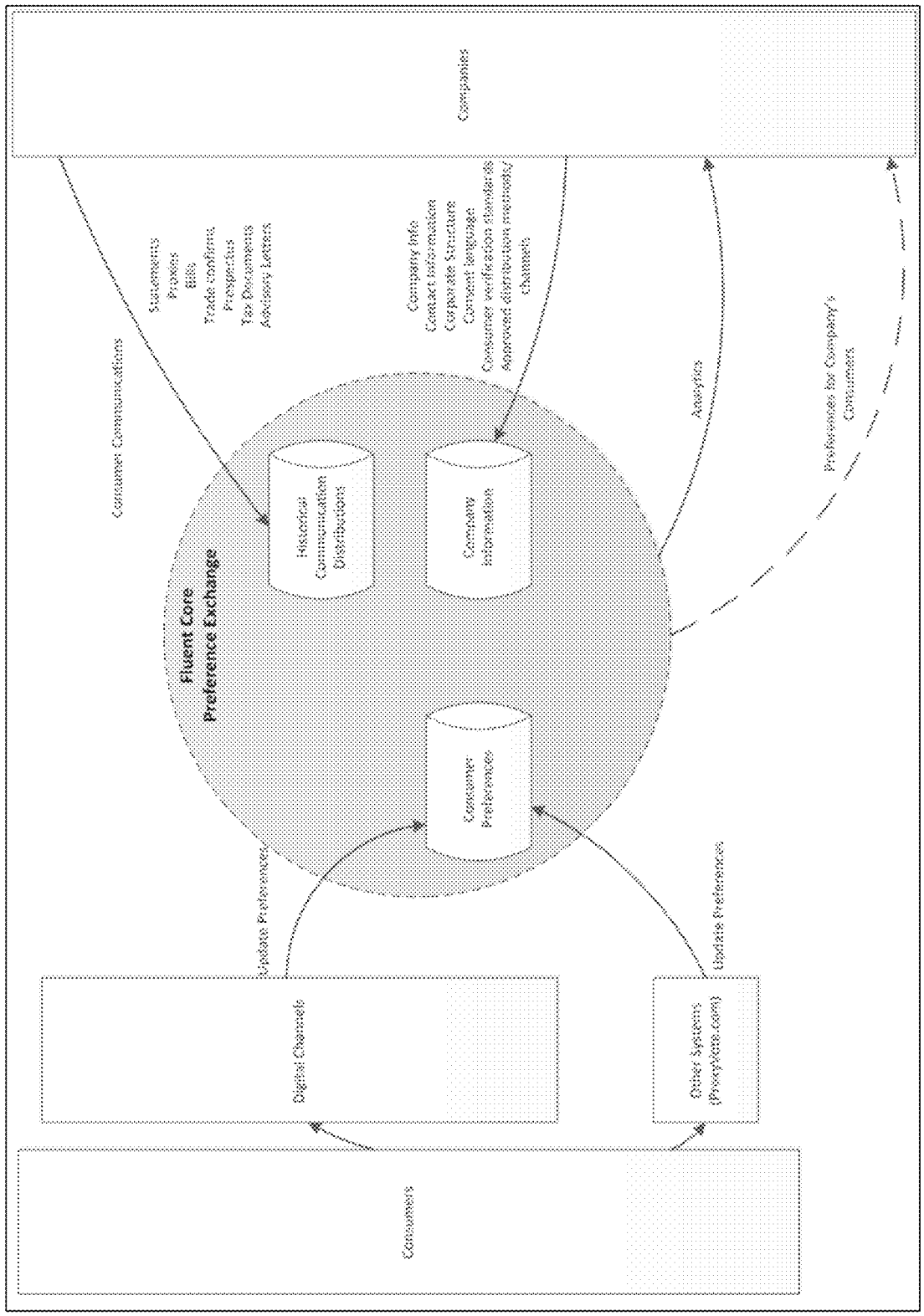

FIG. 25 illustrates the exemplary communication exchange of instant invention in accordance with some embodiments. In some embodiments, an exemplary process begins with a company signing up for the exemplary communication exchange of instant invention (e.g., Fluent). In some embodiments, the exemplary communication exchange of instant invention automatically gathers information about the company that includes, but is not limited to:

Name
Address
Logos
What communications they want to gather distribution preferences on
Consent Language their attorneys have approved for changing a preference from the default (print/country mail) to a digital form
Company verification standards
Company approval of digital channel vendors.

In some embodiments, the exemplary communication exchange of instant invention stores the company information in one or more Company Information databases and can update on periodical basis. In some embodiments, the company electronically submits the company information (e.g., historical communication(s), rules, customer profiles, etc.) so that the exemplary communication exchange of instant invention can create an identity mapping between its consumers and consumers of the exchange. In some embodiments, this could be consumers name and address, for example. In some embodiments, the company can also set up an interface of delivery instructions that the exemplary communication exchange of instant invention can gather for its consumers and store in a Consumer Preferences Database. In some embodiments, utilizing the exemplary communication exchange of instant invention, the company may also set up an interface to receive delivery instructions from the Consumer Preferences Database that pertain to it that were received via channels or other companies. In some embodiments, as the company distributes communications through the exemplary communication exchange of instant invention (e.g., Fluent), the preference information can be used to properly distribute the communications as per the consumer's desires.

Figure 26:
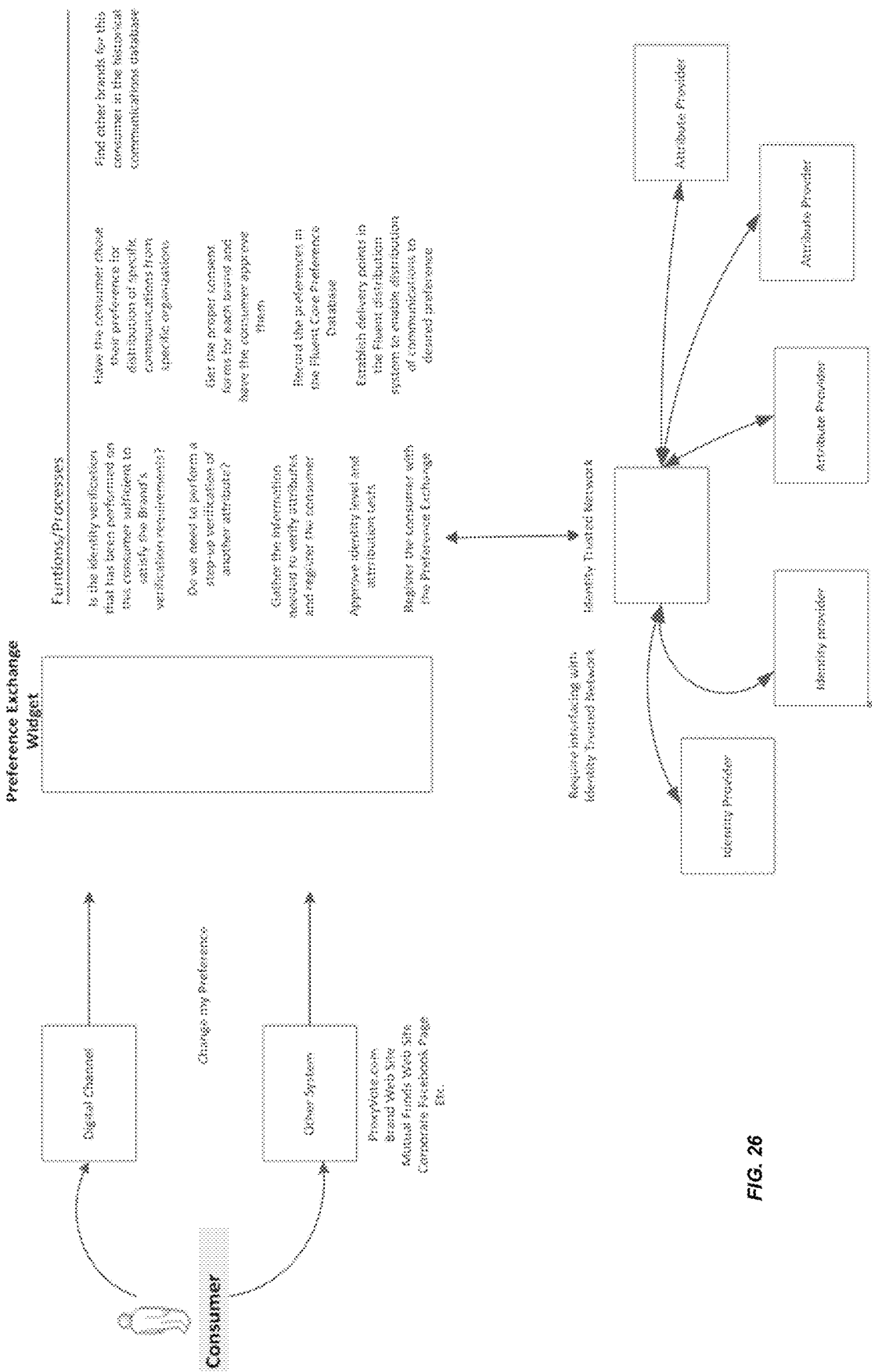

As shown in FIG. 26, in some embodiments, when a Consumer signs up with a digital channel that is part of the exemplary communication exchange of instant invention, the channel will interface with the Preference Exchange Widget to establish the consumer's preference(s). In some embodiments, a Consumer can also access the exemplary communication exchange of instant invention from other systems, which can include:

ProxyVote.com,
Brand web sites,
Mutual Funds web sites,
Brokerage web sites,
Corporate Facebook pages, and
etc.

In some embodiments, as shown in FIG. 26, the Preference Exchange Widget of the exemplary communication exchange of instant invention insures that the consumer's identity has been verified to the exchanges standards. If not, an identity verification process can take place with another source such as, but not limited to, IDW AXN—Trusted Identity Network.

In some embodiments, the exemplary communication exchange of instant invention gathers the Consumer's information and sent to the AXN for verification with various identity/attribute providers. In some embodiments, after the exemplary communication exchange of instant invention test the attributes, returning the results of the tests (pass/fail) to the Widget. If the results meet standards, the consumer will be registered with the exemplary communication exchange of instant invention. Once the consumer is identified, an identity mapping will be created between the new consumers and consumers that exist in the Fluent Core Historical Database.

In some embodiments, the consumer can then chose their preference for the brand/communication type they initiated with the digital channel. They can also identify other communication types and other brands they wish to set preferences for. This is accomplished after the Widget performs a search through the Fluent Core Historical Database to see what other brands are distributing communications to the consumer. The Preference exemplary communication exchange of instant invention identifies consumers across different brands.

In some embodiments, for each brand and communication type, the exemplary communication exchange of instant invention will identify if additional identity verifications (step-ups) are needed for the brand/communication. If additional verifications are needed, the exemplary communication exchange of instant invention will interface with the AXN to obtain these verifications.

When establishing distribution methods for various communication types and various brands, the exemplary communication exchange of instant invention will decide what consent language is needed to be "signed" for approval to have the communication distributed to the channel the consumer desires.

In some embodiments, the exemplary communication exchange of instant invention records the preferences in the Fluent Preference Database and establishes the Delivery Points for the various communications in Fluent.

In some embodiments, if the Consumer is in another system that is part of the exemplary communication exchange of instant invention (e.g., ProxyVote.com), there will be a button on the application enabling the consumer to set preferences for any brand/communication type In some embodiments, the process can be the same as the one above for digital channel access, except it will automatically search for brands/communications as the first step In some embodiments, after the consumer is registered with the exemplary communication exchange of instant invention, they will be provided with access that will enable them to set preferences directly with the exemplary communication exchange of instant invention.

Figure 27:
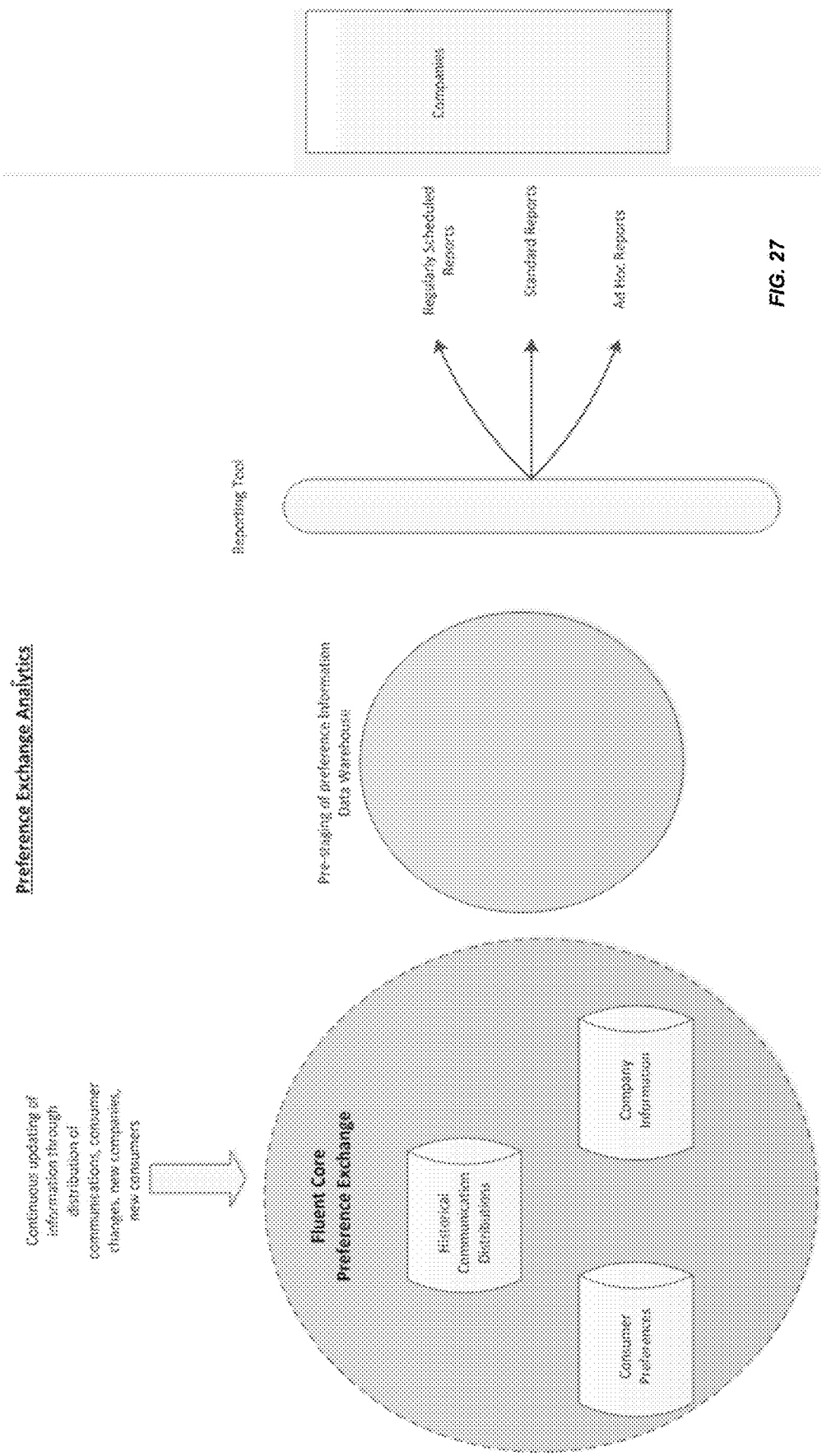
Figure 28:
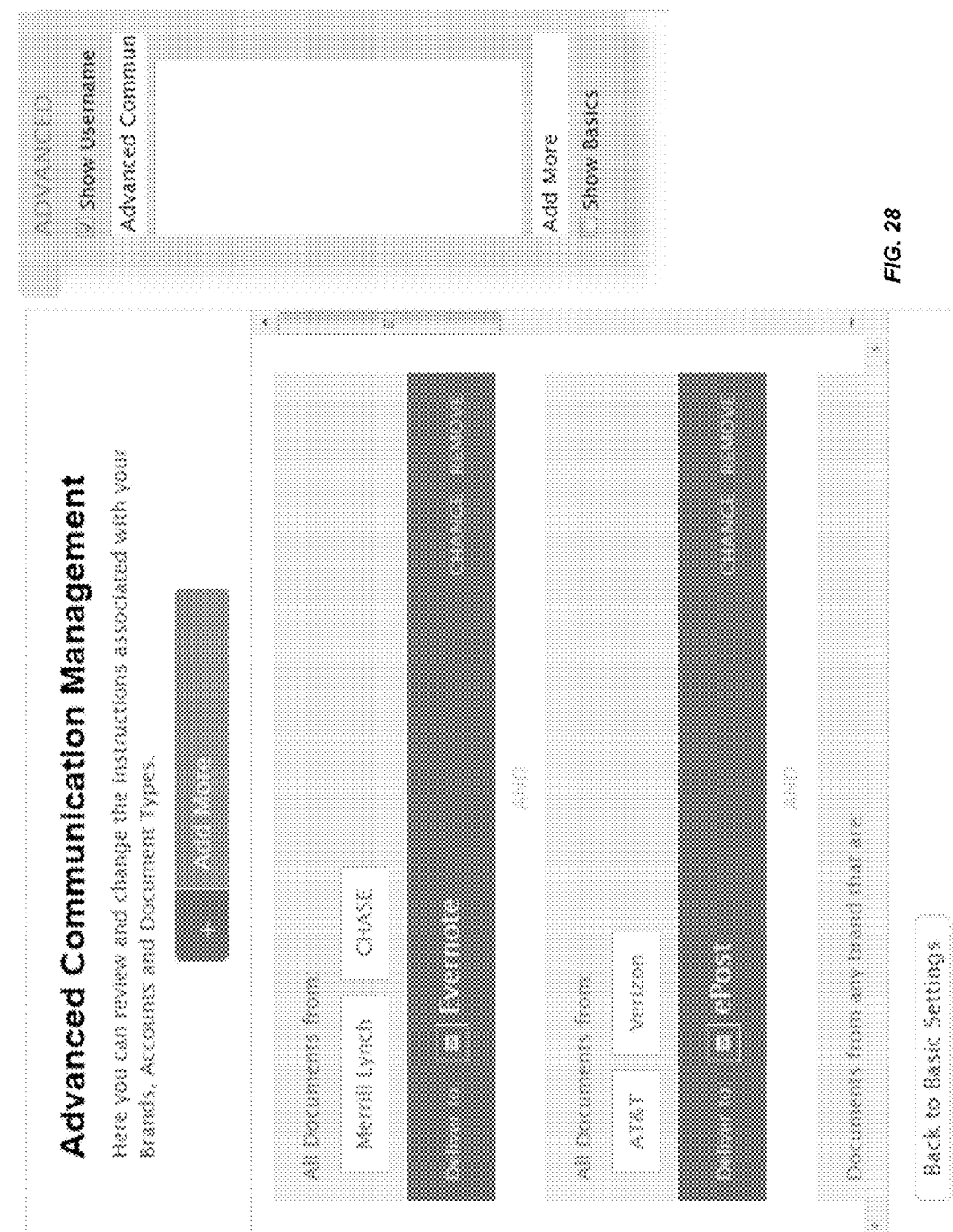
Figure 29:
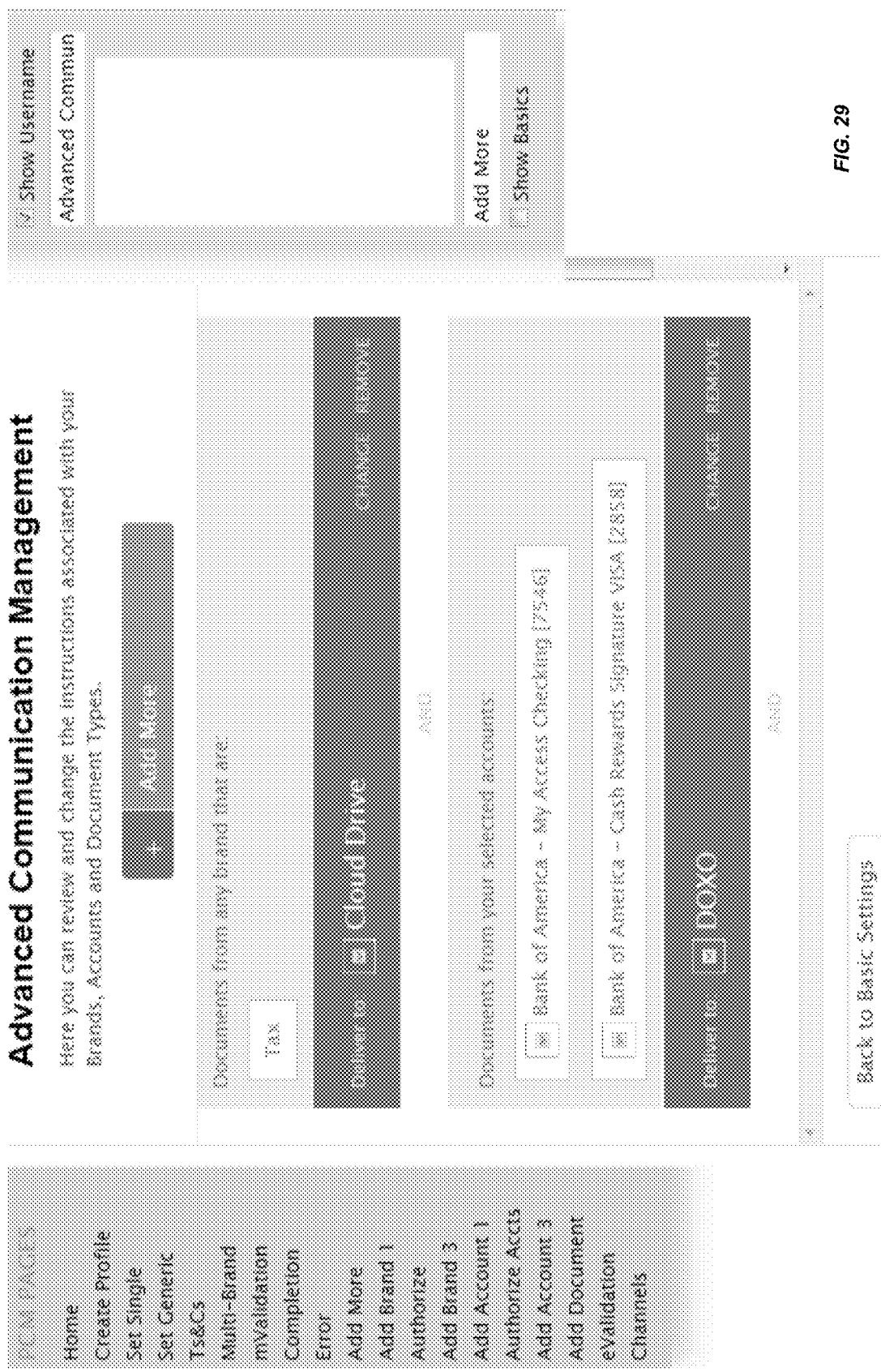
Figure 30:
Figure 32:
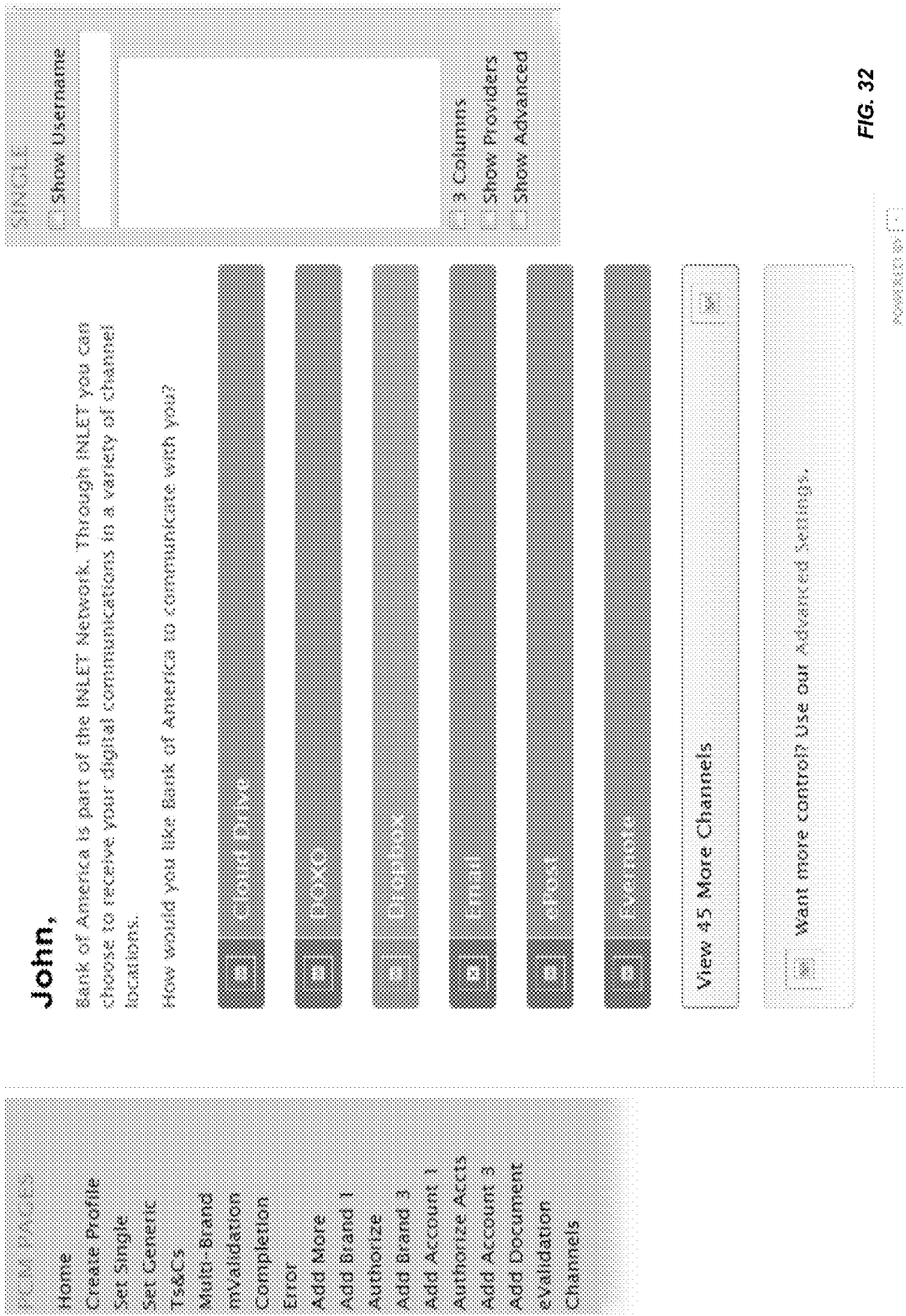
Figure 33:
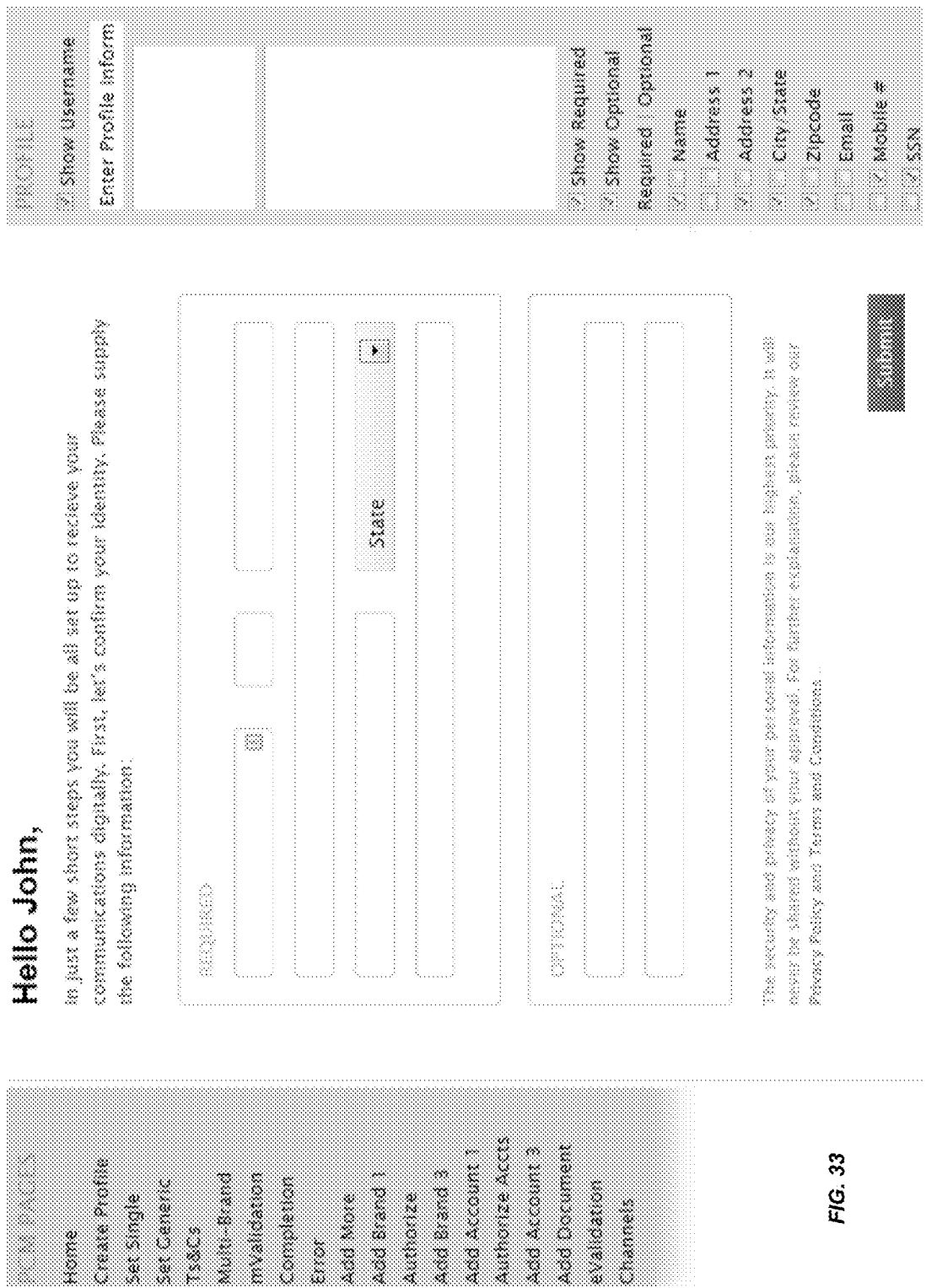
Figure 37:

As shown in FIG. 27, information is continuously updated and added to exemplary communication exchange of instant invention, such as, but not limited to:

Company information
Consumer Preference Information by Brand (company), Communication Type, and/or
Historical Communication Distribution Information.

In some embodiments, using this information, the exemplary communication exchange of instant invention can, but not limited to:

Combine the various information and stage it for Reporting
Identify a Reporting tool to use on the Data
Produce Standard Reports on a regular basis
Develop Standard Reports that can be run as needed
Develop Ad Hoc Reports when requested.

In some embodiments, these reports are automatically generated and electronically displayed by preprogrammed graphical user interface. In some embodiments, it is continuously being updated and will grow as more companies and consumers use the exemplary communication exchange of instant invention. In some embodiments, the brands must accept the identity verification processes as valid to allow the consumer to set the preferences and have them binding in the case of regulatory requirements.

FIGS. 28-37 are screenshots, illustrating and exemplary dynamic preference management and authentication process in accordance with some embodiments of the instant invention. In some embodiments, the exemplary communication exchange of instant invention uses a dynamic nature of the widget to allow the Brands, Channels and Consumers to set their preferences (instructions for distribution of communications), discover brands that are communicating with them, and have their identity verified according to the standards set by the brand distributing the communications. In some embodiments, the exemplary communication exchange of instant invention programmed with the ability to dynamically set the widget to accommodate the brand's requirements such as, but not limited to:

Terms and Conditions

Consent Language

Look & Feel

Attributes used to verify identity.

In some embodiments, the exemplary communication exchange of instant invention can utilize a process flow for performing preference setting of brands and/or document types to distribute to various channels—multiple channels and multiple documents and/or single channel and all documents.

FIGS. 28-37 illustrate that the Widget's dynamic screens are programed to display specific graphical user interfaces (GUIs) to dynamically provide and receive information from the GUIs. In some embodiments, the specific GUIs of FIGS. 28-37 are a combination of automatic building screens from data of the exemplary communication exchange of instant invention (e.g., Fluent) and building screens from on-line real-time interviews with the brands and/or channels to identify further customizations.

As FIGS. 28-37 shows that the specific GUIs of the instant invention can be dynamically configured. For example, the left side bar allows ordering of screens. For example, the right side bar allows changes to screens from look & feel to content. For example, all changes take place immediately and enable non-programmers (e.g., customer service representatives) to work with the Brands/Channels and dynamically build the widget that they will use to have their consumers communicate with the exemplary communication exchange of instant invention. For example, the right bar allows the user to change language, fields, column settings, and colors.

In some embodiments, the exemplary communication exchange of instant invention, the specific GUIs dynamically conforms to be used on PCs, tablets, and smartphones based, at least in part, from a handshake protocol that identifies the user's device based on one or more device characteristics.

Illustrative Examples of Alerts and Notifications in Accordance with Some Embodiments of the Instant Invention Table 1 below illustrates exemplary characteristics of computer function "Get envelope status" to identify the status of delivery.

Table 2 below illustrates exemplary characteristics of computer function "Put envelope status" to identify the status of electronic transmission.

TABLE 1

GET Envelope Status
Description
Get a Specific envelope status
Requests
Request Syntax
GET /v81/envelope/{envelopeId}/status                       HTTP/1.1
Request Headers
In some embodiments, this method requires the standard headers.
Request Elements

| Element | Description | Type | Required |
| --- | --- | --- | --- |
| envelopeId | The identification of the specific envelope | String | Yes |

Responses
Response Headers
In some embodiments, this method only returns the standard headers. See "Common Response Headers" below.
Response Elements

| Element | description | Type | Required |
| --- | --- | --- | --- |
| status | Current Status for the envelop: "New", "Delivered", "Received", "Opened", "Failed", "Deleted" | String | Yes |

Examples
Sample Request
GET /v81/envelope/EV:300000/status
Sample Response
HTTP/1.x 200 OK
{
    "status":"Opened"
}
Common Request Headers
The REST method invocation all use common HTTP headers to qualify the request. Below are
the common HTTP headers for the Channel API:

| Element | Description | Sample | Required |
| --- | --- | --- | --- |
| Host | Target server | broadridge.com<br>uat-flu.broadridge.com | Yes |
| Date | Requestors UTC time | Wed, 01 Mar 2xxx 12:00:00 GMT | Yes |
| Accept | The content type the caller will accept | application/json<br>application/pdf<br>application/jpg | No |
| Authorization | Authentication header containing an encrypted version of the channelId | *&^DG15436&&&& | Yes |
| Content-Length | Length of the body minus the headers | 127 | No |
| Content-Type | The content type of the response body | application/json<br>application/pdf<br>application/jpg | No |

TABLE 2

PUT Envelope Status  
Description  
Update a Specific envelope status  
Requests  
Request Syntax  
PUT v81/envelope/{envelopeId}/status    HTTP/1.1  
Request Headers  
In some embodiments, this method requires the standard Fluent headers.  
See "Common Request Headers" above.  
Request Elements

| Element | Description | Type | Required |
| --- | --- | --- | --- |
| envelopeId | The identification of the specific envelope | String | Yes |
| status | Current Status for the envelope. Only valid values are: "Received", "Opened", "Failed", "Deleted" | String | Yes |

TABLE 2-continued

Responses  
Response Headers  
In some embodiments, this method only returns the standard Fluent headers. See "Common Response Headers" above.  
Response Elements  
In some embodiments, there are no response elements for this method.  
Examples  
Sample Request  
PUT /v81/envelope/en12345678910/status  
{  
   "status": "Opened"  
}  
Sample Response  
HTTP/1.x 200 OK Table 3 below illustrates exemplary characteristics of computer function "Get Envelopes" to obtain a list of envelopes.

TABLE 3

GET Envelopes  
Requests  
Request Syntax  
GET /v81/mailbox/{mailboxId}/envelope    HTTP/1.1  
or  
GET /v81/ccid/{ccId}/mailbox/envelope  
or  
GET  
/v81/channel/{channelId}/channelconsumer/{channelSpecificConsumerId}/mailbox/envelope  
To filter on Mail Type  
GET /v81/mailbox/{mailboxId}/envelope/?mailType=mailType  
To filter on Envelope Status  
GET /v81/mailbox/{mailboxId}/envelope/?status=Status  
To filter by date range  
GET /v81/mailbox/{mailboxId}/envelope/?dateType&from=fromDate&to=toDate  
To get pages of Envelopes  
GET /v81/mailbox/{mailboxId}/envelope/?startPage=startPage&pageSize=pageSize  
Request Headers  
In some embodiments, this method requires the standard Fluent headers. See "Common Request Headers" above.  
Request Elements

| Element | Description | Type | Required |
| --- | --- | --- | --- |
| mailboxId | The ID of a given Mailbox | String | Yes (if ccId or Channel Specific ID not used) |
| channelId | Fluent Identifier for the Channel | String | Yes (if ccId or mailboxId not used) |
| channelSpecificConsumerId | Channel Specific Consumer ID | String | Yes (if ccId or mailboxId not used) |
| ccId | Fluent Identifier for the Channel Consumer | String | Yes (if channelSpecificConsumerId or mailboxId is not used) |
| mailType | The internal mail type, "Bill", "Statement", "Notice" | String | No |
| status | Current Status for the envelop: "New", "Delivered", "Received", "Opened", "Failed", "Deleted" | String | No |
| dateType | "asOfDate", "ingestionDate", "deliveredDate", "receivedDate", "failedDate", "openDate", "deletedDate" or "lastModifiedOn" | String | No |

TABLE 3-continued

| | | | |
|---|---|---|---|
| fromDate | Start Date | String | No |
| toDate | End Date | String | No |
| startPage | Page number of Envelopes | String | No |
| pageSize | Number of Envelopes per page | String | No |

Responses
Response Headers
In some embodiments, this method only returns the standard Fluent headers. See "Common Response Headers" above.
Response Elements

| Element | Description | Type | Required |
|---|---|---|---|
| envelopeId | The identification of the specific envelope | String | Yes |
| brandId | The Sender Brand's ID | String | Yes |
| brandConnectionId | Brand Connection used to address the envelope | String | Yes |
| envelopeName | Display Name for the Envelope | String | Yes |
| contentType | Content Type set by the sending Brand | String | No |
| mailType | The internal mail type, "Bill", "Statement", "Notice" | String | Yes |
| billData | If the Mail type is "Bill", container for bill information | Container | Yes, if "Bill" mailType |
| amountDue | Amount due for Bill Mail type | String | Yes, if "Bill" mailType |
| dueDate | Date when Bill is due | String | Yes, if "Bill" mailType |
| statementData | If the mailType is "Statement", container for additional information | Container | Yes, if "Statement" mailType |
| statementAmount | Statement amount | String | Yes, if "Statement" mailType |
| envelopeDocuments | Array of document ID of documents in envelop | Array | Yes |
| printSuppressed | Indicates if this envelope suppressed print - Yes/No | String | Yes |
| historicalMail | Indicates if this is historical content - Yes/No | String | Yes |
| status | Current Status for the envelop: "New", "Delivered", "Received", "Opened", "Failed", "Deleted" | String | Yes |
| asOfDate | Mail date set by the sender | String | No |
| ingestionDate | Date when mail was ingested by platform | String | Yes |
| deliveredDate | Date when mail was sent to channel | String | Yes - if status "Delivered", "Received", "Opened", "Failed" or "Deleted" |
| receivedDate | Date when Channel confirmed delivery | String | Yes - if status "Received", "Opened" or "Deleted" |
| failedDate | Date when Channel indicated delivery failure | String | Yes - if status "Failed" |
| openDate | Date when Channel indicated open | String | Yes - if status "Opened" |
| deletedDate | Date when the Chanel indicated deletion | String | Yes - if status "Deleted" |
| lastModifiedOn | Last change to envelope | String | Yes |

Illustrative Example of Computer Code of the Functions "Get Envelops":

```
Sample Request
GET /v81/mailbox/MB:4801759557/envelopes?asOfDate&from=2013-11-15T14:01:43.013&to=2013-11-15T14:01:43.013
Sample Response Body
HTTP/1.x 200 OK
Content-Type: application/json;
{
  "envelopes": [
    {
      "statementData": {
        "statementAmount": "$129.68"
      },
      "envelopeDocuments": [
        {
          "documentId": "DC:0000001"
        }
      ],
      "asOfDate": "2014-02-2012:10:20.856",
      "ingestionDate": "2014-02-2012:10:20.856",
      "deliveredDate": "",
      "receivedDate": "",
      "failedDate": "",
      "openDate": "",
      "deletedDate": "",
      "contentType": "Statement",
      "historicalMail": null,
      "mailType": "Statement",
      "brandId": "BB:0000000122",
      "envelopeName": "January Statement",
      "printSuppressed": "Yes",
      "envelopeStatus": "New",
      "envelopeId": "EV:300000",
      "lastModifiedOn": "2014-02-20 12:10:20.856",
      "brandConnectionId": "CBR:100"
    },
    {
      "billData": {
        "amountDue": "110.10",
        "dueDate": "2014-02-2012:10:20.856"
      },
      "envelopeDocuments": [
        {
          "documentId": "DC:0000001"
        }
      ],
      "asOfDate": "2014-02-2012:10:20.856",
      "ingestionDate": "2014-02-2012:10:20.856",
      "deliveredDate": "",
      "receivedDate": "",
      "failedDate": "",
      "openDate": "",
      "deletedDate": "",
      "contentType": "Bill",
      "historicalMail": null,
      "mailType": "Bill",
      "brandId": "BB:0000000122",
      "envelopeName": "January Utility Bill ",
      "printSuppressed": "Yes",
      "envelopeStatus": "New",
      "envelopeId": "EV:300000",
      "lastModifiedOn": "2014-02-20 12:10:20.856",
      "brandConnectionId": "CBR:100"
    }
  ]
}
```

Illustrative Examples of Operations on Consumer Alerts in Accordance with Some Embodiments of the Instant Invention In some embodiments, the inventive communication exchange of the instant invention is specifically programed to generate consumer alerts. In some embodiments, alerts are administrative messages for consumers from the inventive communication exchange, channels and/or brands that may contain informational messages about the system and/or an action that requires a consumer response. In some embodiments, by default, alerts are delivered to the consumer's Mailbox; they can also be delivered asynchronously to a channel using an Event Notification Subscription. Table 4 provides illustrative examples of formats and types of alerts.

TABLE 4

Format
The JSON representation of a complete "alert" is:
```
{
"alert": {
"alertId": alertId
"channelId": channelId,
"channelSpecificConsumerId": channelSpecificConsumerId,
"ccId": ccId,
"alertSender": alertSenderId,
"alertType": alertType,
"alertTypeData" : {...}
"alertStatus": status
"alertTimeStamp": alertDateAndTime
"lastModifiedOn": lastModifiedOnDateAndTime
}
```
Alert Types
Alert Types include:

| Alert Type | Description | Alert Type Data |
|---|---|---|
| channelConsumerCreatedAlert | Welcome Alert for new Channel Consumers | Channel ID |
| deliveryInstructionsUpdatedAlert | Confirmation that Delivery Instructions have been updated | Delivery Instructions |
| deliveryPointsUpdatedAlert | Confirmation that Delivery Points have been updated | Delivery Point ID |
| brandConnectionsUpdatedAlert | Confirmation that Brand Connections have been updated | Brand Connection ID Previous Value, New Value |

TABLE 4-continued

| | |
|---|---|
| brandConnectionInvitationAlert | Invitation from a Brand to a Brand ID consumer to add a new Brand Connection |
| channelConsumerDeletedAlert | Confirmation to a consumer Channel ID that their access via another channel has been removed |

Alert Identifiers
In some embodiments, alerts are associated with:
  - A Consumer
  - A Mailbox
In some embodiments, they also have their own globally unique identifier. Therefore, all URLs of the form:
/channel/{channelId}/channelconsumer/{channelSpecificConsumerId}/mailbox/alert/{alertId}
can be replaced with an equivalent:
/alert/{alertId}
In some embodiments, all the alerts for a consumer can be retrieved using the following equivalent URL:
/channel/{channelId}/channelconsumer/{channelSpecificConsumerId}/mailbox/alert
/ccid/{ccId}/mailbox/alert
All alerts are channel-independent.
Alert Status
In some embodiments, an Alert can have the following status values:
Alert Status values

| Status | Description |
|---|---|
| Sent | Alert has been generated |
| Received | Alert has been marked received by the channel |
| Read | Alert has been marked read by the channel |
| Deleted | Alert has been marked deleted by the channel |

Table 5 provides an illustrative example of software parameters for a computer function to get data for an alert based on its identifier.

TABLE 5

Requests
Request Syntax
GET /v81/alert/{alertId}
    HTTP/1.1
Request Headers
In some embodiments, this method requires the standard Fluent headers. See "Common Request Headers" above.
Request Elements

| Element | Description | Type | Required |
|---|---|---|---|
| alertId | The specific ID of an alert | String | Yes |

Responses
Response Headers
In some embodiments, this method only returns the standard Fluent headers. See "Common Response Headers" above.
Response Elements

| Element | Description | Type | Required |
|---|---|---|---|
| alertId | The specific ID of an alert | String | Yes |
| channelId | Fluent Identifier for the Channel | String | Yes |
| channelSpecificConsumerId | Identity used by the channel internally to refer uniquely to the consumer | String | Yes |
| ccId | Fluent created Identifier for the Channel Consumer | String | Yes |
| alertSender | The initiator of the alert - could be a brand or the platform | String | Yes |

Response Elements

| Element | Description | Type | Required |
|---|---|---|---|
| docDataValue | Value for a Document specific data item | String | No (will be returned but may be |

TABLE 5-continued empty)

```
Sample Request
GET /v81/envelope/EV:300000/document/DC:0000001/documentDate
     HTTP/1.1
Sample Response
HTTP/1.x 200 OK
{
    "documentDate": "2013-11-15 14:01:43.01"
}
```

Table 6 provides an illustrative example of software parameters for a computer function to get document's Payment status in accordance to some embodiments.

TABLE 6

Requests
Request Syntax
GET /v81/envelope/{envelopeId}/document/{documentId}/status     HTTP/1.1
   In some embodiments, this method requires the standard Fluent headers.
   Request Elements

| Element | Description | Type | Required |
|---|---|---|---|
| envelopeId | The identification of the specific envelope | String | Yes |
| documentId | Id for the document in the envelope | String | Yes |

Responses
Response Headers
In some embodiments, this method requires the "Common Request Headers"

| Response Elements | Description | Type | Required |
|---|---|---|---|
| envelopeId | The Envelope ID | String | Yes |
| documentId | Id for the document in the envelope | String | Yes |
| status | NotPaid, ScheduledPayment, Paid, PaymentFailed | Container | Yes |

```
Sample Request
GET /v81/envelope/EV:300000/document/DC:0000001/status
HTTP/1.1
Sample Response
HTTP/1.x 200 OK
{
    "envelopeId": "EV:300000",
    "documentId": "DC:0000001",
    "status": "Paid"
}
```

Table 7 provides an illustrative example of software parameters for a computer function to get document's update Payment status in accordance to some embodiments.

TABLE 7

Requests
Request Syntax
PUT /v81/envelope/{envelopeId}/document/{documentId}/status     HTTP/1.1
Request Headers
In some embodiments, this method requires the "Common Request Headers"
Request Elements

| Element | Description | Type | Required |
|---|---|---|---|
| envelopeId | The identification of the specific envelope | String | Yes |
| documentId | Id for the document in the envelope | String | Yes |
| status | NotPaid, ScheduledPayment, Paid, PaymentFailed | Container | Yes |

Responses
Response Headers
In some embodiments, this method requires "Common Response Headers" above.
Response Elements

TABLE 7-continued

| Element | Description | Type | Required |
|---|---|---|---|
| status | Echo status back if request is successful | String | Yes |

Sample Request
PUT /v81/envelope/EV:300000/document/DC:0000001/status HTTP/1.1
{
"status":"Paid"
}
Sample Response
HTTP/1.x 200 OK
{
"status":"Paid"
}

Table 8 provides an illustrative example of software parameters for a computer function to get document's activity for a given document in accordance to some embodiments.

TABLE 8

Document Activity
In some embodiments, the channel can request the following activities about a document

| Activity Type | Description | Detail Data |
|---|---|---|
| Created | Creation of the document | ccStatus, lastModifiedOn |
| StatusUpdated | Change in status of document | ccStatus lastModifiedOn |
| DataUpdated | Change in document data | dataName, previousValue, newValue |
| Deleted | Deletion of the document | ccStatus lastModifiedOn |

Requests
Request Syntax
GET /v81/envelope/{envelopeId}/document/{documentId}/activity HTTP/1.1
Request Headers
In some embodiments, this method requires the standard Fluent headers. See "Common Request Headers" above.
Request Elements

| Element | Description | Type | Required |
|---|---|---|---|
| envelopeId | The identification of the specific envelope | String | Yes |
| documentId | Id for the document in the envelope | String | Yes |
| activityType | Created, DataUpdated, StatusUpdated, Deleted | String | Optional |
| from | timeStamp from filter "2013-11-15 14:01:43.01" | String | Optional |
| to | timeStamp from filter "2013-11-15 14:01:43.01" | String | Optional |
| pageStart | Index start | String | Optional |
| pageMax | Total returned | String | Optional |

Responses
Response Headers
This method requires "Common Request Headers" above.
Response Elements

| Element | Description | Type | Required |
|---|---|---|---|
| activities | An array of activities for a document | Array | Yes |
| activity | An activity for a document | Container | Yes |
| id | Unique identifier for the activity | String | Yes |
| type | The type of activity. Valid activities for a document include: Created, DataUpdated, StatusUpdated, Deleted | String | Yes |
| source | Source which initiated the activity. | String | Yes |
| timeStamp | The time stamp when the activity occurred | String | Yes |

TABLE 8-continued

| | | | |
|---|---|---|---|
| details | Array of details for an activity | Array | Yes |
| dataName | Name of the attribute that has changed | String | Yes |
| previousValue | The value of the changed attribute, prior to the activity | String | No |
| newValue | The value of the changed attribute, after the activity | String | No |
| documentId | The unique document identifier | String | Yes |
| envelopeId | The unique envelope identifier | String | Yes |
| documentStatus | The document status - NotPaid, ScheduledPayment, Paid, or PaymentFailed | String | Yes |
| lastModifiedOn | The last modified timestamp | String | Yes |

Illustrative Examples of Computer Code to Obtain Document's Activity Data:

```
Sample Request
GET /v81/envelope/EV:300000/document/DC:0000001/activity
Sample Response
HTTP/1.x 200 OK
Content-Type: application/json;
{
  "activities": [
    {
      "activity": {
        "id": "743986431985684",
        "type": "Created",
        "source": "brand/BB:0000000100",
        "timeStamp": "2014-03-03 21:10:00.915",
        "details": [
          {
            "documentId": "DC:0000001",
            "envelopeId": "EV:300000",
            "documentStatus": "NotPaid",
            "lastModifiedOn": "2014-03-03 21:10:00.915"
          }
        ]
      }
    },
    {
      "activity": {
        "id": "743986431985684",
        "type": "StatusUpdated ",
        "source": "channel/CP:0000000100",
        "timeStamp": "2014-03-03 17:10:00.915",
        "details": [
          {
            "documentStatus": "Paid",
            "lastModifiedOn": "2014-03-03 21:10:00.915"
          }
        ]
      }
    },
    {
      "activity": {
        "id": "743986431985685",
        "type": "DataUpdated",
        "source": "channel/CP:0000000100",
        "timeStamp": "2014-11-14 17:10:00.915",
        "details": [
          {
            "dataName": "documentDate",
            "previousValue": "",
            "newValue": "2013-11-15 14:01:43.01"
          }
        ]
      }
    }
  ]
}
```

Illustrative Examples of Operations on Event Notifications in Accordance with Some Embodiments of the Instant Invention In some embodiments, Event Notification Subscription is used for channels to subscribe to events of interest on the Channel Notification Queue. Channels can choose to subscribe to receive events of interest from the platform. In some embodiments, Events notifications will be sent asynchronously to the channel. The Notification can be delivered in at least two different methods:

HTTP POST, and

Notification Queue.

In some embodiments, The Notification Queue is responsible for the guaranteed delivery of events to channels.

Event Format Example

The JSON representation of a complete "Event Notification" is:

```
{
"eventNotification": {
"eventId": eventId,
"subscriptionId": subscriptionId,
"subscriberId": subscriberId,
          "event": {
"eventType" : eventType,
                      eventTypeData: {...}
}
          "deliveryMethod" : deliveryMethod,
"eventTimeStamp": EventDateAndTime
}
```

Table 9 provides illustrative examples of event types.

TABLE 9

| Event Type | Description | Event Type Data |
|---|---|---|
| SubscriptionCreatedEvent | Test event used to validate delivery channel. Failure to deliver will result in the subscription being deactivated. | none |
| BrandCreatedEvent | New brand has been added | Brand Id |
| BrandUpdatedEvent | Changes to the Brand Profile | Brand Id, previous value, new value |

TABLE 9-continued

| Event Type | Description | Event Type Data |
| --- | --- | --- |
| AlertCreatedEvent | A Consumer Alert has been created | channelSpecificConsumerId, ccId, alertId, alertType |
| EnvelopeCreatedEvent | A Consumer Envelope has been created | channelSpecificConsumerId, ccId, Brand Id, Envelope Id, mailType, contentType |
| SystemEvent | An event from the platform to all Channels | Message Type, System Message |

Exemplary Computer Code for Subscription Created Event Notification Format:

```
{
"eventNotification": {
"eventId": eventId,
"subscriptionId": subscriptionId,
"subscriberId": subscriberId,
        "event": {
"eventType" : "SubscriptionCreated",
        }
                "deliveryMethod" : deliveryMethod,
"eventTimeStamp": eventDateAndTime
}
```

Exemplary Computer Code for Brand Created Event Notification Format:

```
{
"eventNotification": {
"eventId": eventId,
"subscriptionId": subscriptionId,
"subscriberId": subscriberId,
        "event": {
"eventType" : "BrandCreatedEvent",
"brandCreatedData" : {
                "brandId": brandId
        }
}
        "deliveryMethod" : deliveryMethod,
"eventTimeStamp": eventDateAndTime
}
```

Exemplary Computer Code for Brand Updated Event Notification Format:

```
{
"eventNotification": {
"eventId": eventId,
"subscriptionId": subscriptionId,
"subscriberId": subscriberId,
        "event": {
"eventType" : "BrandUpdatedEvent",
        "brandUpdatedData": {
                "brandId": brandId,
                "previousValue" : {
                        "brandProfileDataName": BrandProfileDataName,
                        "brandProfileDataValue": OldBrandProfileDataValue,
},
                "newValue" : {
                        "brandProfileDataName": BrandProfileDataName,
                        "brandProfileDataValue": NewBrandProfileDataValue,
                }
        }
}
}
        "deliveryMethod" : deliveryMethod,
"eventTimeStamp": eventDateAndTime
}
```

Exemplary Computer Code for Alert Created Event Notification Format:

```
{
    "eventNotification": {
        "eventId": eventId,
        "subscriptionId": subscriptionId,
        "subscriberId": subscriberId,
        "event": {
            "eventType": "AlertCreatedEvent",
            "alertCreatedData": {
                "channelSpecificConsumerId":channelSpecificConsumerId,
                "ccId": fluentConsumerId,
                "alertId": alertId,
                "alertType": alertType
            }
        },
        "deliveryMethod":deliveryMethod,
        "eventTimestamp": eventTimestamp
    }
}
```

Exemplary Computer Code for Envelope Created Event Notification Format:

```
{
    "eventNotification": {
        "eventId": eventId,
        "subscriptionId": subscriptionId,
        "subscriberId": subscriberId,
        "event": {
            "eventType": "EnvelopeCreatedEvent",
            "envelopeCreatedData": {
                "channelSpecificConsumerId": channelSpecificConsumerId,
                "ccId": fluentConsumerId,
                "brandId": brandId,
                "envelopeId": envelopeId,
                "mailType": mailType,
                "contentType": contentType
            }
        },
        "deliveryMethod": deliveryMethod,
        "eventTimeStamp": eventDateAndTime
    }
}
```

Exemplary Computer Code for Subscription Format as JSON Representation of a Complete "Notification Subscription":

```
{
    "notificationSubscription": {
        "subscriptionId": subscriptionId,
        "subscriberId": subscriberId,
            "eventTypes" : [eventTypes],
            "deliveryMethod" : deliveryMethod,
            "webHook": {
                "URL" : url
            },
            "MQ" : {
                ChannelId.CHANNEL.NOTIFY
            },
            "subscriptionStatus": ccStatus,
        "lastModifiedOn": LastModifiedDateAndTime
    }
}
```

Exemplary Notification Subscription Identifiers

In some embodiments, each notification Subscription is identified by a unique "Subscription Id". In some embodiments, each Notification Subscription is associated with one Subscriber, such as a Channel. In some embodiments, a subscription can be for a single event type or for several event types.

In some embodiments, a subscription Id will be returned upon successful creation of the channel subscription. Changes or deletes to subscription will require this subscription Id.

In some embodiments, All URLs of the form:

/channel/{channelId}/subscription/subscriptionId can be replaced with an equivalent:

/subscription/subscriptionId.

Notification Subscription Status

In some embodiments, Table 10 identifies exemplary status values for the Channel Notification Subscription.

TABLE 10

| Status | Description |
| --- | --- |
| Active | The subscription is available and active |
| Pending | Waiting on successful sending of test event |
| Inactive | The subscription has been deactivated by the subscriber, or because of a notification failure |
| Deleted | The subscribed has deleted this subscription |

Exemplary Test Event Process

In some embodiments, the sequence begins when a channel requests a subscription for a series of Events. Below is the exemplary computer code for a case where a channel "CP:0000000100" is requesting a web-based call-back to "http://fluentevents.mychannel.com" when any of three events are detected: "BrandCreatedEvent", "BrandUpdatedEvent", or "EnvelopeCreatedEvent":

```
POST /v81/channel/CP:0000000100/subscription       HTTP/1.1
{
    "notificationSubscription": {
        "eventTypes": [
            "BrandCreatedEvent",
            "BrandUpdatedEvent",
            "EnvelopeCreatedEvent"
        ],
        "deliveryMethod": "WebHook",
        "webHook": {
            "URL": "http://fluentevents.mychannel.com"
        }
    }
}
```

The system will respond to the POST with a HTTP 200 OK and the following body:

```
{
    "notificationSubscription": {
        "subscriptionId": "EVS:20000",
        "subscriptionStatus": "Pending",
        "lastModifiedOn": "2014-02-21 16:14:50.113"
    }
}
```

This indicates that a subscription with Id "EVS:20000" has been created, but the delivery method has not been verified yet ("subscriptionStatus": "Pending"). To confirm the delivery method, the system may send a test event to the specified delivery method. In this case, the system will initiate an HTTP POST to the specified URL, since a webHook delivery method has been requested. (In the case of a MQ delivery method, the test event would be sent to the specified queue):

```
POST fluentevents.mychannel.com          HTTP/1.1
{
"eventNotification": {
"eventId": "EID:20000-001",
"subscriptionId": "EVS:20000",
"subscriberId": "ChannelId:CP:0000000100",
         "event": {
"eventType" : "SubscriptionCreatedEvent",
                  eventTypeData: { }
}
         "deliveryMethod" : "WebHook",
"eventTimeStamp": "2014-02-21 16:15:10.213"
}
```

If the platform received an HTTP 200 OK from "events.mychannel.com", the platform may mark this subscription's status as "Active". Otherwise, the subscription status will be "Inactive". This can be checked by the channel using, for example, computer code:

```
GET /v81/subscription/EVS:20000
         HTTP/1.1
Response
{
  "notificationSubscription": {
    "subscriptionId": "EVS:20000",
    "subscriberId": "ChannelId:CP:0000000100",
    "eventTypes": [
       "BrandCreatedEvent",
       "BrandUpdatedEvent",
       "EnvelopeCreatedEvent"
    ],
  },
  "deliveryMethod": "WebHook",
  "webHook": {
     "URL": "HTTP:// events.mychannel.com"
  },
  "subscriptionStatus": "Active",
  "lastModifiedOn": "2014-02-20 12:10:20.856"
}
```

In some embodiments, if the delivery method needs to be retried, a new subscription request has to be POSTed.

Exemplary Notification Subscription Activity

In some embodiments, Table 11 provides examples of activities that a channel can request about a Channel Consumer.

TABLE 11

| Activity Type | Description | Activity Data |
|---|---|---|
| Created | Creation of the Subscription | Activity Date, Source |
| UpdatedStatus | Change in Subscription Status | Activity Date, Source, previous value, new value |
| UpdatedData | Change in Subscription details | Activity Date, Source, previous value, new value |
| EventSent | Event sent to subscriber based on subscription | Activity Date, Source, Result |
| Deleted | Deletion of the subscription | Activity Date, Source |

Illustrative Examples of Address Standardization in Accordance with Some Embodiments of the Instant Invention In some embodiments, the exemplary communication exchange of instant invention (e.g., Fluent) utilizes the standardization of address information submitted on the input data feed. In some embodiments, the name and address information stored in an exemplary database has been scrubbed and standardized using a software application such as a CASS Certified™ application that prepares addresses for United States Postal Service® (USPS®) handling (e.g., the software verifies, standardizes and corrects address elements, and appends postal codes). In some embodiments, the exemplary communication exchange of instant invention outputs a value from the address standardization process that is the DPV (Delivery Point value).

Exemplary Data Feed Creation

In some embodiments, the requirements of the interface file that is processed for address scrubbing and standardization. In some embodiments, data must be populated into this format.

Table 12 presents exemplary data mapping rules to be applied.

Exemplary Input Interface File Layout

TABLE 12

| Column Name Input to Finalist | Length | Starting Position | Ending Position | Andover Field Name |
|---|---|---|---|---|
| CONTROL-NUMBER | 10 | 1 | 10 | |
| JOB-NUMBER | 6 | 12 | 17 | |
| RECORD-DATE | 6 | 19 | 24 | |
| CUSIP | 9 | 26 | 34 | IFS-TAX-ID |
| CLIENT-NO | 3 | 36 | 38 | |
| CUST-ACCT-NO | 19 | 40 | 58 | IFS-POLICY-NUMBER |
| SERVICE | 2 | 60 | 61 | |
| DOCUMENT_ID | 4 | 63 | 66 | |
| ZIP-CODE | 5 | 68 | 72 | |
| ORIG-ADDR-LINE-COUNT | 1 | 74 | 74 | |
| OBO-NOBO-TAG | 1 | 76 | 76 | |
| ORIG-ADDR-LINE(1) | 36 | 78 | 113 | FIRST_NAME LAST_NAME |
| ORIG-ADDR-LINE(2) | 36 | 115 | 150 | ADDRESS-LINE-1 |
| ORIG-ADDR-LINE(3) | 36 | 152 | 187 | ADDRESS-LINE-2 |
| ORIG-ADDR-LINE(4) | 36 | 189 | 224 | ADDRESS-LINE-3 |
| ORIG-ADDR-LINE(5) | 36 | 226 | 261 | ADDRESS-LINE-4 |
| ORIG-ADDR-LINE(6) | 36 | 263 | 298 | ADDRESS-LINE-5 |
| ORIG-ADDR-LINE(7) | 36/37 | 300 | 335 | CITY STATE ZIP |
| SEQUENCE -NO | 3 | 338 | 340 | |
| FINALIST-ADDR-LINE(1) | 36 | 342 | 377 | |
| FINALIST-ADDR-LINE(2) | 36 | 379 | 414 | |
| FINALIST-ADDR-LINE(3) | 36 | 416 | 451 | |
| FINALIST-ADDR-LINE(4) | 36 | 453 | 488 | |

TABLE 12-continued

| Column Name Input to Finalist | Length | Starting Position | Ending Position | Andover Field Name |
|---|---|---|---|---|
| FINALIST-ADDR-LINE(5) | 36 | 490 | 525 | |
| FINALIST-ADDR-LINE(6) | 36 | 527 | 562 | |
| FINALIST-ADDR-LINE(7) | 36/37 | 564 | 600 | |
| FINALIST-CITY | 25 | 602 | 626 | |
| FINALIST-STATE-CODE | 2 | 628 | 629 | |
| FINALIST-ZIP4-CODE | 4 | 631 | 634 | |
| FINALIST-ZIPCODE | 5 | 636 | 640 | |
| FINALIST-ZIPA-PLUS2-CODE | 11 | 642 | 652 | |
| FINALIST-ZIP4-PLUS2-CKDIG | 1 | 654 | 654 | |
| FINALIST-ZIPB-PLUS2-CODE | 5 | 656 | 660 | |
| FINALIST-ZIP-PLUS2-CKDIG | 1 | 662 | 662 | |
| COUNTRY-NAME | | 664 | ??? | |
| Email-Address | | ??? | ??? | |

Notes:
1. Each field separated by Pipe (|)
2. Place the name in ORIG-ADDR-LINE(1)
3. Address goes in ORIG-ADDR-LINE(2) through (7), using as many lines as necessary
4. City, State, and Zip occupy the last used address line Exemplary Standardization Process In some embodiments, the exemplary communication exchange of the instant invention performs at least the following, but not limited to:

1) Automatically initiate processing
2) Run a communications exchange customer file through the address standardization routines, creating an output file with DPV's and standardized addresses;
3) Electronically Transmit the output file to the Fluent by dropping it into a designated folder and triggering the appropriate Fluent ingestion process.

Exemplary Output File Processing
Exemplary Output Interface File Layout

In some embodiments, the exemplary output file process will return the standardized address in the following record format shown in Table 13.

TABLE 13

| Column Name Output from Finalist | Length | Starting Position | Ending Position | Notes |
|---|---|---|---|---|
| Carriage control | 1 | 1 | 1 | always a "1" |
| Sequence number | 10 | 3 | 12 | |
| Account Number | 30 | 14 | 43 | |
| Cusip | 20 | 45 | 64 | |
| Doc Type | 30 | 66 | 95 | |
| client id | 5 | 97 | 101 | |
| Address line 1 | 70 | 103 | 172 | |
| Address line 2 | 70 | 174 | 243 | |
| Address line 3 | 70 | 245 | 314 | |
| Address line 4 | 70 | 316 | 385 | |
| Address line 5 | 70 | 387 | 456 | |
| Address line 6 | 70 | 458 | 527 | |
| Address line 7 | 70 | 529 | 598 | |
| Cass/Finalist Address line 1 | 70 | 600 | 669 | This is the address without the name |
| Cass/Finalist Address line 2 | 70 | 671 | 740 | |
| Cass/Finalist Address line 3 | 70 | 742 | 811 | |
| Cass/Finalist Address line 4 | 70 | 813 | 882 | |
| Cass/Finalist Address line 5 | 70 | 884 | 953 | |
| Cass/Finalist Address line 6 | 70 | 955 | 1024 | |
| 11 Digit Zip code | 11 | 1026 | 1036 | May be blank |
| 9 Digit Zip code | 10 | 1038 | 1047 | |
| Cass/Finalist City | 25 | 1049 | 1073 | |
| Cass/Finalist St | 2 | 1075 | 1076 | |
| LPCRC | 1 | 1078 | 1078 | |
| PBFN Non-deliverable Indicator | 1 | 1080 | 1080 | |
| Failure Type | 3 | 1082 | 1084 | |
| LPC Error | 4 | 1086 | 1089 | |
| Cass Addressed changed | 1 | 1091 | 1091 | |
| LPC Reason 1 | 1 | 1093 | 1093 | |
| LPC Reason 2 | 1 | 1095 | 1095 | |
| LPC Reason 3 | 1 | 1097 | 1097 | |
| LPC Reason 4 | 1 | 1099 | 1099 | |
| LPC Reason 5 | 1 | 1101 | 1101 | |
| LPC Reason 6 | 1 | 1103 | 1103 | |
| LPC Reason 7 | 1 | 1105 | 1105 | |
| LPC Reason 8 | 1 | 1107 | 1107 | |
| LPC Reason 9 | 1 | 1109 | 1109 | |
| LPC Reason 10 | 1 | 1111 | 1111 | |
| LPC Reason 11 | 1 | 1113 | 1113 | |

TABLE 13-continued

| Column Name Output from Finalist | Length | Starting Position | Ending Position | Notes |
|---|---|---|---|---|
| LPC Reason 12 | 1 | 1115 | 1115 | |
| Dom foreign flag | 1 | 1117 | 1117 | |
| Page total | 5 | 1119 | 1123 | |
| Site ID | 10 | 1125 | 1134 | (blanks) |
| Envelope type | 3 | 1136 | 1138 | |
| Selective insert 1 | 1 | 1140 | 1140 | |
| Selective insert 2 | 1 | 1142 | 1142 | |
| Selective insert 3 | 1 | 1144 | 1144 | |
| Selective insert 4 | 1 | 1146 | 1146 | |
| Selective insert 5 | 1 | 1148 | 1148 | |
| Selective insert 6 | 1 | 1150 | 1150 | |
| Selective insert name 1 | 20 | 1152 | 1171 | |
| Selective insert name 2 | 20 | 1173 | 1192 | |
| Selective insert name 3 | 20 | 1194 | 1213 | |
| Selective insert name 4 | 20 | 1215 | 1234 | |
| Selective insert name 5 | 20 | 1236 | 1255 | |
| Selective insert name 6 | 20 | 1257 | 1276 | |
| Simplex/duplex flag | 1 | 1278 | 1278 | |
| Manifest flag | 1 | 1280 | 1280 | |
| Process type | 2 | 1282 | 1283 | |
| Address Type | 1 | 1285 | 1285 | |
| Email | Automatically determined | 1287 | Automatically determined | |

Exemplary Matching Techniques

In some embodiments, the objective of the matching process is to locate records in the Fluent database which are likely matches to the records in additional electronic sources, such as 3$^{rd}$ party sources. In some embodiments, the input file from additional source(s) is matched against the Fluent Account History database. In some embodiments, when there is a match, Fluent use the Account History fields to do a look-up on the Fluent Preferences database, and retrieve the matching Preference records that have an email address.

In some embodiments, the matching process employs a combination of different techniques, to increase the likelihood of finding a match. In some embodiments, the matching techniques can vary based on by insurance client. For example, some insurance clients might only supply name and address. In some embodiments, the exemplary matching techniques can be classified into the following categories, but not limited to:

Broker ID (Parent Client_ID) and Broker Account Number Matching (aka Gold)

Broker ID (Parent Client_ID) plus Name and Address Matching (aka Silver)

Name and Address only Matching (aka Bronze).

In some embodiments, Fluent can use a combination of different techniques on any given insurance client file, in order to maximize the hit rate. In some embodiments, Fluent can use Fuzzy matching within based on a particular algorithm and/or related probability threshold.

Exemplary Broker ID/Broker Account Number Matching (Gold)

In some embodiments, this matching technique, based on receiving this type of data from the insurance client. This involves matching on the following data items:

Originating Broker Dealer (which will be mapped back to "Parent Client ID")

Broker Dealer Account Number (the investor's account number at the Broker Dealer)

Investor/Policy Holder Name (e.g., for confirmation purposes only).

In some embodiments, name matching employs fuzzy matching techniques as appropriate.

Exemplary Broker ID+Name and Address Matching (Silver)

In some embodiments, this matching technique based on getting who the originating broker dealer is from the insurance client. In some embodiments, this involves matching on the following data items:

Originating Broker Dealer (without an Account Number) (e.g. Merrill Lynch) which will be mapped back to "Parent Client ID" in inventive communication exchange of the instant invention (e.g., a receiving file contains PRNT_CLIENT_ID which maps directly to the correct Parent ID for an inclusive match.)

Investor/Policy Holder Name (with fuzzy matching techniques applied)

Investor/Policy Holder Address (using DPV and address standardization techniques).

Exemplary Name and Address Only Matching (Bronze)

In some embodiments, this matching technique, based on inability to get the Broker Identification Code and the Investor's Account Number from the insurance client. This involves matching on the following data items:

Investor/Policy Holder Name (with fuzzy matching techniques applied)

Investor/Policy Holder Address (using DPV and address standardization techniques).

Exemplary Matching Processes

Figure 38:
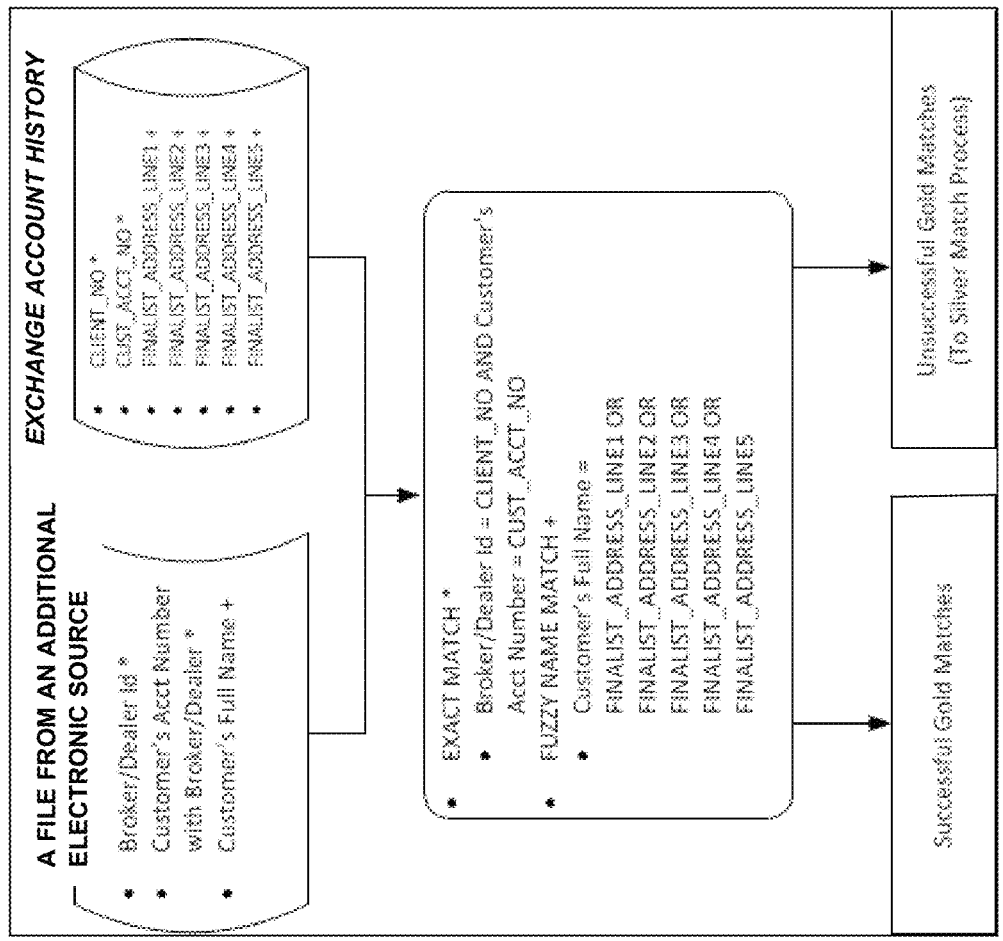

Exemplary matching in accordance with FIG. 38 (Gold match)

In some embodiments, this matching technique involves matching on at least the following data items:

Originating Broker Dealer (which can be mapped back to "Client ID" in the inventive communication exchange of the instant invention)

Broker Dealer Account Number (the investor's account number at the Broker Dealer)

Investor/Policy Holder Name (for confirmation purposes only).

In some embodiments, name matching can employ fuzzy matching techniques as appropriate.

Figure 39:
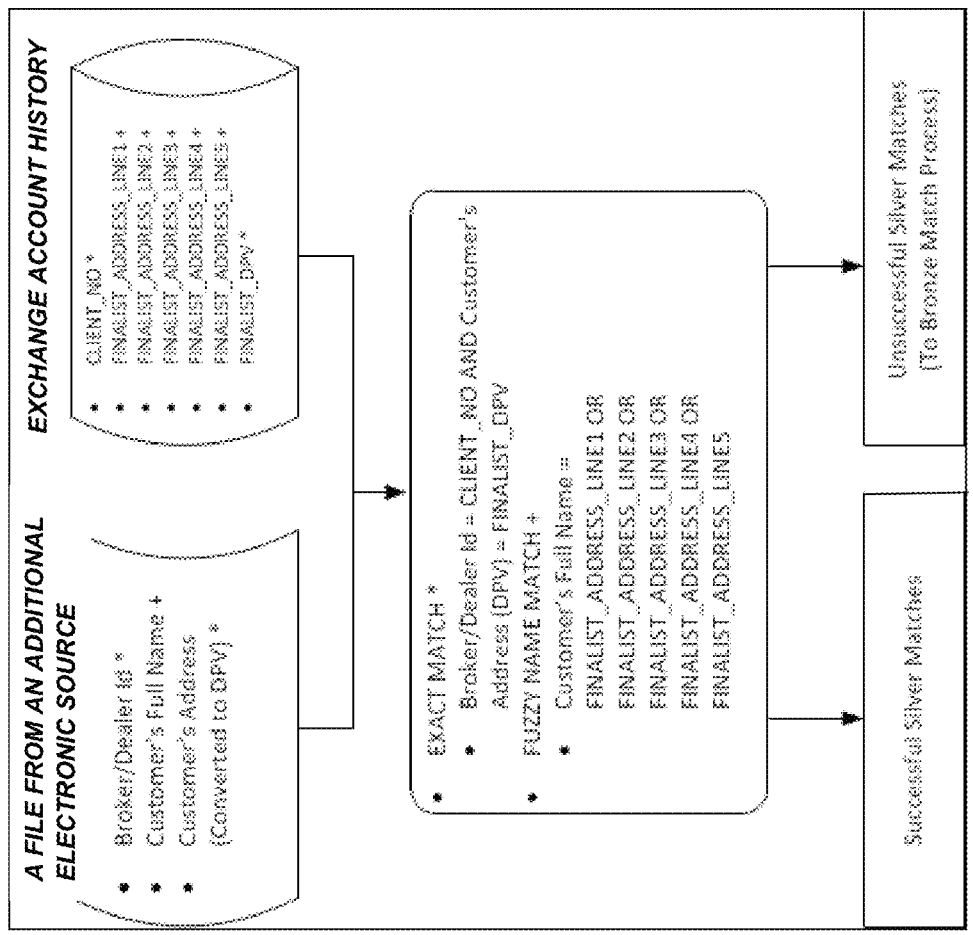

Exemplary Matching in Accordance with FIG. 39 (Silver Match)

In some embodiments, this matching technique, based on getting who the originating broker dealer is from the insurance client. In some embodiments, this involves matching on at least the following data items:

Originating Broker Dealer (without an Account Number) (e.g. Merrill Lynch) which will be mapped back to "Parent Client ID" in the Fluent Investor/Policy Holder Name (with fuzzy matching techniques applied)

Investor/Policy Holder Address (using DPV and address standardization techniques).

Figure 40:
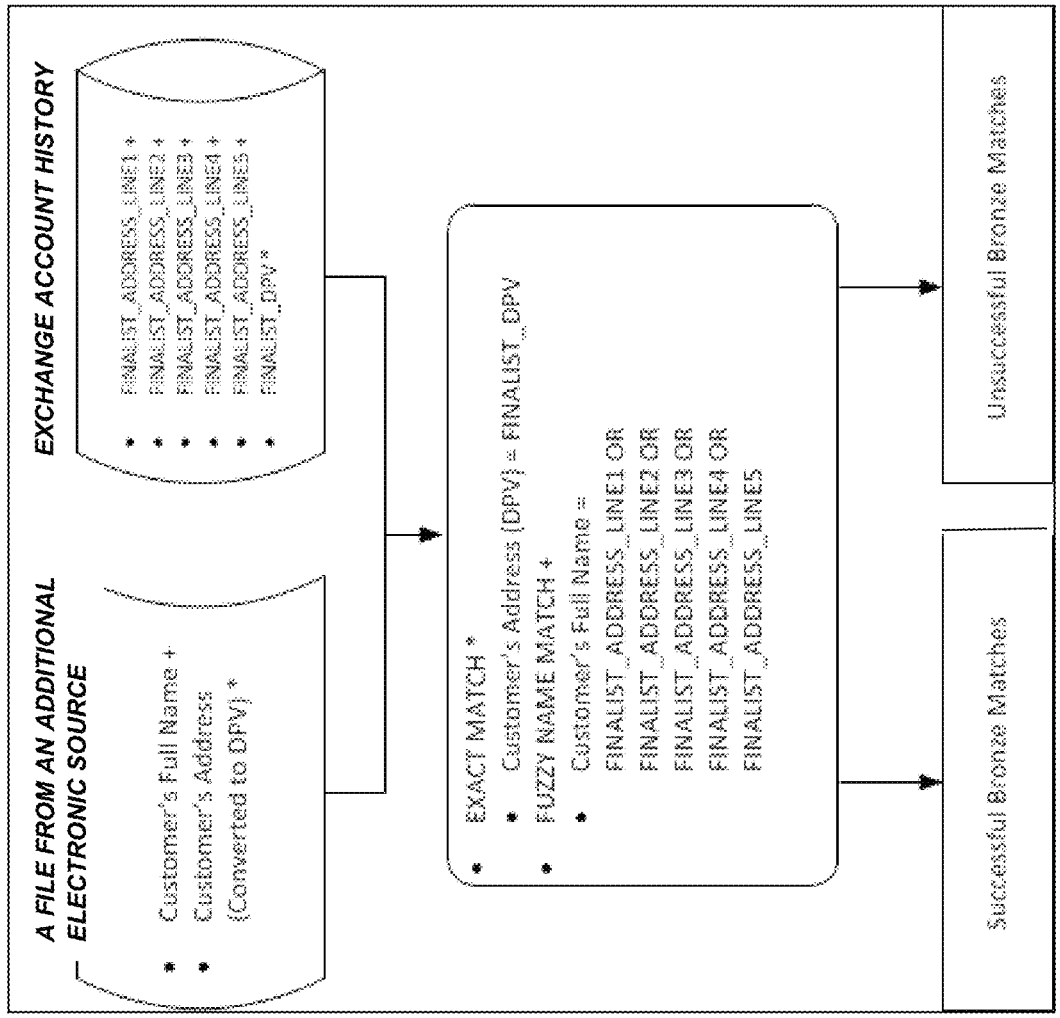

Exemplary Matching in Accordance with FIG. 40 (Bronze Match)

In some embodiments, this matching technique, based on inability to get the Broker Identification Code and the Investor's Account Number from the insurance client. In some embodiments, this involves at least matching on at least the following data items:

Investor/Policy Holder Name (with fuzzy matching techniques applied)

Investor/Policy Holder Address (using DPV and address standardization techniques).

Exemplary Fuzzy Match Strategies

In some embodiments, when the Broker Id and Customer Account Number are absent in the input data file, the name and address information can be used in the matching process.

Fuzzy Name Match

Figure 41:
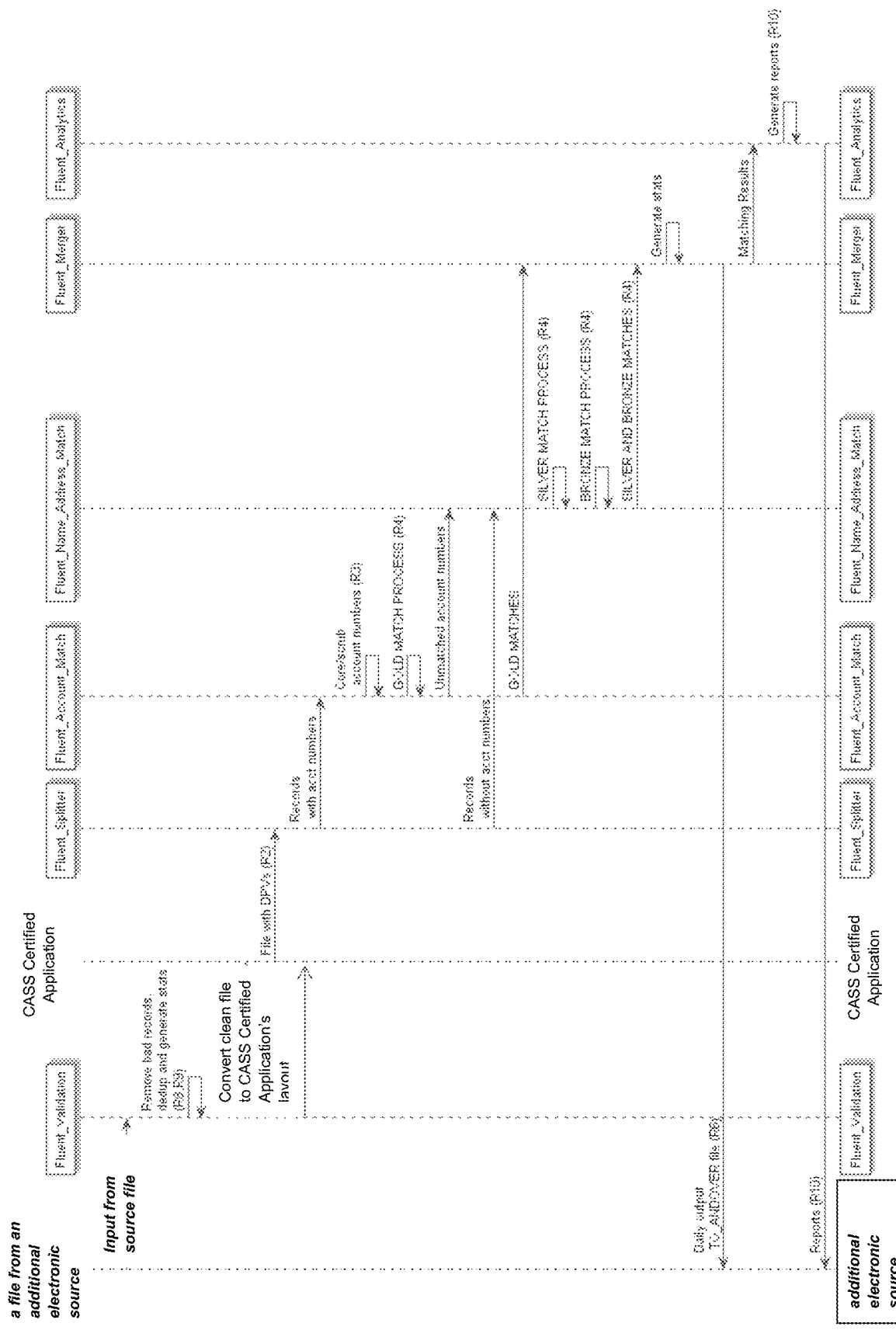

In some embodiments, the inventive communication exchange of the instant invention employs several techniques to yield the highest name match rates. These include:

Database Substring Search: this technique involves searching parts of the full name in the input record as substrings among the five name/address fields of the Account History table;

Text Feature: a fuzzy search feature (e.g., Oracle™ capable of ranking the relevance of match results;

Apache Lucene and SOLR text searching for fuzzy name matching;

Name and Address Service to provide name and address matching and account discovery as services;

Fuzzy Address Match to address at least the following:

cleansing and/or matching unstructured addresses that may contain abbreviations, special characters, and/or varying positions of address elements. As, for example, depicted in the diagram of FIG. 41, the input data file will be reformatted for CASS Certified application processing prior to the actual matching process. In some embodiments, the CASS Certified application computes a unique identifier called Delivery Point Value (DPV) for each given address. In some embodiments, Fluent compares this computed DPV with the DPVs in the Account History table effectively transforming what was originally fuzzy into an exact matching process.

In some embodiments, the instant invention is directed to a computer-implemented method which includes at least the following steps: electronically storing, in real-time, by at least one specifically programmed computer processor of an electronic communications exchange executing software to perform the method, historical communications data about communications between a plurality of companies and a plurality of consumers of the plurality of companies in at least one database residing in non-transient memory; causing, in real-time, via a computer network, by the at least one specifically programmed computer processor of the electronic communications exchange executing software to perform the method, to display at least one company personalized communications set-up graphical user interface on at least one first electronic device, being utilized by at least one first representative of at least one first company, where the at least one company personalized communications set-up graphical user interface is configured to allow the at least one first representative to dynamically define a first plurality of company communications attributes, where the first plurality of company communications attributes include: i) first company identifying data, identifying information about the at least one first company, ii) a first plurality of company approved consumer delivery communications channels, iii) at least one first consumer validation rule, identifying at least one first identity verification condition to verify an identity of a customer, iv) first company delivery consent terms data, defining terms to which a consumer is required to consent prior to delivery of a communication from or on behalf of the at least one first company, and v) first company consumer presentation data, defining how to display on a graphical user interface information of the at least one first company to a consumer; causing, in real-time, via the computer network, by the at least one specifically programmed computer processor of the electronic communications exchange executing software to perform the method, to display at least one company personalized communications set-up graphical user interface on at least one second electronic device, being utilized by at least one second representative of at least one second company, where the at least one company personalized communications set-up graphical user interface is configured to allow the at least one second representative to dynamically define a second plurality of company communications attributes, where the second plurality of company communications attributes include: i) second company identifying data, identifying information about the at least one second company, ii) a second plurality of company approved consumer delivery communications channels, iii) at least one second consumer validation rule, identifying at least one second identity verification condition to verify an identity of a customer, iv) second company delivery consent terms data, defining terms to which a consumer is required to consent prior to delivery of a communication from or on behalf of the at least one second company, and v) second company consumer presentation data, defining how to display on a graphical user interface information of the at least one second company to a consumer; electronically and automatically storing, in real-time, by the at least one specifically programmed computer processor of the electronic communications exchange executing software to perform the method, the first plurality of company communications attributes of the at least one first company and the second plurality of company communications attributes of the at least one second company in the at least one database residing in the non-transient memory; causing, in real-time, via the computer network, by the at least one specifically programmed computer processor of the electronic communications exchange executing software to perform the method, to display at least one consumer communications set-up graphical user interface on at least one third electronic device, being utilized by at least one first consumer, where the at least one consumer personalized communications set-up graphical user interface is configured to allow the at least one first consumer to dynamically define a first plurality of consumer communications preference attributes, where the first plurality of consumer communications preference attributes include: i) at least one first preference attribute, identifying a type of a first plurality of electronic communications communication that the at least one first consumer desires to electronically receive, ii) at least one second preference attribute, identifying at least one first particular company from which the at least one first consumer desires to electronically receive the first plurality of electronic communications directed to the at least one first consumer, and iii) at least one third preference attribute, identifying at least one first consumer delivery communications channel to be utilized for electronically sending the first plurality of electronic communications; causing, in real-time, via the computer network, by the at least one specifically programmed computer processor of the electronic communications exchange executing software to perform the method, to display the at least one consumer communications set-up graphical user interface on at least one fourth electronic device, being utilized by at least one second consumer, where the at least one consumer personalized communications set-up graphical user interface is configured to allow the at least one second consumer to dynamically define a second plurality of consumer communications preference attributes, where the second plurality of consumer communications preference attributes include: i) at least one fourth preference attribute, identifying a type of a second plurality of electronic communications that the at least one second consumer desires to electronically receive, ii) at least one fifth preference attribute, identifying at least one second particular company from which the at least one second consumer desires to electronically receive the second plurality of electronic communications directed to the at least one second consumer, and iii) at least one sixth preference attribute, identifying at least one second consumer delivery communications channel to be utilized for electronically sending the second plurality of electronic communications; automatically matching, in real-time, by the at least one specifically programmed computer processor of the electronic communications exchange executing software to perform the method, at least one of the at least one first company and at least one second company to at least one of the at least one first consumer and the at least one second consumer based at least in part on: i) the first plurality of company communications attributes, ii) the second plurality of company communications attributes, iii) the first plurality of consumer communications preference attributes, and iv) the second plurality of consumer communications preference attributes; automatically updating, in real-time, by the at least one specifically programmed computer processor of the electronic communications exchange executing software to perform the method, based at least in part on the historical communications data and outcome of the matching, at least the following: i) the first plurality of company communications attributes, ii) the second plurality of company communications attributes, iii) the first plurality of consumer communications preference attributes, iv) the second plurality of consumer communications preference attributes, and v) the at least one consumer communications set-up graphical user interface, and vi) the at least one company personalized communications set-up graphical user interface; and automatically and electronically delivering, in real-time, by the at least one specifically programmed computer processor of the electronic communications exchange executing software to perform the method, the first plurality of electronic communications to the at least one first consumer; automatically and electronically delivering, in real-time, by the at least one specifically programmed computer processor of the electronic communications exchange executing software to perform the method, the second plurality of electronic communications to the at least one first consumer; automatically and electronically delivering, in real-time, by the at least one specifically programmed computer processor of the electronic communications exchange executing software to perform the method, a third plurality of electronic communications, from or on behalf of the at least one first company, based at least in part on the first plurality of company communications attributes; and automatically and electronically delivering, in real-time, by the at least one specifically programmed computer processor of the electronic communications exchange executing software to perform the method, a fourth plurality of electronic communications, from or on behalf of the at least one second company, based at least in part on the second plurality of company communications attributes.

In some embodiments, the first plurality of company approved consumer delivery communications channels, the second plurality of company approved consumer delivery communications channels, the at least one first consumer delivery communications channel, and the at least one second consumer delivery communications channel are selected from the group consisting of: i) secure electronic messaging system, ii) a website, and iii) a digital mail system.

In some embodiments, the at least one first consumer is one of: i) an individual, ii) an retail investor, iii) an institutional investor, and iv) an entity that is not a person.

In some embodiments, the at least one second consumer is one of: i) an individual, ii) an retail investor, iii) an institutional investor, and iv) an entity that is not a person.

In some embodiments, the method further includes the steps of automatically generating, in real-time, by the at least one specifically programmed computer processor of the electronic communications exchange executing software to perform the method, a first plurality of electronic alerts to the at least one first consumer regarding the first plurality of electronic communications; and automatically generating, in real-time, by the at least one specifically programmed computer processor of the electronic communications exchange executing software to perform the method, a second plurality of electronic alerts to the at least one second consumer regarding the second plurality of electronic communications.

In some embodiments, the method further includes the steps of automatically generating, in real-time, by the at least one specifically programmed computer processor of the electronic communications exchange executing software to perform the method, a first plurality of electronic notifications to the at least one first company regarding the third plurality of electronic communications attributes; and automatically generating, in real-time, by the at least one specifically programmed computer processor of the electronic communications exchange executing software to perform the method, a second plurality of electronic notifications to the at least one second company regarding the fourth plurality of electronic communications attributes.

In some embodiments, the instant invention is directed to a specifically programmed electronic communications exchange which includes at least the following specifically programmed components: at least one specialized computer machine, including: a non-transient memory, electronically storing particular computer executable program code; and at least one computer processor which, when executing the particular program code, becomes a specifically programmed computer processor of the electronic communications exchange that is configured to at least perform the following operations: electronically storing, in real-time, historical communications data about communications between a plurality of companies and a plurality of consumers of the plurality of companies in at least one database residing in non-transient memory; causing, in real-time, via a computer network, to display at least one company personalized communications set-up graphical user interface on at least one first electronic device, being utilized by at least one first representative of at least one first company, where the at least one company personalized communications set-up graphical user interface is configured to allow the at least one first representative to dynamically define a first plurality of company communications attributes, where the first plurality of company communications attributes include: i) first company identifying data, identifying information about the at least one first company, ii) a first plurality of company approved consumer delivery communications channels, iii) at least one first consumer validation rule, identifying at least one first identity verification condition to verify an identity of a customer, iv) first company delivery consent terms data, defining terms to which a consumer is required to consent prior to delivery of a communication from or on behalf of the at least one first company, and v) first company consumer presentation data, defining how to display on a graphical user interface information of the at least one first company to a consumer; causing, in real-time, via the computer network, to display at least one company personalized communications set-up graphical user interface on at least one second electronic device, being utilized by at least one second representative of at least one second company, where the at least one company personalized communications set-up graphical user interface is configured to allow the at least one second representative to dynamically define a second plurality of company communications attributes, where the second plurality of company communications attributes include: i) second company identifying data, identifying information about the at least one second company, ii) a second plurality of company approved consumer delivery communications channels, iii) at least one second consumer validation rule, identifying at least one second identity verification condition to verify an identity of a customer, iv) second company delivery consent terms data, defining terms to which a consumer is required to consent prior to delivery of a communication from or on behalf of the at least one second company, and v) second company consumer presentation data, defining how to display on a graphical user interface information of the at least one second company to a consumer; electronically and automatically storing, in real-time, the first plurality of company communications attributes of the at least one first company and the second plurality of company communications attributes of the at least one second company in the at least one database residing in the non-transient memory; causing, in real-time, via the computer network, to display at least one consumer communications set-up graphical user interface on at least one third electronic device, being utilized by at least one first consumer, where the at least one consumer personalized communications set-up graphical user interface is configured to allow the at least one first consumer to dynamically define a first plurality of consumer communications preference attributes, where the first plurality of consumer communications preference attributes include: i) at least one first preference attribute, identifying a type of a first plurality of electronic communications communication that the at least one first consumer desires to electronically receive, ii) at least one second preference attribute, identifying at least one first particular company from which the at least one first consumer desires to electronically receive the first plurality of electronic communications directed to the at least one first consumer, and iii) at least one third preference attribute, identifying at least one first consumer delivery communications channel to be utilized for electronically sending the first plurality of electronic communications; causing, in real-time, via the computer network, to display the at least one consumer communications set-up graphical user interface on at least one fourth electronic device, being utilized by at least one second consumer, where the at least one consumer personalized communications set-up graphical user interface is configured to allow the at least one second consumer to dynamically define a second plurality of consumer communications preference attributes, where the second plurality of consumer communications preference attributes include: i) at least one fourth preference attribute, identifying a type of a second plurality of electronic communications that the at least one second consumer desires to electronically receive, ii) at least one fifth preference attribute, identifying at least one second particular company from which the at least one second consumer desires to electronically receive the second plurality of electronic communications directed to the at least one second consumer, and iii) at least one sixth preference attribute, identifying at least one second consumer delivery communications channel to be utilized for electronically sending the second plurality of electronic communications; automatically matching, in real-time, at least one of the at least one first company and at least one second company to at least one of the at least one first consumer and the at least one second consumer based at least in part on: i) the first plurality of company communications attributes, ii) the second plurality of company communications attributes, iii) the first plurality of consumer communications preference attributes, and iv) the second plurality of consumer communications preference attributes; automatically updating, in real-time, based at least in part on the historical communications data and outcome of the matching, at least the following: i) the first plurality of company communications attributes, ii) the second plurality of company communications attributes, iii) the first plurality of consumer communications preference attributes, iv) the second plurality of consumer communications preference attributes, and v) the at least one consumer communications set-up graphical user interface, and vi) the at least one company personalized communications set-up graphical user interface; and automatically and electronically delivering, in real-time, the first plurality of electronic communications to the at least one first consumer; automatically and electronically delivering, in real-time, the second plurality of electronic communications to the at least one first consumer; automatically and electronically delivering, in real-time, a third plurality of electronic communications, from or on behalf of the at least one first company, based at least in part on the first plurality of company communications attributes; and automatically and electronically delivering, in real-time, a fourth plurality of electronic communications, from or on behalf of the at least one second company, based at least in part on the second plurality of company communications attributes.

While a number of embodiments of the present invention have been described, it is understood that these embodiments are illustrative only, and not restrictive, and that many modifications may become apparent to those of ordinary skill in the art. Further, any steps described herein may be carried out in any desired order (and any steps may be added and/or deleted).

What is claimed is:

1. A computer-implemented method, comprising:

electronically storing, in real-time, by at least one specifically programmed computer processor of an electronic communications exchange executing software to perform the method, historical communications data about communications between a plurality of companies and a plurality of consumers of the plurality of companies in at least one database residing in non-transient memory;

causing, in real-time, via a computer network, by the at least one specifically programmed computer processor of the electronic communications exchange executing software to perform the method, to display at least one company personalized communications set-up graphical user interface on at least one first electronic device, being utilized by at least one first representative of at least one first company, wherein the at least one company personalized communications set-up graphical user interface is configured to allow the at least one first representative to dynamically define a first plurality of company communications attributes, wherein the first plurality of company communications attributes comprises:

i) first company identifying data, identifying information about the at least one first company, ii) a first plurality of company approved consumer delivery communications channels, iii) at least one first consumer validation rule, identifying at least one first identity verification requirement selected out of a plurality of identity verification requirements to be utilized to verify an identity of each respective customer, iv) first company delivery consent terms data, defining terms to which a consumer is required to consent prior to delivery of a communication from or on behalf of the at least one first company, and v) first company consumer presentation data, defining how to display on a graphical user interface information of the at least one first company to a consumer;

causing, in real-time, via the computer network, by the at least one specifically programmed computer processor of the electronic communications exchange executing software to perform the method, to display at least one company personalized communications set-up graphical user interface on at least one second electronic device, being utilized by at least one second representative of at least one second company, wherein the at least one company personalized communications set-up graphical user interface is configured to allow the at least one second representative to dynamically define a second plurality of company communications attributes, wherein the second plurality of company communications attributes comprises:

i) second company identifying data, identifying information about the at least one second company, ii) a second plurality of company approved consumer delivery communications channels, iii) at least one second consumer validation rule, identifying at least one second identity verification requirement selected out of the plurality of identity verification requirements to be utilized to verify the identity of each respective customer, iv) second company delivery consent terms data, defining terms to which a consumer is required to consent prior to delivery of a communication from or on behalf of the at least one second company, and v) second company consumer presentation data, defining how to display on a graphical user interface information of the at least one second company to a consumer;

receiving, in real-time, by the at least one specifically programmed computer processor of the electronic communications exchange executing software to perform the method, from the at least one first representative of the at least one first company, the first plurality of company communications attributes of the at least one first company;

receiving, in real-time, by the at least one specifically programmed computer processor of the electronic communications exchange executing software to perform the method, from the at least one second representative of the at least one second company, the second plurality of company communications attributes of the at least one second company;

electronically and automatically storing, in real-time, by the at least one specifically programmed computer processor of the electronic communications exchange executing software to perform the method, the first plurality of company communications attributes of the at least one first company and the second plurality of company communications attributes of the at least one second company in the at least one database residing in the non-transient memory;

causing, in real-time, via the computer network, by the at least one specifically programmed computer processor of the electronic communications exchange executing software to perform the method, to display at least one consumer communications set-up graphical user interface on at least one third electronic device, being utilized by at least one first consumer, wherein the at least one consumer personalized communications set-up graphical user interface is configured to allow the at least one first consumer to dynamically define a first plurality of consumer communications preference attributes, wherein the first plurality of consumer communications preference attributes comprises:

i) at least one first preference attribute, identifying a type of a first plurality of electronic communications that the at least one first consumer desires to electronically receive, ii) at least one second preference attribute, identifying at least one first particular company from which the at least one first consumer desires to electronically receive the first plurality of electronic communications directed to the at least one first consumer, and iii) at least one third preference attribute, identifying at least one first consumer delivery communications channel to be utilized for electronically sending the first plurality of electronic communications;

causing, in real-time, via the computer network, by the at least one specifically programmed computer processor of the electronic communications exchange executing software to perform the method, to display the at least one consumer communications set-up graphical user interface on at least one fourth electronic device, being utilized by at least one second consumer, wherein the at least one consumer personalized communications set-up graphical user interface is configured to allow the at least one second consumer to dynamically define a second plurality of consumer communications preference attributes,
wherein the second plurality of consumer communications preference attributes comprises:
i) at least one fourth preference attribute, identifying a type of a second plurality of electronic communications that the at least one second consumer desires to electronically receive,
ii) at least one fifth preference attribute, identifying at least one second particular company from which the at least one second consumer desires to electronically receive the second plurality of electronic communications directed to the at least one second consumer, and
iii) at least one sixth preference attribute, identifying at least one second consumer delivery communications channel to be utilized for electronically sending the second plurality of electronic communications;
automatically matching, in real-time, by the at least one specifically programmed computer processor of the electronic communications exchange executing software to perform the method, at least one of the at least one first company and at least one second company to at least one of the at least one first consumer and the at least one second consumer based at least in part on:
i) the first plurality of company communications attributes,
ii) the second plurality of company communications attributes,
iii) the first plurality of consumer communications preference attributes, and
iv) the second plurality of consumer communications preference attributes;
automatically updating, in real-time, by the at least one specifically programmed computer processor of the electronic communications exchange executing software to perform the method, based at least in part on the historical communications data and outcome of the matching, at least the following:
i) the first plurality of company communications attributes,
ii) the second plurality of company communications attributes,
iii) the first plurality of consumer communications preference attributes,
iv) the second plurality of consumer communications preference attributes, and
v) the at least one consumer communications set-up graphical user interface, and
vi) the at least one company personalized communications set-up graphical user interface; and
automatically and electronically delivering, in real-time, by the at least one specifically programmed computer processor of the electronic communications exchange executing software to perform the method, the first plurality of electronic communications to the at least one first consumer;
automatically and electronically delivering, in real-time, by the at least one specifically programmed computer processor of the electronic communications exchange executing software to perform the method, the second plurality of electronic communications to the at least one first consumer;
automatically and electronically delivering, in real-time, by the at least one specifically programmed computer processor of the electronic communications exchange executing software to perform the method, a third plurality of electronic communications, from or on behalf of the at least one first company, based at least in part on the first plurality of company communications attributes;
automatically and electronically delivering, in real-time, by the at least one specifically programmed computer processor of the electronic communications exchange executing software to perform the method, a fourth plurality of electronic communications, from or on behalf of the at least one second company, based at least in part on the second plurality of company communications attributes; and
automatically and electronically maintaining, in real time, by the at least one specifically programmed computer processor of the electronic communications exchange executing software to perform the method, an audit trail of data or information transmitted through the electronic communications exchange.

2. The method of claim 1, wherein the first plurality of company approved consumer delivery communications channels, the second plurality of company approved consumer delivery communications channels, the at least one first consumer delivery communications channel, and the at least one second consumer delivery communications channel are selected from the group consisting of:
i) secure electronic messaging system,
ii) a website, and
iii) a digital mail system.

3. The method of claim 1, wherein the at least one first consumer is one of:
i) an individual,
ii) a retail investor,
iii) an institutional investor, or
iv) an entity that is not a person.

4. The method of claim 1, wherein the at least one second consumer is one of:
i) an individual,
ii) a retail investor,
iii) an institutional investor, or
iv) an entity that is not a person.

5. The method of claim 1, wherein the method further comprising:
automatically generating, in real-time, by the at least one specifically programmed computer processor of the electronic communications exchange executing software to perform the method, a first plurality of electronic alerts to the at least one first consumer regarding the first plurality of electronic communications; and
automatically generating, in real-time, by the at least one specifically programmed computer processor of the electronic communications exchange executing software to perform the method, a second plurality of electronic alerts to the at least one second consumer regarding the second plurality of electronic communications.

6. The method of claim 1, wherein the method further comprising:
automatically generating, in real-time, by the at least one specifically programmed computer processor of the electronic communications exchange executing software to perform the method, a first plurality of electronic notifications to the at least one first company regarding the third plurality of electronic communications attributes; and
automatically generating, in real-time, by the at least one specifically programmed computer processor of the electronic communications exchange executing software to perform the method, a second plurality of electronic notifications to the at least one second company regarding the fourth plurality of electronic communications attributes.

7. The method of claim 1, further comprising enriching the audit trail with data provided by channels or sources in the electronic communications exchange selected from the group consisting of:
   i) data from audit trails of distributions for demonstrating regulatory compliance or delivery;
   ii) data about how recipients use received communications;
   iii) data from senders performing analyses from utilizing various analytical tools for determining which components of distributions are most interesting to recipients; and
   iv) data obtained for determining how to integrate communications or combine content for various classes of recipients.

8. A specifically programmed electronic communications exchange, comprising:
   at least one specialized computer machine, comprising:
   a non-transient memory, electronically storing particular computer executable program code; and
   at least one computer processor which, when executing the particular program code, becomes a specifically programmed computer processor of the electronic communications exchange that is configured to at least perform the following operations:
   electronically storing, in real-time, historical communications data about communications between a plurality of companies and a plurality of consumers of the plurality of companies in at least one database residing in non-transient memory;
   causing, in real-time, via a computer network, to display at least one company personalized communications set-up graphical user interface on at least one first electronic device, being utilized by at least one first representative of at least one first company,
      wherein the at least one company personalized communications set-up graphical user interface is configured to allow the at least one first representative to dynamically define a first plurality of company communications attributes,
      wherein the first plurality of company communications attributes comprises:
         i) first company identifying data, identifying information about the at least one first company,
         ii) a first plurality of company approved consumer delivery communications channels,
         iii) at least one first consumer validation rule, identifying at least one first identity verification requirement selected out of a plurality of identity verification requirements to be utilized to verify an identity of each respective customer,
         iv) first company delivery consent terms data, defining terms to which a consumer is required to consent prior to delivery of a communication from or on behalf of the at least one first company, and
         v) first company consumer presentation data, defining how to display on a graphical user interface information of the at least one first company to a consumer;
   causing, in real-time, via the computer network, to display at least one company personalized communications set-up graphical user interface on at least one second electronic device, being utilized by at least one second representative of at least one second company,
      wherein the at least one company personalized communications set-up graphical user interface is configured to allow the at least one second representative to dynamically define a second plurality of company communications attributes, wherein the second plurality of company communications attributes comprises:
         i) second company identifying data, identifying information about the at least one second company,
         ii) a second plurality of company approved consumer delivery communications channels,
         iii) at least one second consumer validation rule, identifying at least one second identity verification requirement selected out of the plurality of identity verification requirements to be utilized to verify an identity of each respective customer,
         iv) second company delivery consent terms data, defining terms to which a consumer is required to consent prior to delivery of a communication from or on behalf of the at least one second company, and
         v) second company consumer presentation data, defining how to display on a graphical user interface information of the at least one second company to a consumer;
   receiving, in real-time, by the at least one specifically programmed computer processor of the electronic communications exchange executing software to perform the method, from the at least one first representative of the at least one first company, the first plurality of company communications attributes of the at least one first company;
   receiving, in real-time, by the at least one specifically programmed computer processor of the electronic communications exchange executing software to perform the method, from the at least one second representative of the at least one second company, the second plurality of company communications attributes of the at least one second company;
   electronically and automatically storing, in real-time, the first plurality of company communications attributes of the at least one first company and the second plurality of company communications attributes of the at least one second company in the at least one database residing in the non-transient memory;
   causing, in real-time, via the computer network, to display at least one consumer communications set-up graphical user interface on at least one third electronic device, being utilized by at least one first consumer,
      wherein the at least one consumer personalized communications set-up graphical user interface is configured to allow the at least one first consumer to dynamically define a first plurality of consumer communications preference attributes,
      wherein the first plurality of consumer communications preference attributes comprises:
         i) at least one first preference attribute, identifying a type of a first plurality of electronic communications that the at least one first consumer desires to electronically receive,
         ii) at least one second preference attribute, identifying at least one first particular company from which the at least one first consumer desires to electronically receive the first plurality of electronic communications directed to the at least one first consumer, and iii) at least one third preference attribute, identifying at least one first consumer delivery communications channel to be utilized for electronically sending the first plurality of electronic communications;

causing, in real-time, via the computer network, to display the at least one consumer communications set-up graphical user interface on at least one fourth electronic device, being utilized by at least one second consumer, wherein the at least one consumer personalized communications set-up graphical user interface is configured to allow the at least one second consumer to dynamically define a second plurality of consumer communications preference attributes, wherein the second plurality of consumer communications preference attributes comprises:
i) at least one fourth preference attribute, identifying a type of a second plurality of electronic communications that the at least one second consumer desires to electronically receive,
ii) at least one fifth preference attribute, identifying at least one second particular company from which the at least one second consumer desires to electronically receive the second plurality of electronic communications directed to the at least one second consumer, and
iii) at least one sixth preference attribute, identifying at least one second consumer delivery communications channel to be utilized for electronically sending the second plurality of electronic communications;

automatically matching, in real-time, at least one of the at least one first company and at least one second company to at least one of the at least one first consumer and the at least one second consumer based at least in part on:
i) the first plurality of company communications attributes,
ii) the second plurality of company communications attributes,
iii) the first plurality of consumer communications preference attributes, and
iv) the second plurality of consumer communications preference attributes;

automatically updating, in real-time, based at least in part on the historical communications data and outcome of the matching, at least the following:
i) the first plurality of company communications attributes,
ii) the second plurality of company communications attributes,
iii) the first plurality of consumer communications preference attributes,
iv) the second plurality of consumer communications preference attributes, and
v) the at least one consumer communications set-up graphical user interface, and
vi) the at least one company personalized communications set-up graphical user interface; and automatically and electronically delivering, in real-time, the first plurality of electronic communications to the at least one first consumer;

automatically and electronically delivering, in real-time, the second plurality of electronic communications to the at least one first consumer;

automatically and electronically delivering, in real-time, a third plurality of electronic communications, from or on behalf of the at least one first company, based at least in part on the first plurality of company communications attributes;

automatically and electronically delivering, in real-time, a fourth plurality of electronic communications, from or on behalf of the at least one second company, based at least in part on the second plurality of company communications attributes; and automatically and electronically maintaining, in real time, an audit trail of data or information transmitted through the electronic communications exchange.

9. The specifically programmed electronic communications exchange of claim 8, wherein the first plurality of company approved consumer delivery communications channels, the second plurality of company approved consumer delivery communications channels, the at least one first consumer delivery communications channel, and the at least one second consumer delivery communications channel are selected from the group consisting of:
   i) secure electronic messaging system,
   ii) a web site, and
   iii) a digital mail system.

10. The specifically programmed electronic communications exchange of claim 8, wherein the at least one first consumer is one of:
   i) an individual,
   ii) a retail investor,
   iii) an institutional investor, or
   iv) an entity that is not a person.

11. The specifically programmed electronic communications exchange of claim 8, wherein the at least one second consumer is one of:
   i) an individual,
   ii) a retail investor,
   iii) an institutional investor, or
   iv) an entity that is not a person.

12. The specifically programmed electronic communications exchange of claim 8, wherein the specifically programmed computer processor of the electronic communications exchange that is further configured to at least perform the following operations:
   automatically generating, in real-time, a first plurality of electronic alerts to the at least one first consumer regarding the first plurality of electronic communications; and
   automatically generating, in real-time, a second plurality of electronic alerts to the at least one second consumer regarding the second plurality of electronic communications.

13. The specifically programmed electronic communications exchange of claim 8, wherein the specifically programmed computer processor of the electronic communications exchange that is further configured to at least perform the following operations:
   automatically generating, in real-time, a first plurality of electronic notifications to the at least one first company regarding the third plurality of electronic communications attributes; and
   automatically generating, in real-time, a second plurality of electronic notifications to the at least one second company regarding the fourth plurality of electronic communications attributes.

14. The specifically programmed electronic communications exchange of claim 8, wherein the specifically programmed computer processor of the electronic communications exchange that is further configured to enrich the audit trail with data provided by channels or sources in the electronic communications exchange selected from the group consisting of:
- i) data from audit trails of distributions for demonstrating regulatory compliance or delivery;
- ii) data about how recipients use received communications;
- iii) data from senders performing analyses from utilizing various analytical tools for determining which components of distributions are most interesting to recipients; and
- iv) data obtained for determining how to integrate communications or combine content for various classes of recipients.

* * * * *